United States Patent
Surace et al.

(10) Patent No.: US 10,552,299 B1
(45) Date of Patent: Feb. 4, 2020

(54) METHOD AND APPARATUS FOR AI-DRIVEN AUTOMATIC TEST SCRIPT GENERATION

(71) Applicant: APPVANCE INC., Santa Clara, CA (US)

(72) Inventors: Kevin Surace, Sunnyvale, CA (US); Luis Carlos Lara Lopez, Sabanilla (CR); Oscar Gerardo Mora Corrales, Moravia (CR)

(73) Assignee: APPVANCE INC., Santa Clara, CA (US)

( * ) Notice: Subject to any disclaimer, the term of this patent is extended or adjusted under 35 U.S.C. 154(b) by 0 days.

(21) Appl. No.: 16/540,992

(22) Filed: Aug. 14, 2019

(51) Int. Cl.
| | | |
|---|---|---|
| G06F 11/36 | (2006.01) | |
| G06F 17/27 | (2006.01) | |
| G06F 17/22 | (2006.01) | |
| G06F 3/0481 | (2013.01) | |

(52) U.S. Cl.
CPC ...... *G06F 11/3672* (2013.01); *G06F 17/2247* (2013.01); *G06F 17/272* (2013.01); *G06F 3/0481* (2013.01)

(58) Field of Classification Search
CPC ............... G06F 11/3672; G06F 17/272; G06F 17/2247; G06F 3/0481
See application file for complete search history.

(56) References Cited

U.S. PATENT DOCUMENTS

| | | | |
|---|---|---|---|
| 7,210,137 B1 * | 4/2007 | Tamma | G06F 17/2247 717/143 |
| 7,216,256 B2 | 5/2007 | Sankaran et al. | |
| 7,769,228 B2 | 8/2010 | Bahlmann et al. | |
| 7,979,849 B2 | 7/2011 | Feldstein et al. | |
| 8,185,877 B1 | 5/2012 | Colcord | |
| 8,214,805 B2 | 7/2012 | Stewart | |
| 8,701,090 B2 | 4/2014 | Zavatone | |
| 9,262,390 B2 | 2/2016 | Edala et al. | |
| 10,204,035 B1 | 2/2019 | Surace et al. | |
| 2003/0028896 A1 | 2/2003 | Swart et al. | |
| 2004/0098405 A1 | 5/2004 | Zrubek et al. | |

(Continued)

OTHER PUBLICATIONS

Atif M. Memon et al., "Automated Testing of GUI Applications: Models, Tools, and Controlling Flakiness", [Online], 2013, pp. 1479-1480, [Retrieved from Internet on Oct. 23, 2019], <https://ieeexplore.ieee.org/stamp/stamp.jsp?arnumber=6606750>.*

(Continued)

*Primary Examiner* — Ziaul A Chowdhury
(74) *Attorney, Agent, or Firm* — Ascenda Law Group, PC

(57) ABSTRACT

Models of certain groups of graphical user interface (GUI) objects (e.g., menu objects, product objects, title objects, etc.) are created. A website is then modeled as a state machine (also called a blueprint), in which states are used to model webpages of the website. Identifying characteristics of the states are specified based on the models of the GUI objects. Certain scanning options are used to reduce the complexity of the state machine and accelerate the state machine creation process, known as the "one per page" and "once per app" scanning options. After the state machine model of the website has been created, test cases are generated as traversals through the state machine. In one embodiment, user logs direct the generation of test cases so that the test cases resemble past user behavior.

20 Claims, 74 Drawing Sheets

(56) References Cited

U.S. PATENT DOCUMENTS

| | | | |
|---|---|---|---|
| 2005/0055631 A1* | 3/2005 | Scardina | G06F 17/272 |
| | | | 715/230 |
| 2005/0177773 A1* | 8/2005 | Hadley | G06F 11/3672 |
| | | | 714/38.1 |
| 2005/0234844 A1* | 10/2005 | Ivanov | G06F 17/272 |
| 2006/0036910 A1* | 2/2006 | Fung | G06F 11/3672 |
| | | | 714/25 |
| 2006/0085681 A1 | 4/2006 | Feldstein et al. | |
| 2006/0129892 A1* | 6/2006 | Diaconu | G06F 11/3672 |
| | | | 714/38.14 |
| 2006/0195782 A1 | 8/2006 | Wang et al. | |
| 2006/0224924 A1* | 10/2006 | Grieskamp | G06F 11/3672 |
| | | | 714/38.12 |
| 2007/0050704 A1* | 3/2007 | Liu | G06F 8/37 |
| | | | 715/234 |
| 2009/0077383 A1 | 3/2009 | de Monseignat et al. | |
| 2009/0089759 A1* | 4/2009 | Rajan | G06F 11/3604 |
| | | | 717/126 |
| 2009/0210362 A1 | 8/2009 | Xiao et al. | |
| 2009/0319342 A1 | 12/2009 | Shilman et al. | |
| 2011/0004868 A1* | 1/2011 | Bharadwaj | G06F 11/3676 |
| | | | 717/135 |
| 2011/0078556 A1 | 3/2011 | Prasad et al. | |
| 2011/0246261 A1 | 10/2011 | Kassaei et al. | |
| 2014/0096092 A1* | 4/2014 | Johnson | G06F 3/0481 |
| | | | 715/863 |
| 2014/0201113 A1 | 7/2014 | Harz et al. | |
| 2015/0128039 A1* | 5/2015 | Wieder | G06F 3/0481 |
| | | | 715/716 |
| 2016/0253597 A1 | 9/2016 | Bhatt et al. | |
| 2017/0372408 A1 | 12/2017 | Khandelwal et al. | |
| 2018/0137560 A1 | 5/2018 | Chopra et al. | |
| 2018/0307587 A1* | 10/2018 | Karmon | G06F 11/3648 |
| 2019/0043095 A1 | 2/2019 | Grimaud et al. | |

OTHER PUBLICATIONS

Wolfgang Grieskamp et al., "Generating Finite State Machines from Abstract State Machines", [Online], 2002, pp. 112-122, [Retrieved from Internet on Oct. 23, 2019], <http://delivery.acm.org/10.1145/570000/566190/p112-grieskamp.pdf>.*

Haja Moinudeen et al., "Model Based Verification of SystemC Designs", [Online], 2006, pp. 289-292, [Retrieved from Internet on Oct. 23, 2019], <https://ieeexplore.ieee.org/abstract/document/4016952>.*

Jeff Offutt et al., "Using Abstraction andWeb Applications to Teach Criteria-Based Test Design", [Online], 2011, pp. 227-236, [Retrieved from Internet on Oct. 23, 2019], <https://ieeexplore.ieee.org/stamp/stamp.jsp?arnumber=5876092>.*

Alalfi; et al., "Modeling methods for web application verification and testing: State of the art", Softw. Test., Verif. Reliab. (2009), 32 pages.

Andrews; et al., "Scalability Issues with Using FSMWeb to Test Web Applications", published in Information and Software Technology (Jan. 2010), paper submitted Jun. 2009, 33 pages.

Andrews; et al., "Testing Web Applications by Modeling with FSMs", Software & Systems Modeling (Jul. 2005), 4 (3):326-345.

Benedikt; et al., "VeriWeb: Automatically Testing Dynamic Web Sites", WWW (2002), 15 pages.

Briand; et al., "A UML-Based Approach to System Testing", Carleton University TR SCE-01-01- Version 4, revised Jun. 2002, 57 pages.

Campean, "How to debug mobile app requests and test their APIs", Medium.com (Mar. 14, 2018), downloaded from: https://medium.com/@DragosCampean/how-to-debug-mobile-app-requests-and-test-their-apis-c58dcc1d7c7f, 22 pages.

Marchetto; et al., "State-Based Testing of AjaxWeb Applications", 1st International Conference on Software Testing, Verification, and Validation (Apr. 9-11, 2008), 10 pages.

Offutt; et al., "Modeling Presentation Layers of Web Applications for Testing", Software & Systems Modeling (2009), 41 pages.

Ran; et al., "Building test cases and oracles to automate the testing of web database applications", Information and Software Technology (2009), 51:460-477.

Singh; et al., "Testing Web Based Applications Using Finite State Machines Employing Genetic Algorithm", International Journal of Engineering Science and Technology (2010), 2(12):6931-6941.

Zakonov; et al., "Automatic Extraction and Verification of State-Models for Web Applications", Informatics in Control, Automation and Robotics (2011), pp. 157-160.

Zakonov; et al., "Generating Test Cases With High Branch Coverage for Web Applications", Spring/Summer Young Researchers' Colloquium on Software Engineering (Jan. 2012), 5 pages.

Non-Final Office Action dated Oct. 7, 2019, from U.S. Appl. No. 16/540,986, filed Aug. 14, 2019, 19 pages.

* cited by examiner

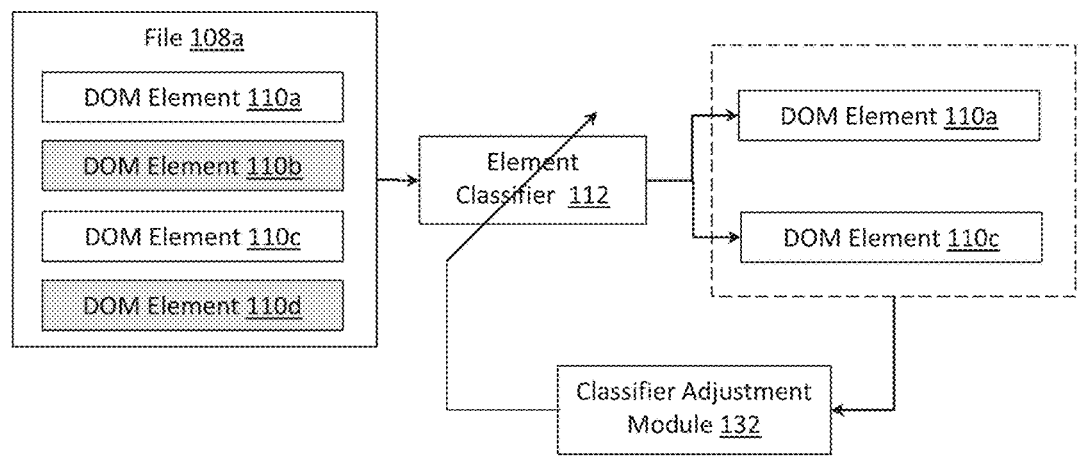
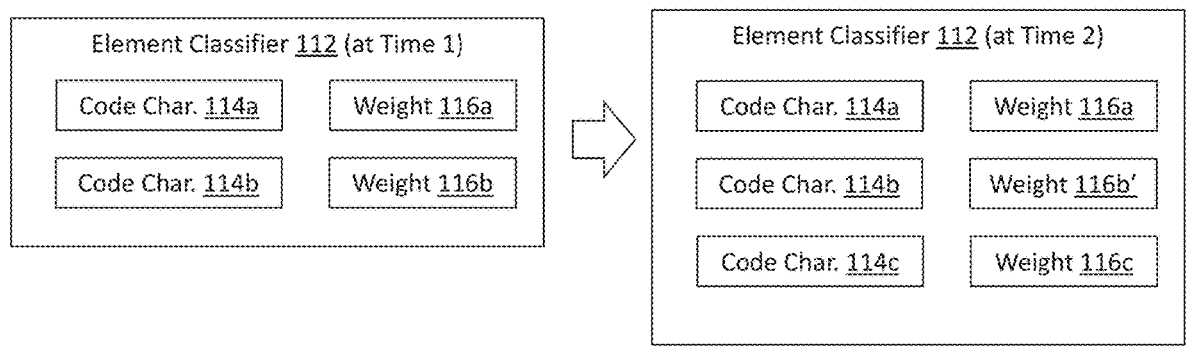
Fig. 4A

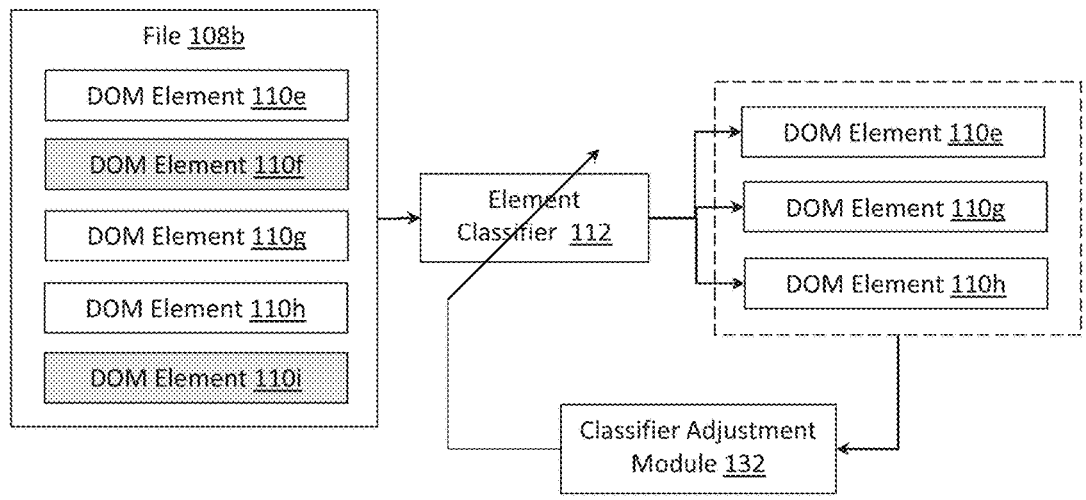
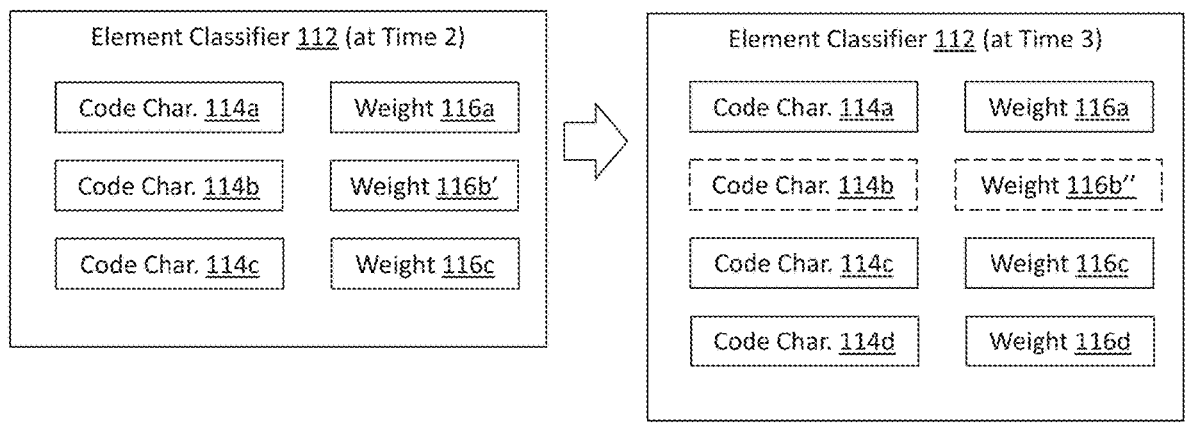
Fig. 4B

Fig. 9B

```
...
    <div class="list-group">
103j      <a class="list-group-item" href="/t/bags">Bags</a>
103k      <a class="list-group-item" href="/t/mugs">Mugs</a>
103l      <a class="list-group-item" href="/t/clothing">Clothing</a>
    </div>
...
    <a itemprop="url" href="/products/ruby-on-rails-tote">
103n    <img itemprop="image" alt="Ruby on Rails Tote" src="/spree/products/21/small/ror_tote.jpeg?1527769324"><br>
      <span class="info" itemprop="name" title="Ruby on Rails Tote">Ruby on Rails Tote</span>
    </a>
...
    <a itemprop="url" href="/products/ruby-on-rails-bag">
103o    <img itemprop="image" alt="Ruby on Rails Bag" src="/spree/products/23/small/ror_bag.jpeg?1527769326"><br>
      <span class="info" itemprop="name" title="Ruby on Rails Bag">Ruby on Rails Bag</span>
    </a>
...
    <a itemprop="url" href="/products/ruby-on-rails-ringer-t-shirt">
103p    <img itemprop="image" alt="Ruby on Rails Ringer T-Shirt" src="/spree/products/29/small/ror_ringer.jpeg?1527769331"><br>
      <span class="info" itemprop="name" title="Ruby on Rails Ringer T-Shirt">Ruby on Rails Ringer T-Shirt</span>
    </a>
...
    <a itemprop="url" href="/products/ruby-baseball-jersey">
103q    <img itemprop="image" alt="Ruby Baseball Jersey" src="/spree/products/34/small/ruby_baseball.png?1527769335"><br>
      <span class="info" itemprop="name" title="Ruby Baseball Jersey">Ruby Baseball Jersey</span>
    </a>
...
```

```
:
<div class="list-group">
    <a class="list-group-item" href="/t/bags">Bags</a>
    <a class="list-group-item" href="/t/mugs">Mugs</a>
    <a class="list-group-item" href="/t/clothing">Clothing</a></div>
</div>
:
<h1 class="taxon-title">Bags</h1>
<a itemprop="url" href="/products/ruby-on-rails-tote">
    <img itemprop="image" alt="Ruby on Rails Tote" src="/spree/products/21/small/ror_tote.jpeg?1527769324"><br>
    <span class="info" itemprop="name" title="Ruby on Rails Tote">Ruby on Rails Tote</span>
</a>
:
<a itemprop="url" href="/products/ruby-on-rails-bag">
    <img itemprop="image" alt="Ruby on Rails Bag" src="/spree/products/23/small/ror_bag.jpeg?1527769326"><br>
    <span class="info" itemprop="name" title="Ruby on Rails Bag">Ruby on Rails Bag</span>
</a>
```

```
103p ⎯⎯ <button name="button" type="submit" class="btn btn-success" id="add-to-cart-button"> Add To Cart </button>
103q ⎯⎯ <input type="number" name="quantity" id="quantity" value="1" class="title form-control" min="1">
```

Fig. 9F

103r — `<a href="/products/ruby-on-rails-tote">Ruby on Rails Tote</a>`

Fig. 9H

PRE-ACTION EXTRACTOR
1. Extraction
2. Store
3. Action

POST-ACTION EXTRACTOR
1. Action
2. Extraction
3. Store

PRE-ACTION VALIDATOR
1. Extraction
2. Evaluation
3. Action

POST-ACTION VALIDATOR
1. Action
2. Extraction
3. Evaluation

AUTO VALIDATION
1. Extraction
2. Action
3. Evaluation

664 ↗ Adjust non-zero similarity score between URL "aab" and URL of each candidate action/request pair (in blueprint) based on number of steps from root of blueprint to each candidate action/request pair

| | Action 0 get kwz | Action 1 get aaa | Action 1 get abc | Action 2 get aab | Action 3 get abc | Action 3 get zzz | Action 4 get kwx |
|---|---|---|---|---|---|---|---|
| Similarity score between URL "aab" and URL of each candidate action/request pair | 50% | 95% | 60% | 100% | 60% | 50% | 50% |
| Steps to reach each candidate action/request pair from root of blueprint | -- | 0 -> 1 | 0 -> 1 | 0 -> 1<br>1 -> 2 | 0 -> 1<br>1 -> 3 | 0 -> 1<br>1 -> 3 | 0 -> 1<br>1 -> 2<br>2 -> 4 |
| Number of steps to reach each candidate action/request pair from root of blueprint | 0 | 1 | 1 | 2 | 2 | 2 | 3 |
| Adjusted similarity score | 50% | 90% | 55% | 90% | 50% | 40% | 30% |
| Eliminate candidate action/request pair? (Threshold set at 51%) | Y | N | N | N | Y | Y | Y |

665 ↗

| Number of steps | Adjustment in similarity score |
|---|---|
| 1 | -5% |
| 2 | -10% |
| 3 | -20% |

Adjust non-zero similarity score between URL "zza" and URL of each candidate action/request pair (in blueprint) based on number of steps from "Action 1" in blueprint (corresponding to current node of tree) to each candidate action/request in blueprint

| | Action 0 get kwz | Action 1 get aaa | Action 1 get abc | Action 2 get aab | Action 3 get abc | Action 3 get zzz | Action 4 get kwx |
|---|---|---|---|---|---|---|---|
| Similarity score between URL "zza" and URL of each candidate action/request pair | 50% | 60% | 50% | 50% | 50% | 95% | 50% |
| Steps to reach each candidate action/request pair from "Action 1" | Not reachable | 1->3 3->1 | -- | 1->2 | 1->3 | 1->3 | 1->2 2->4 |
| Number of steps to reach each candidate action/request pair from "Action 1" | N/A | 2 | 0 | 1 | 1 | 1 | 2 |
| Adjusted similarity score | 0% | 50% | 50% | 45% | 45% | 90% | 40% |
| Eliminate candidate action/request pair? (Threshold set at 51%) | Y | Y | Y | Y | Y | N | Y |

Fig. 24

Adjust non-zero similarity score between URL "zza" and URL of each candidate action/request pair (in blueprint) based on number of steps from "Action 1" in blueprint (corresponding to current node of tree) to each candidate action/request in blueprint

|  | Action 0 get kwz | Action 1 get aaa | Action 1 get abc | Action 2 get aab | Action 3 get abc | Action 3 get zzz | Action 4 get kwx |
|---|---|---|---|---|---|---|---|
| Similarity score between URL "zza" and URL of candidate action/request pair | 50% | 60% | 50% | 50% | 50% | 95% | 50% |
| Steps to reach each candidate action/request pair from "Action 1" | Not reachable | -- | 1->3 3->1 | 1->2 | 1->3 | 1->3 | 1->2 2->4 |
| Number of steps to reach each candidate action/request pair from "Action 1" | N/A | 0 | 2 | 1 | 1 | 1 | 2 |
| Adjusted similarity score | 0% | 60% | 40% | 45% | 45% | 90% | 40% |
| Eliminate candidate action/request pair? (Threshold set at 51%) | Y | N | Y | Y | Y | N | Y |

Adjust non-zero similarity score between URL "zza" and URL of each candidate action/request pair (in blueprint) based on number of steps from "Action 2" in blueprint (corresponding to current node of tree) to each candidate action/request in blueprint

| | Action 0 get kwz | Action 1 get aaa | Action 1 get abc | Action 2 get aab | Action 3 get abc | Action 3 get zzz | Action 4 get kwx |
|---|---|---|---|---|---|---|---|
| Similarity score between URL "zza" and URL of each candidate action/request pair | 50% | 60% | 50% | 50% | 50% | 95% | 50% |
| Steps to reach each candidate action/request from "Action 2" | Not reachable | 2 -> 4<br>4 -> 1 | 2 -> 4<br>4 -> 1 | 2 -> 4<br>4 -> 1<br>1 -> 2 | 2 -> 4<br>4 -> 1<br>1 -> 3 | 2 -> 4<br>4 -> 1<br>1 -> 3 | 2 -> 4 |
| Number of steps to reach each candidate action/request pair from "Action 2" | N/A | 2 | 2 | 3 | 3 | 3 | 1 |
| Adjusted similarity score | 0% | 50% | 40% | 30% | 30% | 75% | 45% |
| Eliminate candidate action/request pair? (Threshold set at 51%) | Y | Y | Y | Y | Y | N | Y |

Fig. 28

METHOD AND APPARATUS FOR AI-DRIVEN AUTOMATIC TEST SCRIPT GENERATION

FIELD OF THE INVENTION

The present invention relates to the automatic generation of test scripts, and more specifically relates to a model of graphical user interface (GUI) objects on a webpage (also called Smart Tags), a model of a website (also called a blueprint) which relies upon the model of the GUI objects, and the generation of test scripts based on the model of the GUI objects and the model of the website.

BACKGROUND

Software testing is an important part of the software development cycle. Whenever software is created and/or modified, the software is typically tested using test cases (also called a "test script") to see whether the software behaves as expected. In the past, much of the test scripts have been manually written (i.e., by developers, quality assurance (QA) individuals, etc.) and such creation of test scripts in many cases is a time consuming and costly process. For the sake of speed to market, some enterprises have chosen to release software that is not fully tested, leading to their customers encountering errors (e.g., as the result of insufficient resources to handle peak load, requests for resources that are not available, etc.). Described herein are techniques for generating test scripts with reduced human involvement.

SUMMARY OF THE INVENTION

In accordance with one embodiment of the invention, the process to automatically generate test scripts to test a website (or more generally a web application, or even more generally, an application) is logically organized into three main processes. The first and second processes relate to the modeling of the website. A model of the website (or application) may include a state machine, in which states correspond to the webpages (or application pages) of the website and the edges correspond to the user actions (e.g., click on button, entry of text into a textbox, etc.) that may be performed to transition from one webpage to another webpage of the website or may be performed within one webpage. The model of the website may also be called a "blueprint" of the website. In some cases, multiple states can correspond to a single webpage. For example, the action of expanding a menu can cause a transition from one state to another state, even though the same webpage is being displayed (i.e., the URL of the webpage that is being display remains the same).

More specifically, the first process relates to the creation of various models of groups of GUI objects (each model known as a "Smart Tag") via a tool known as the "Smart Tag Workbench". Groups of GUI objects for an e-commerce website may include menu objects, product objects, quantity textboxes, add to cart buttons, etc. More specifically, the "Smart Tag Workbench" is a graphical user interface that assists a user to create and edit Smart Tags. Other ways to create Smart Tags are also possible, including the use of scripts. Other ways to edit Smart Tags are also possible, including directly editing a file (e.g., text or binary file) that stores information that encodes for a Smart Tag.

Certain scanning options may be associated with the models of the GUI objects in order to reduce the complexity of the state machine and accelerate the generation of the state machine. For instance, menu objects may be associated with the scanning option of "once per app", such that in the modeling of the menu objects, the selection of a menu object on a first page and selection of the same menu object on a second page are automatically modeled to lead to the same resulting state, without checking whether such behavior is reflected in the website. As another example, product objects may be associated with the scanning option of "one per page", such that an edge from a state is created for only one (or a small number) of the product objects on the webpage, regardless if there are a plurality of product objects on the same webpage. The motivation for the "one per page" scanning option is that, if there are a large number of products on a page, creating an edge for each of the products would lead to a very large state machine. Instead, the solution is to, typically, create an edge for the first product in a group of products, an edge for a product in middle the group and an edge for the product at the end of the group. Testing a small sample of the products allows for an appropriate cost-benefit tradeoff. The small number allows for a time savings, but if there an error that is repeated across the various products, then the error can still be detected.

The second process relates to the construction of the state machine, including the modeling of webpages as states of the state machine, and the modeling of actions performed on GUI objects of the webpages as edges of the state machine. Each state may be characterized by identifying characteristics (e.g., locators) of the associated webpage, and such characteristics may be identified via the models of the GUI objects (e.g., Smart Tags). More specifically, each state may be associated with a unique integer (i.e., a state fingerprint) that is calculated from a hash function that receives as an input a sorted list of the identifying characteristics of the associated webpage. Each edge may be associated with an action identifier that maps to an action (e.g., click), HTTP requests that are transmitted from the client upon execution of the action, and identifying characteristics (e.g., locators) of the GUI object that was subject to the action. One can interpret each Smart Tag created by the Smart Tag Workbench as a local model of individual elements of a webpage, and the state machine as a global model of the website.

Finally, the third process relates to the automatic generation of test scripts based on the model of the website. In a basic approach of test script generation, test scripts may be generated as random paths or traversals through the state machine, in which the edges of the state machine (which include user actions) are executed on a website under test (or more generally, an application-under-test (AUT)). In a more sophisticated approach, user logs are used to direct the generation of the test scripts, such that the generated test scripts resemble the execution paths that are typically performed by users. In certain instances, user logs may be incomplete (e.g., some HTTP requests may be included in the user log, while other HTTP requests may be omitted) or outdated due to the an updated version of the website, so that the test script generator (e.g., the Appvance® AIQ) when attempting to simulate the execution paths of the user logs will also need to infer the most likely execution path that was taken by the user. User logs may also be known as breadcrumbs, and may be generated by logging services provided by enterprises, such as Sumo Logic® of Redwood City, Calif., and Splunk® of San Francisco, Calif.

These and other embodiments of the invention are more fully described in association with the drawings below.

BRIEF DESCRIPTION OF THE DRAWINGS

The present application is illustrated by way of example, and not limitation, in the figures of the accompanying drawings, in which:

FIGS. 1B-1J depict screenshots of various webpages of the website, enlarged in comparison to the screenshots depicted in FIG. 1A.

FIGS. 4A and 4B depict a more detailed example of the training of an element classifier, in accordance with one embodiment of the invention.

FIG. 9B depicts code fragments that are associated with the GUI objects depicted in the webpage of FIG. 9A, in accordance with one embodiment of the invention.

FIG. 9D depicts code fragments that are associated with the GUI objects depicted in the webpage of FIG. 9C, in accordance with one embodiment of the invention.

FIG. 9F depicts code fragments that are associated with the GUI objects depicted in the webpage of FIG. 9E, in accordance with one embodiment of the invention.

FIG. 9H depicts code fragments that are associated with the GUI objects depicted in the webpage of FIG. 9G, in accordance with one embodiment of the invention.

FIG. 10K depicts a summary of the extractors, validators and auto validations, in accordance with one embodiment of the invention.

FIGS. 12-14 depict user interfaces for defining a custom action, in accordance with one embodiment of the invention.

FIG. 22 depicts a table with similarity scores that have been adjusted based on a number of steps from the root of the blueprint to each of the candidate requests, and decisions on whether or not to eliminate candidate requests, in accordance with one embodiment of the invention.

FIG. 24 depicts a table with similarity scores that have been adjusted based on a number of steps from a first hypothetical match to the first request in the blueprint to each of the candidate requests, and decisions on whether or not to eliminate candidate requests, in accordance with one embodiment of the invention.

FIG. 26 depicts a table with similarity scores that have been adjusted based on a number of steps from a second hypothetical match to the first request in the blueprint to each of the candidate requests, and decisions on whether or not to eliminate candidate requests, in accordance with one embodiment of the invention.

FIG. 28 depicts a table with similarity scores that have been adjusted based on a number of steps from a third hypothetical match to the first request in the blueprint to each of the candidate requests, and decisions on whether or not to eliminate candidate requests, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

For clarity of description, a simplified website will first be described. An explanation of many of the processes will then be provided in the context of such simplified website. It is expected that based on such explanation, the reader will be able to apply the techniques of various embodiments of the invention to more complex websites and web applications.

Figure 1A:
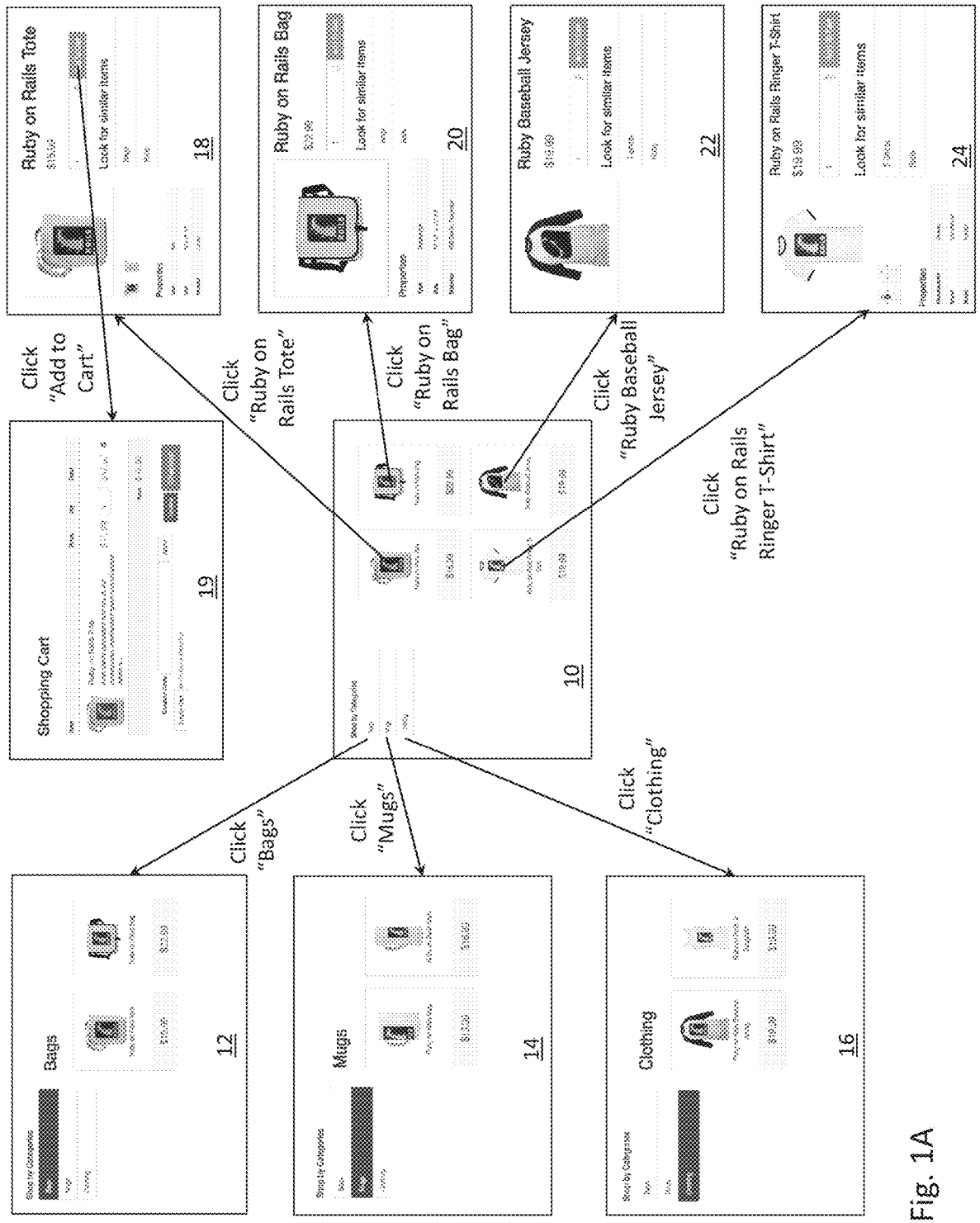
FIG. 1A depicts a diagram of a portion of the structure of a simplified website including a plurality of webpages.
Figure 1B:

FIG. 1A depicts a diagram of a portion of the structure of a simplified website including a plurality of webpages. Webpage 10 may be regarded as the "home page" of the website. FIG. 1B depicts a screenshot with a more magnified view of webpage 10, in which a user is given the choice to either shop by categories, by selecting one or more of menu objects 28, 30 and 32 displayed on the left side of webpage 10 or shop by browsing through specific product objects 34, 36, 38 and 40 displayed on the right side of webpage 10. Returning to FIG. 1A, selection of "Bags" menu object 28 may lead to webpage 12, in which a choice of bags may be displayed. Selection of "Mugs" menu object 30 may lead to webpage 14, in which a choice of mugs may be displayed. Selection of "Clothing" menu object 32 may lead to webpage 16, in which a choice of clothing may be displayed. Selection of "Ruby on Rails Tote" object 34 may lead to webpage 18, in which additional details of the Ruby on Rails Tote may be displayed, along with an option to purchase this item. Selection of "Ruby on Rails Bag" object 36 may lead to webpage 20, in which additional details of the Ruby on Rails Bag may be displayed, along with an option to purchase this item. Selection of "Ruby Baseball Jersey" object 40 may lead to webpage 22, in which additional details of the Ruby Baseball Jersey may be displayed, along with an option to purchase this item. Selection of "Ruby on Rails Ringer T-Shirt" object 38 may lead to webpage 24, in which additional details of the Ruby on Rails Ringer T-Shirt may be displayed, along with an option to purchase this item.

The connections from home page 10 to each of the "neighbor" pages 12, 14, 16, 18, 20, 22 and 24 are represented as arrows in FIG. 1A. The connection from webpage 18 to webpage 19 is also represented as an arrow in FIG. 1A. It is noted that the connection of webpages is drawn in an incomplete manner in FIG. 1A for the sake of not unnecessarily cluttering the presentation of FIG. 1A. For instance, clicking on an object in webpage 14 may lead to webpage 12, but such an arrow has not been illustrated in FIG. 1A. In addition, there may be numerous other webpages of the website that have been omitted from FIG. 1A. Again, such omissions are for the sake of clarity of depiction.

Figure 1C:

Details of webpage 12 are depicted in a magnified manner in the screenshot of FIG. 1C. The user is again given the choice to either shop by categories, by selecting one or more of the menu objects displayed on the left side of webpage 12 or shop by browsing through specific bags displayed on the right side of webpage 12 under the heading "Bags" 42. Selection of "Bags" menu object 28 may have no effect as such user action may lead to webpage 12, which is already displayed. Selection of "Mugs" menu object 30 may lead to webpage 14, in which a choice of mugs may be displayed. Selection of "Clothing" menu object 32 may lead to webpage 16, in which a choice of clothing may be displayed. Selection of "Ruby on Rails Tote" object 34 may lead to webpage 18, in which additional details of the Ruby on Rails Tote may be displayed, along with an option to purchase this item. Selection of "Ruby on Rails Bag" object 36 may lead to webpage 20, in which additional details of the Ruby on Rails Bag may be displayed, along with an option to purchase this item.

Figure 1D:
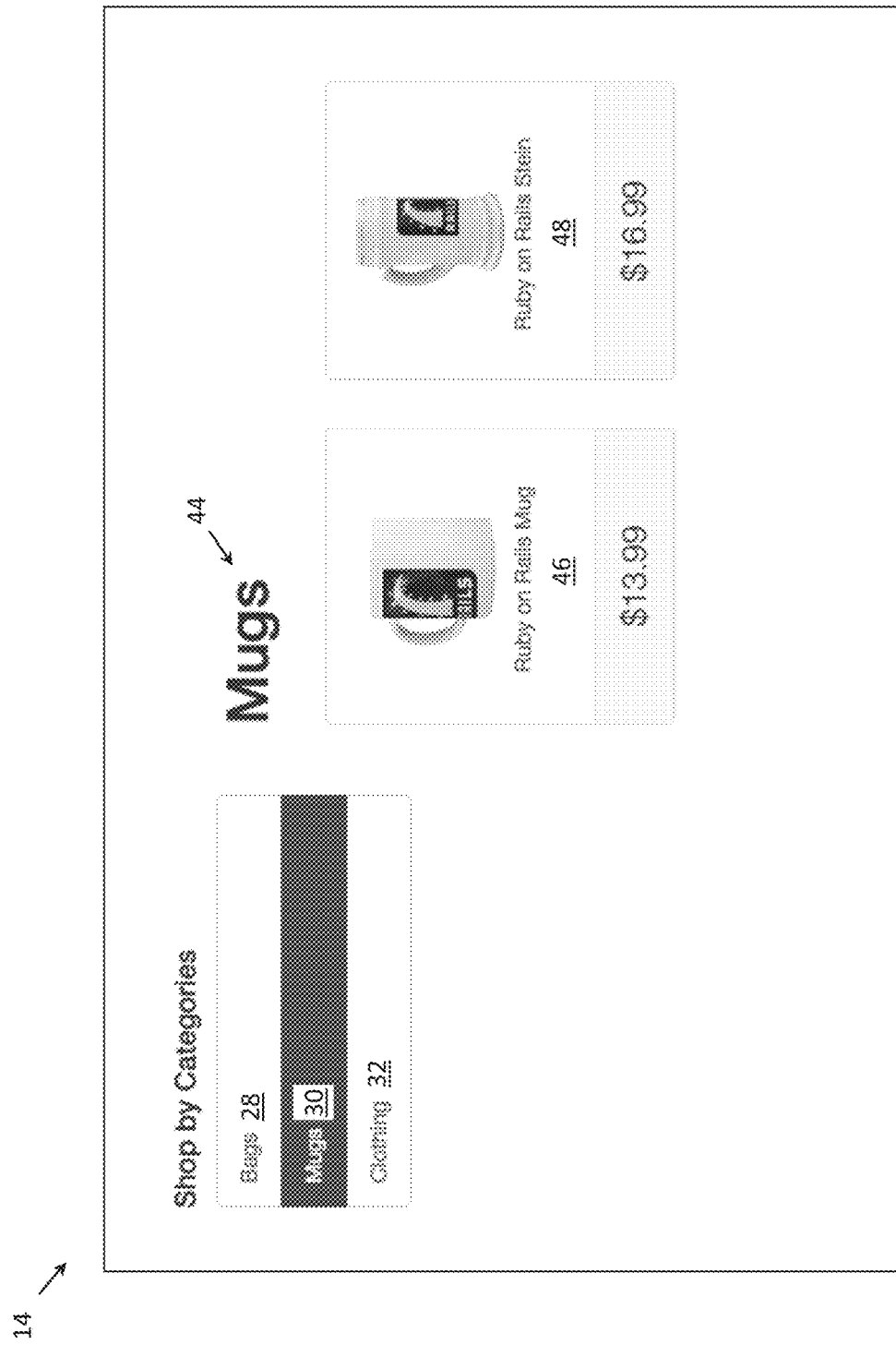

Details of webpage 14 are depicted in a magnified manner in the screenshot of FIG. 1D. The user is again given the choice to either shop by categories, by selecting one or more of the menu objects displayed on the left side of webpage 14 or shop by browsing through specific mugs displayed on the right side of webpage 14 under the heading "Mugs" 44. Selection of "Bags" menu object 28 may lead to webpage 12, in which a choice of bags may be displayed. Selection of "Mugs" menu object 30 may have no effect, as such user action may lead to webpage 14, which is already displayed. Selection of "Clothing" menu object 32 may lead to webpage 16, in which a selection of clothing may be displayed. Selection of "Ruby on Rails Mug" object 46 may lead to a webpage (not depicted) with additional details of the Ruby on Rails Mug, along with an option to purchase this item. Selection of "Ruby on Rails Stein" object 48 may lead to a webpage (not depicted) with additional details of the Ruby on Rails Stein, along with an option to purchase this item.

Figure 1E:
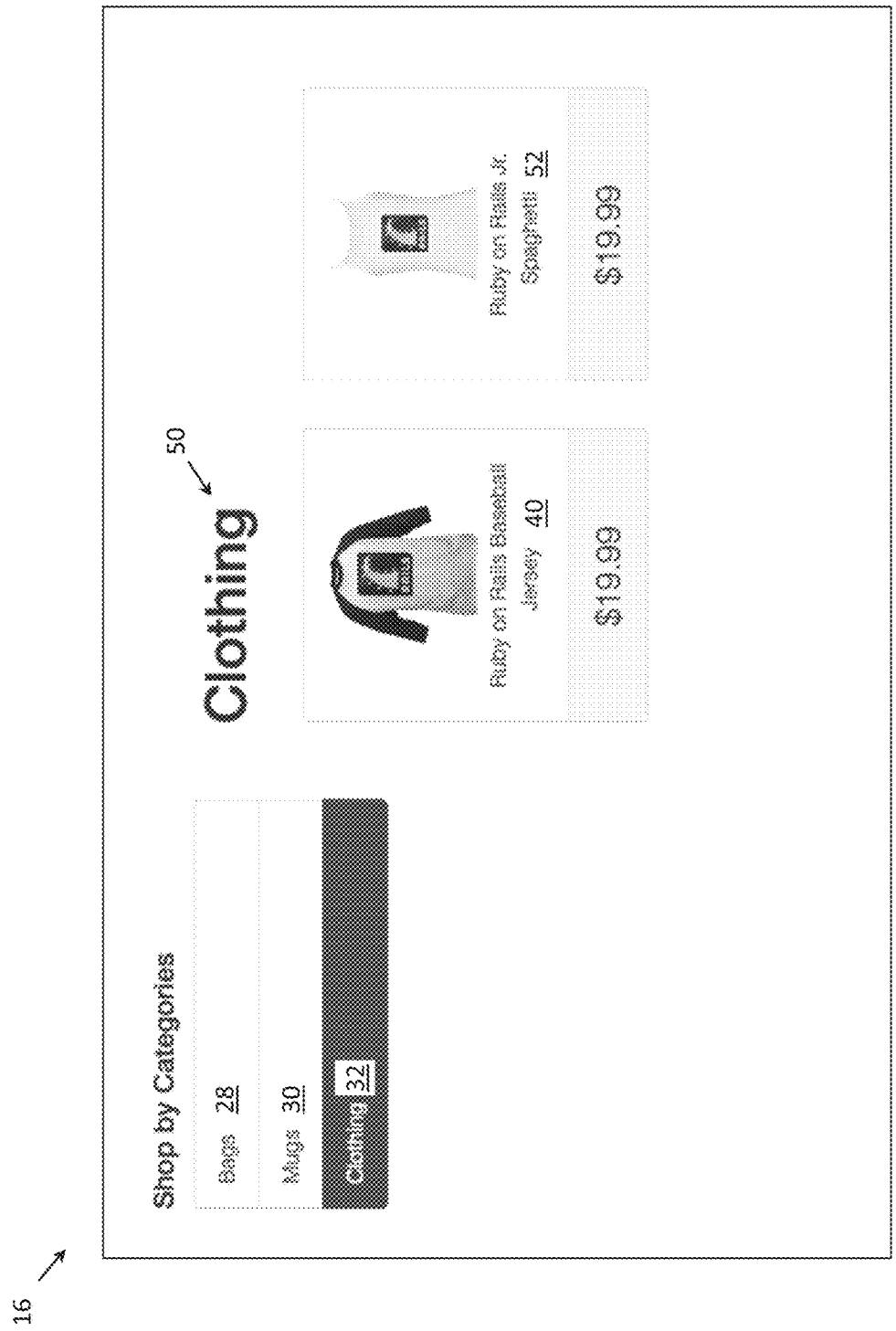

Details of webpage 16 are depicted in a magnified manner in the screenshot of FIG. 1E. The user is again given the choice to either shop by categories, by selecting one or more of the menu objects displayed on the left side of webpage 16 or shop by browsing through specific clothing displayed on the right side of webpage 16 under the heading "Clothing" 50. Selection of "Bags" menu object 28 may lead to webpage 12, in which a choice of bags may be displayed. Selection of "Mugs" menu object 30 may lead to webpage 14, in which a choice of mugs may be displayed. Selection of "Clothing" menu object 32 may have no effect, as such user action may lead to webpage 16, which is already displayed. Selection of "Ruby on Rails Baseball Jersey" object 40 may lead to webpage 22 with additional details of the Ruby on Rails Baseball Jersey, along with an option to purchase this item. Selection of "Ruby on Rails Jr. Spaghetti" object 52 may lead to a webpage (not depicted) with additional details of the Ruby on Rails Jr. Spaghetti, along with an option to purchase this item.

Figure 1F:
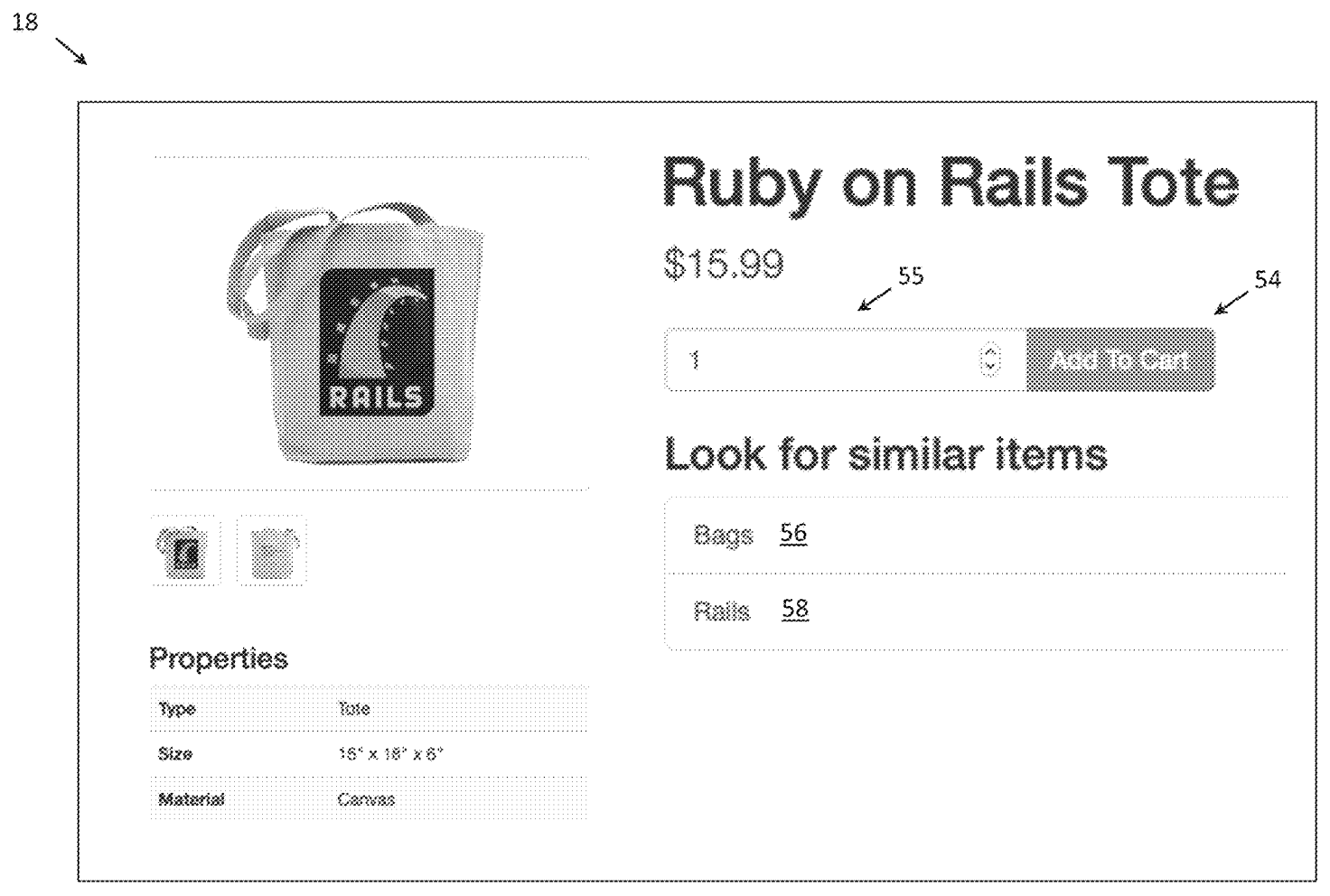
Figure 1G:
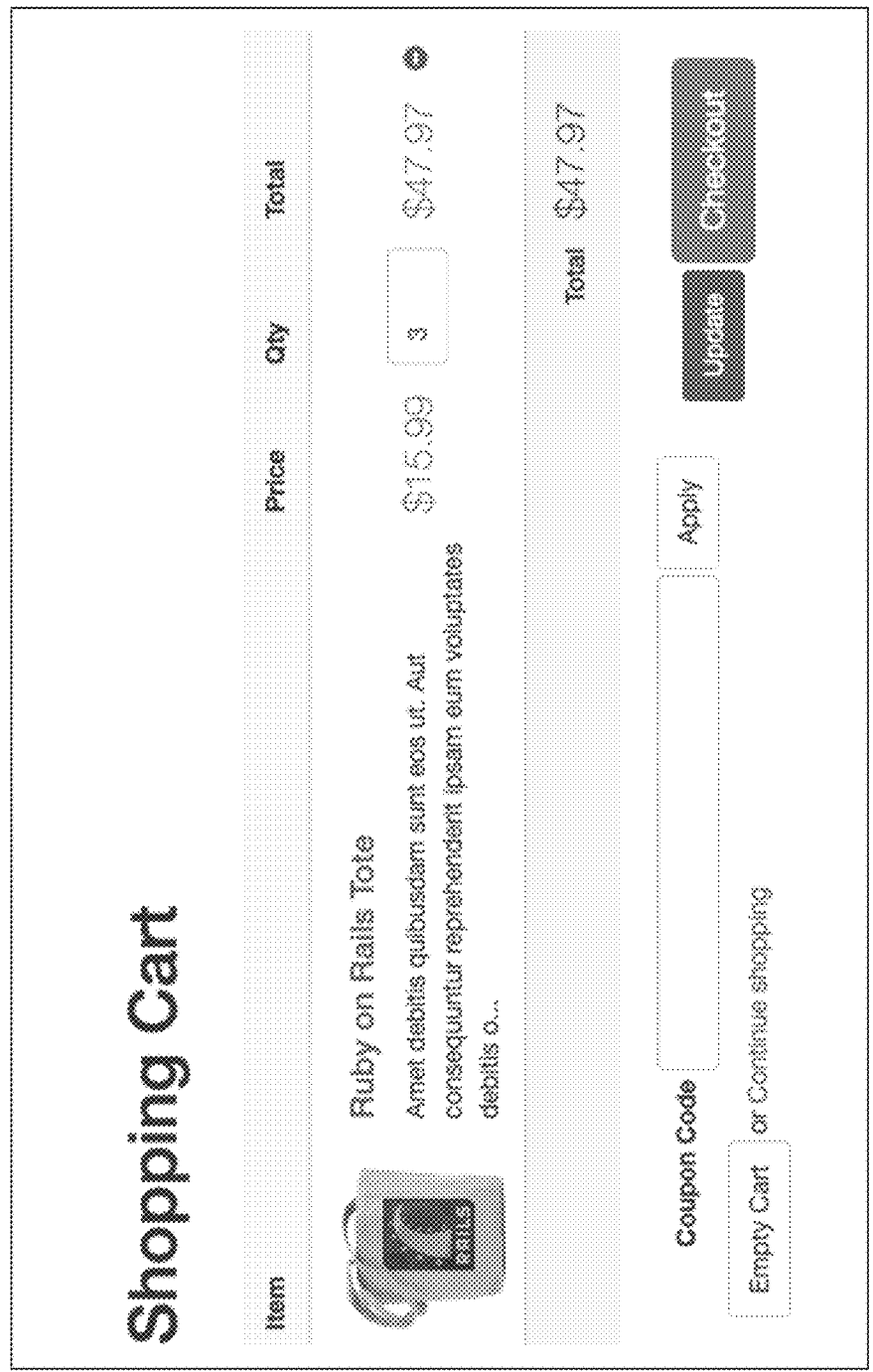
Figure 11:
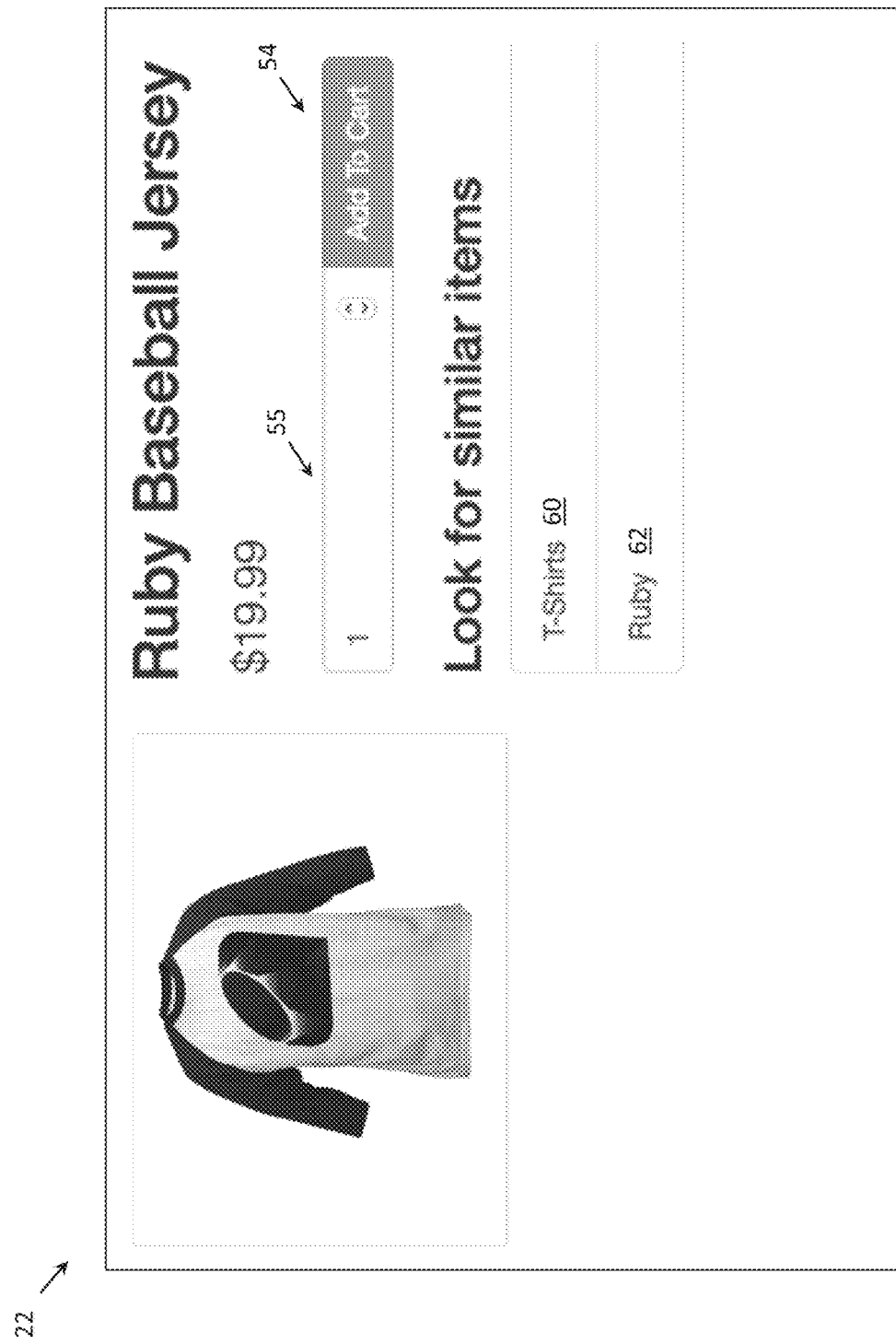
FIGS. 11A-11G depict a construction of a partial state machine model of the website depicted in FIGS. 1A-1J, in accordance with one embodiment of the invention.

Details of webpage 18 are depicted in a magnified manner in the screenshot of FIG. 1F. Webpage 18 may include additional details of the Ruby on Rails Tote (e.g., type, size, material, front image, back image, etc.). Webpage 18 may also include "Add To Cart" button 54, along with text box 55 to input a number of items, for the user to purchase the specified number of Ruby on Rails Totes. If the user inputs "3" into textbox 55 and selects "Add To Cart" button 54, the website transitions to webpage 19 depicted in FIG. 1G, in which the user is provided the option to checkout a shopping cart with three Ruby on Rails Totes. While the quantity of 3 is used as a specific example, it is understood that other quantities could be specified. If the user decides to continue browsing items instead of making a purchase, the user may select one or more of "Bags" link 56 or "Rails" link 58 to look for items that are similar to the item featured on webpage 18.

Figure 1H:
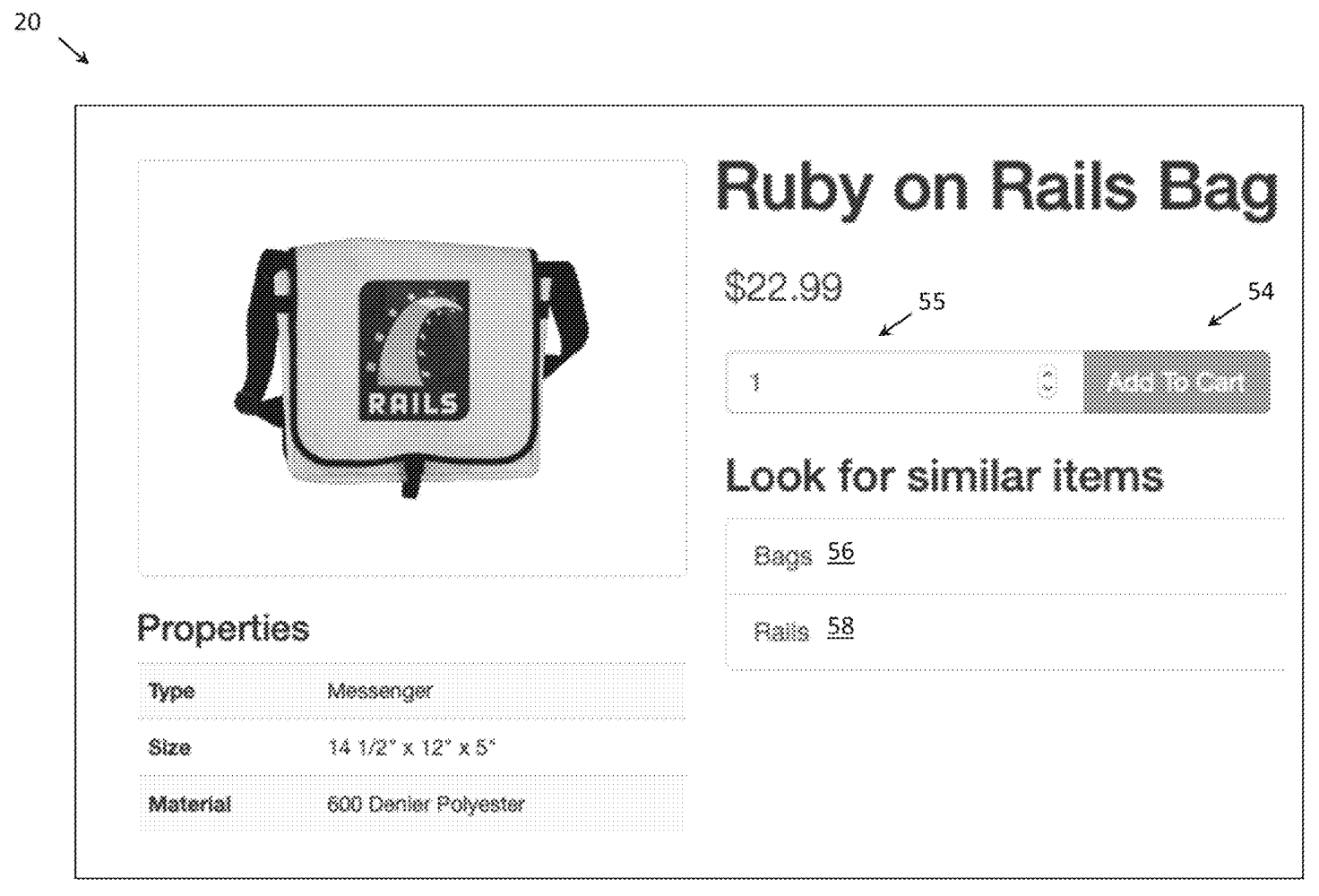

Details of webpage 20 are depicted in a magnified manner in the screenshot of FIG. 1H. Webpage 20 may include additional details of the Ruby on Rails Bag (e.g., type, size, material, etc.). Webpage 20 may also include "Add To Cart" button 54, along with text box 55 to input a number of items, for the user to purchase the specified number of Ruby on Rails Bags. If the user decides to continue browsing items instead of making a purchase, the user may select one or more of "Bags" link 56 or "Rails" link 58 to look for items that are similar to the item featured on webpage 20.

Details of webpage 22 are depicted in a magnified manner in the screenshot of FIG. 1I. Webpage 22 may also include "Add To Cart" button 54, along with text box 55 to input a number of items, for the user to purchase the specified number of Ruby Baseball Jerseys. If the user decides to continue browsing items instead of making a purchase, the user may select one or more of "T-Shirts" link 60 or "Ruby" link 62 to look for items that are similar to the item featured on webpage 22.

Figure 1J:
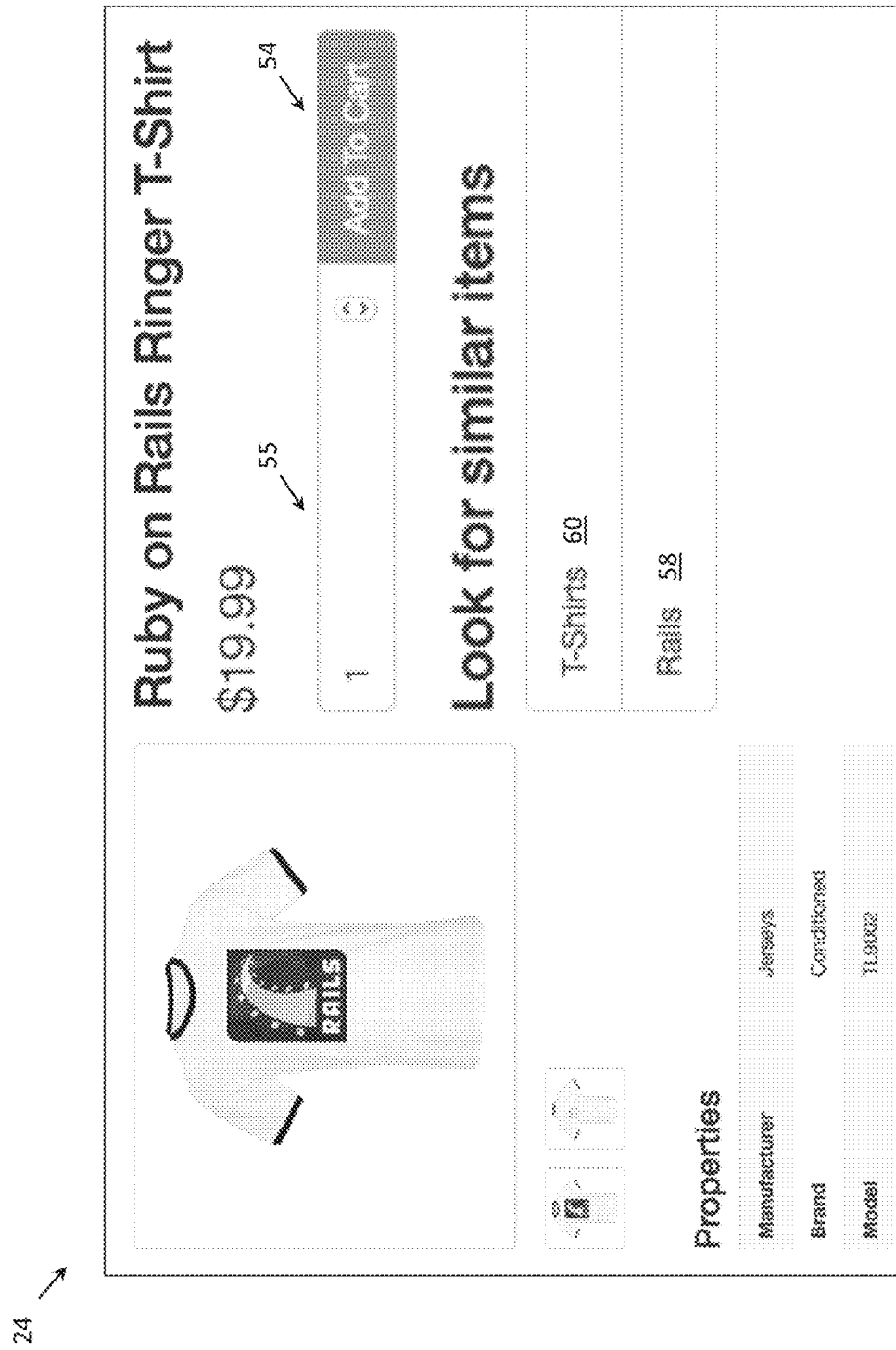

Details of webpage 24 are depicted in a magnified manner in the screenshot of FIG. 1J. Webpage 24 may include additional details of the Ruby on Rails Ringer T-Shirt (e.g., manufacturer, brand, model number, etc.). Webpage 24 may also include "Add To Cart" button 54, along with text box 55 to input a number of items, for the user to purchase the specified number of Ruby on Rails Ringer T-Shirts. If the user decides to continue browsing items instead of making a purchase, the user may select one or more of "T-Shirts" link 60 or "Rails" link 58 to look for items that are similar to the item featured on webpage 24.

Figure 2A:
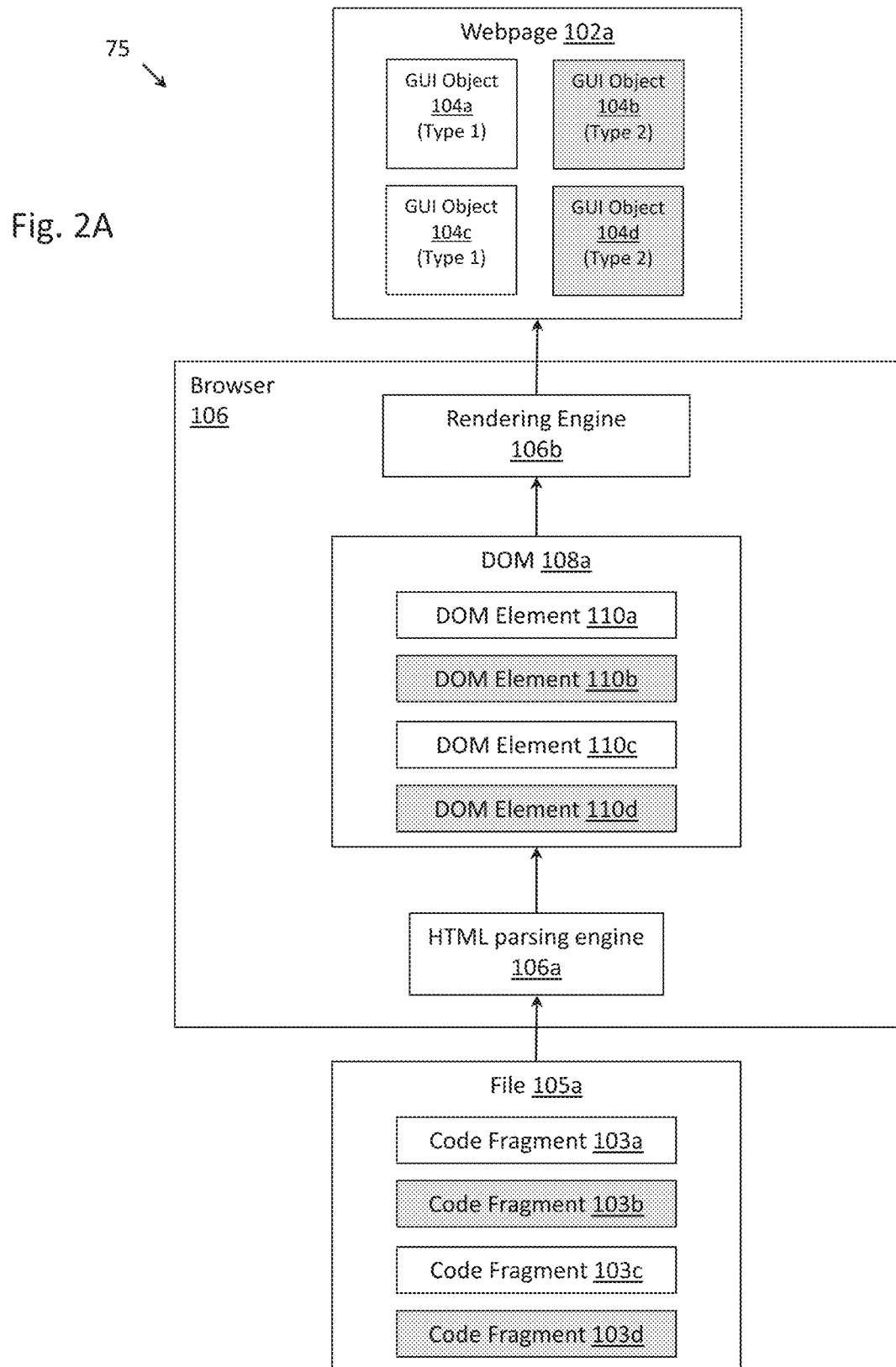
FIG. 2A depicts a block diagram that describes the parsing of a file into a document object model (DOM) and the rendering of the DOM into a webpage (in the context of a web application).
Figure 2B:
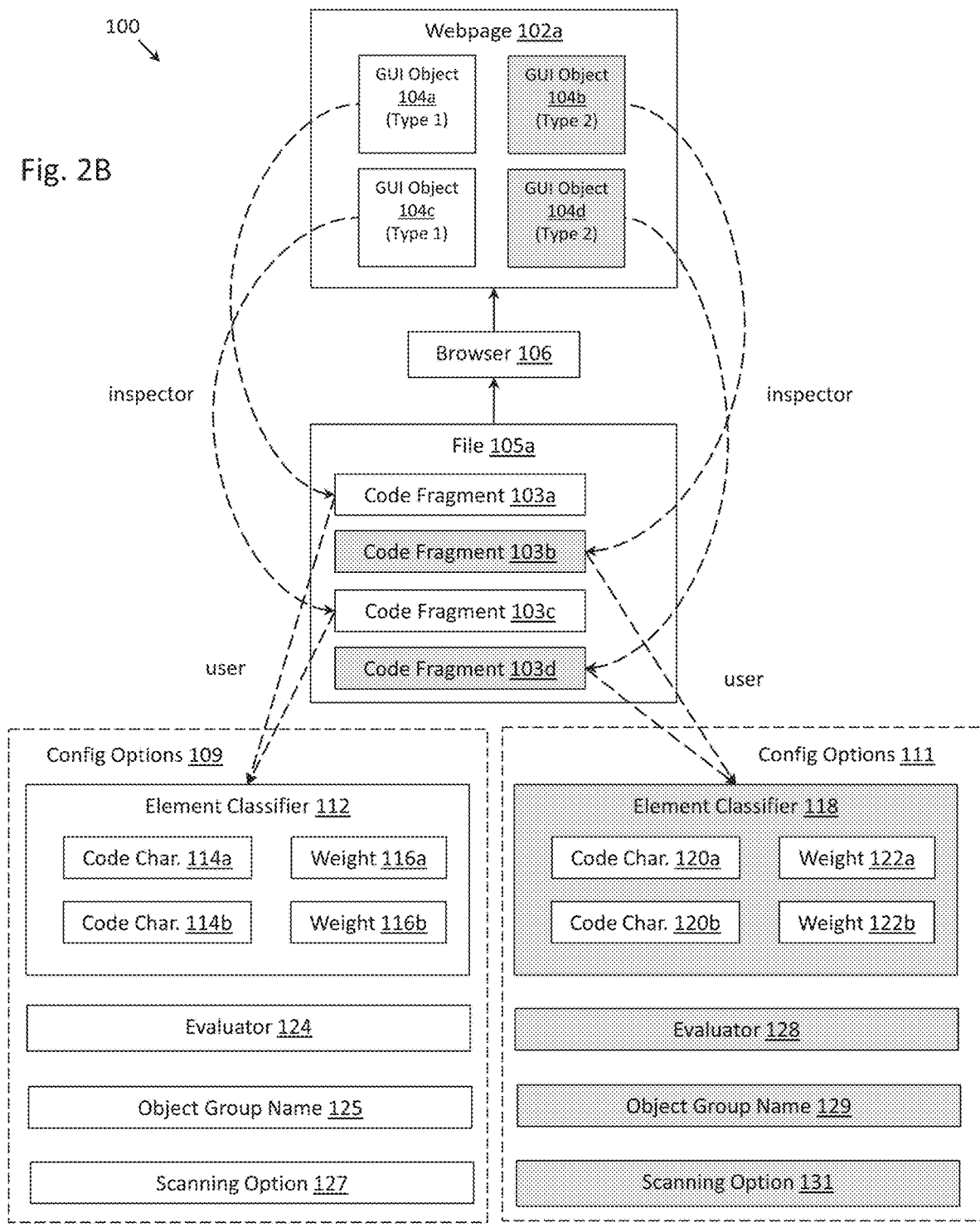
FIG. 2B depicts a block diagram that describes the specification of a first group of configuration options associated with graphical user interface (GUI) objects of a first type, and the specification of a second group of configuration options associated with GUI objects of a second type (in the context of a web application), in accordance with one embodiment of the invention.

Having now completed the description of the simplified website, the modeling of GUI objects of a website (or a mobile application) is now described. A general description of modeling GUI objects will be first provided in FIGS. 2A-8, followed by specific examples of the modeling in FIGS. 9-14 (in the context of the simplified website described in FIGS. 1A-1J). FIGS. 2A and 2B describe the modeling of GUI objects in the context of a web application (e.g. website), and FIGS. 2C and 2D describe how the modeling of GUI objects can be extended to the context of a mobile application.

FIG. 2A depicts block diagram 75 that describes the parsing of file 105a into DOM 108a and the rendering of DOM 108a into webpage 102a. File 105a may an HTML file that is received at a client device. Browser 106 (including HTML parsing engine 106a and rendering engine 106b) at the client device may render file 105a into webpage 102a. Example browsers include Chrome® from Google LLC® of Mountain View, Calif.; Firefox® from the Mozilla Corporation® of Mountain View, Calif.; Safari® from Apple Inc.® of Cupertino, Calif.; and Internet Explorer® from Microsoft, Corporation® of Redmond, Wash.

Webpage 102a may include a plurality of graphical user interface (GUI) objects, such as menu objects, product objects, add-to-cart button objects, etc. In the present example, webpage 102a includes four GUI objects, GUI object 104a, GUI object 104b, GUI object 104c and GUI object 104d, that are presented in an abstract manner. GUI objects 104a and 104c may be GUI objects of a first type (e.g., menu objects), whereas GUI objects 104b and 104d may be GUI objects of a second type (e.g., product objects). For clarity of explanation, GUI objects of type 1 are depicted in white, whereas GUI objects of type 2 are depicted in grey. It should be understood that such greyscale coloring is for clarity of explanation, and that GUI objects 104a-104d may not actually exhibit any difference in greyscale coloring.

GUI objects 104a, 104b, 104c and 104d may be encoded by DOM elements 110a, 110b, 110c and 110d, respectively, from DOM 108a. DOM element 110a may be rendered into GUI object 104a by rendering engine 106b of browser 106; DOM element 110b may be rendered into GUI object 104b by rendering engine 106b of browser 106; and so on. For clarity of explanation, DOM elements corresponding to GUI objects of type 1 are depicted in white, whereas DOM elements corresponding to GUI objects of type 2 are depicted in grey. It should be understood that such greyscale coloring of the DOM elements is for clarity of explanation, and that no greyscale color is actually exhibited by DOM elements.

DOM elements 110a, 110b, 110c and 110d, in turn, may be encoded by code fragments 103a, 103b, 103c and 103d, respectively, from file 105a. The phrase "code fragment" is used to refer to a fragment (or a portion) of code within file 105a (e.g., an HTML file). Code fragment 103a may be transformed into DOM element 110a by HTML parsing engine 106a of browser 106; code fragment 103b may be transformed into DOM element 110b by the HTML parsing engine 106a of browser 106; and so on. A DOM element might conceptually be understood as a reversible transformation of a corresponding code fragment inasmuch as a DOM element is constructed from the tags, attributes and values of the corresponding code fragment and the corresponding code fragment may be extracted or recovered from the DOM element. For clarity of explanation, code fragments corresponding to GUI objects of type 1 are depicted in white, whereas code fragments corresponding to GUI objects of type 2 are depicted in grey. It should be understood that such greyscale coloring of the code fragments is for clarity of explanation, and that no greyscale color is actually exhibited by code fragments.

The modeling of GUI objects may start with a user inspecting one or more webpages (e.g., webpage 102a depicted in block diagram 100 of FIG. 2B) and visually identifying GUI objects within those webpages that fall within certain types or groups. For example, some GUI objects may be menu objects (e.g., allowing a user to navigate to certain categories of products), other GUI objects may be product objects (e.g., allowing a user to navigate to a more detailed description of the product), and so on. In addition to these noted functional cues, there may be additional cues that guide a user into aggregating a certain plurality of GUI objects into one type or group. For example, the visual arrangement of GUI objects (e.g., user interface objects arranged in one row, user interface objects arranged in one column, user interface objects arranged in an array) may indicate to a user that those GUI objects should be grouped together. As another example, similar or identical text font across GUI objects, similar or identical text color, and/or similar or identical text size across GUI objects may also indicate to a user that those GUI objects should be grouped together.

In the example of FIG. 2B, the user may categorize GUI objects 104a and 104c into one group (or one type), and may categorize GUI objects 104b and 104d into another group (or a second type). After identifying group(s) of GUI objects in webpage 102a, the user may view file 105a which encodes for webpage 102a. While browser 106 is typically used to render file 105a into webpage 102a, some browsers may allow the user to view the underlying file 105a which encodes webpage 102a. In the case of the Chrome browser, a developer tool is provided that may allow the user to select an object in the webpage, and view the corresponding portion of file 105a (e.g., view a corresponding "code fragment") that encodes the selected object. To access the developer tool in Chrome, the user may select the "view" menu of the Chrome browser, followed by the "Developer" option, followed by the "Inspect Elements" option. In the example of FIG. 2B, the user may select object 104a in webpage 102a, and the developer tool will return or highlight code fragment 103a; the user may select object 104b in webpage 102a, and the developer tool will return or highlight code fragment 103b; and so on.

Next, by analyzing code fragments that encode GUI objects of the same type (e.g., code fragment 103a and code fragment 103c), the user may identify characteristics (hereinafter, "code characteristics") that are common between the code fragments that encode the GUI objects of the same type. As an example, the following code fragments both encode GUI objects that a user has visually identified to be menu objects:

Code fragment 1: <a class="list-group-item" href="/t/bags">Bags</a>

Code fragment 2: <a class="list-group-item" href="/t/mugs">Mugs</a>

In this example, the user may identify that the tag <a> is common between the two code fragments (i.e., a first code characteristic) and the tag attribute—class="list-group-item"—is also common between the two code fragments (i.e., a second code characteristic).

A group of code characteristics may, in part, define a DOM element classifier (called an "element classifier" for the sake of conciseness). From the above example, it is understood that code characteristics may include one or more tags and/or attributes of the tags. In one embodiment, the element classifier may additionally be defined by a weight associated with one or more of the code characteristics, the weight specifying the importance (or discernment ability) of the code characteristic. For instance, if 9 out of 10 code fragments encoding 10 GUI objects of a first type have a first code characteristic, the first code characteristic may be assigned a weight of 90. As another example, if 5 out of the 10 code fragments have a second code characteristic, the second code characteristic may be assigned a weight of 50. In the example of FIG. 2A, code characteristics 114a and 114b are used to define element classifier 112, and code characteristics 120a and 120b are used to define element classifier 118. Code characteristics 114a and 114b are associated with weights 116a and 116b, respectively; and code characteristics 120a and 120b are associated with weights 122a and 122b, respectively.

Once an element classifier has been defined, it may be used to identify one or more DOM elements in a DOM that are likely to encode a GUI object of a certain type. More specifically, an element classifier computes a likelihood of match score for each DOM element. The likelihood of match score may be calculated as follows:

$$\frac{1}{N}\sum_{i=1}^{N} 1(\text{code } char_i \text{ exists in } DOM \text{ element}) *$$

weight of code $char_i$, where 1(•) is the indicator function and equals 1 if the argument is true and equals 0 otherwise, N equals the number of code characteristics, and i indexes the code characteristics.

The likelihood of match score is then compared with a threshold. If the likelihood of match score is greater than the threshold, the DOM object is determined to be a match (i.e., considered to encode a GUI of a certain type). Otherwise, the DOM object is determined to not be a match (i.e., not considered to encode a GUI object of a certain type).

To clarify, an element classifier ideally correctly identifies a matching DOM object with a high percentage of accuracy. However, an element classifier may occasionally make errors. For example, an element classifier configured to identify DOM objects that encode for menu objects might occasionally make an error, and instead identify a DOM object that encodes for a product object. Therefore, it is more precise to state that an element classifier identifies DOM object in a DOM that are "likely" to encode a GUI object of a certain type, rather than to say that an element classifier identifies DOM objects in a DOM that always encodes a GUI object of a certain type.

The user may also specify one or more evaluators (also called validators) to perform an evaluation on DOM objects identified by each element classifier. In the example in FIG. 2A, evaluator 124 performs an evaluation on the DOM objects identified by element classifier 112, and evaluator 128 performs an evaluation on the DOM objects identified by element classifier 118. The evaluators may evaluate attributes specified in DOM objects with respect to certain conditions. For example, an evaluator may evaluate a DOM object to determine whether the price of a product object (as specified in a DOM object encoding the product object) is greater than 0. As another example, an evaluator may evaluate whether the anchor text of a link (as specified in a DOM object) appears in the webpage that follows the anchor text being selected (or clicked). Additional examples of evaluators will be provided below in FIGS. 6-8.

Object group name 125 may be specified by the user to identify the GUI objects that are indirectly classified by element classifier 112 (i.e., since element classifier 112 classifies the underlying DOM elements, it indirectly classifies the GUI objects that are encoded by the respective DOM elements). For instance, object group name 125 may be "menu" if the user visually identifies objects 104a and 104c to be menu objects. Similarly, object group name 129 may be specified by the user to identify the GUI objects that are indirectly classified by element classifier 118. For instance, object group name 129 may be "product" if the user visually identified objects 104b and 104d to be product objects.

Scanning option 127 may be specified by the user to manage the use of element classifier 112 and scanning option 131 may be specified by the user to manage the use of element classifier 118 during the modeling of the website (i.e., the construction of the state machine). For instance, if the "one per page" scanning option were enabled in scanning option 127, element classifier 112 will be executed at most one time in a webpage (or more precisely executed at most one time in the DOM that encodes the webpage). Such scanning option addresses the state space explosion problem (in which the size of the state space becomes unmanageable) by preventing the creation of unnecessary edges and states. As another example, if the "once per app" scanning option were enabled in scanning option 127, all identical GUI objects which are indirectly identified by element classifier 112 will lead to the same resulting state. Such scanning option addresses the state space explosion problem by combining identical states (or preventing the creation of duplicate states). Scanning options will be described in more detail below in association with the construction of state machines in FIGS. 11A-G and 15A-G.

Configuration options 109 may include the collection of element classifier 112, evaluator 124, object group name 125 and scanning option 127 (i.e., all associated with the first type of GUI object). Configuration options 111 may include the collection of element classifier 118, evaluator 128, object group name 129 and scanning option 131 (i.e., all associated with the second type of GUI object). Configuration options 109 may be called a "Smart Tag", and Configuration options 112 may be called another "Smart Tag". A "Smart Tag" is an extension of conventional HTML tags, in which GUI objects are each tagged with metadata known as "tags" (e.g., <a> to tag links, <p> to tag paragraphs, <img> to tag images, etc.). The instant configuration options in some respects are "smarter" or more sophisticated than these existing HTML tags. For example, all links in HTML are tagged with <a>. However, with Smart Tags, one group of links may be assigned to one Smart Tag and another group of links may be assigned to another Smart Tag, so the tagging performed by Smart Tags may be more fined-grained than existing HTML tags. Further, Smart Tags may have associated evaluations and scanning options, which are not provided in conventional HTML tags.

Figure 2C:
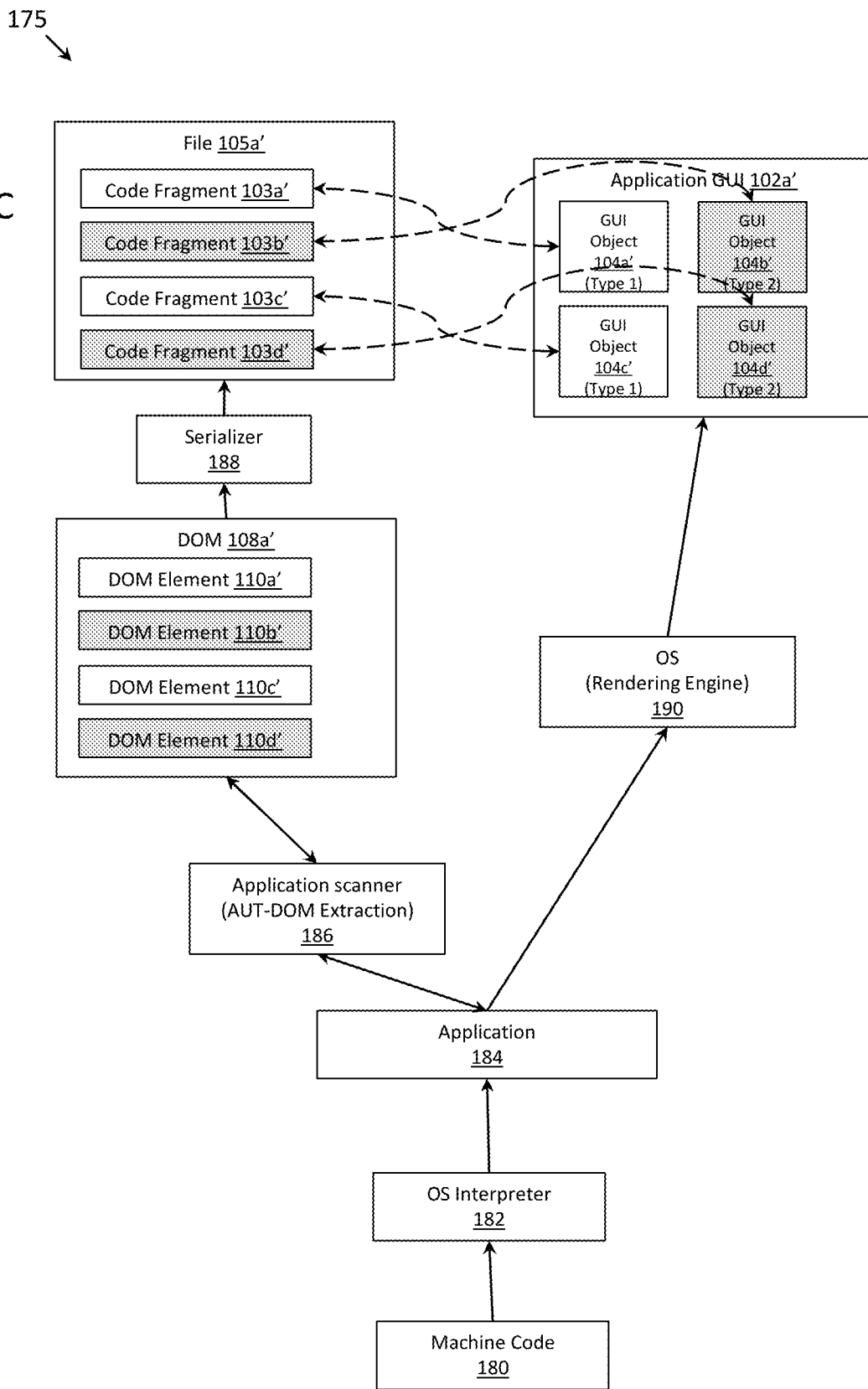
FIG. 2C depicts a block diagram that describes the generation of a file (e.g., XML file) and an application GUI from the machine code of a mobile application.
Figure 2D:
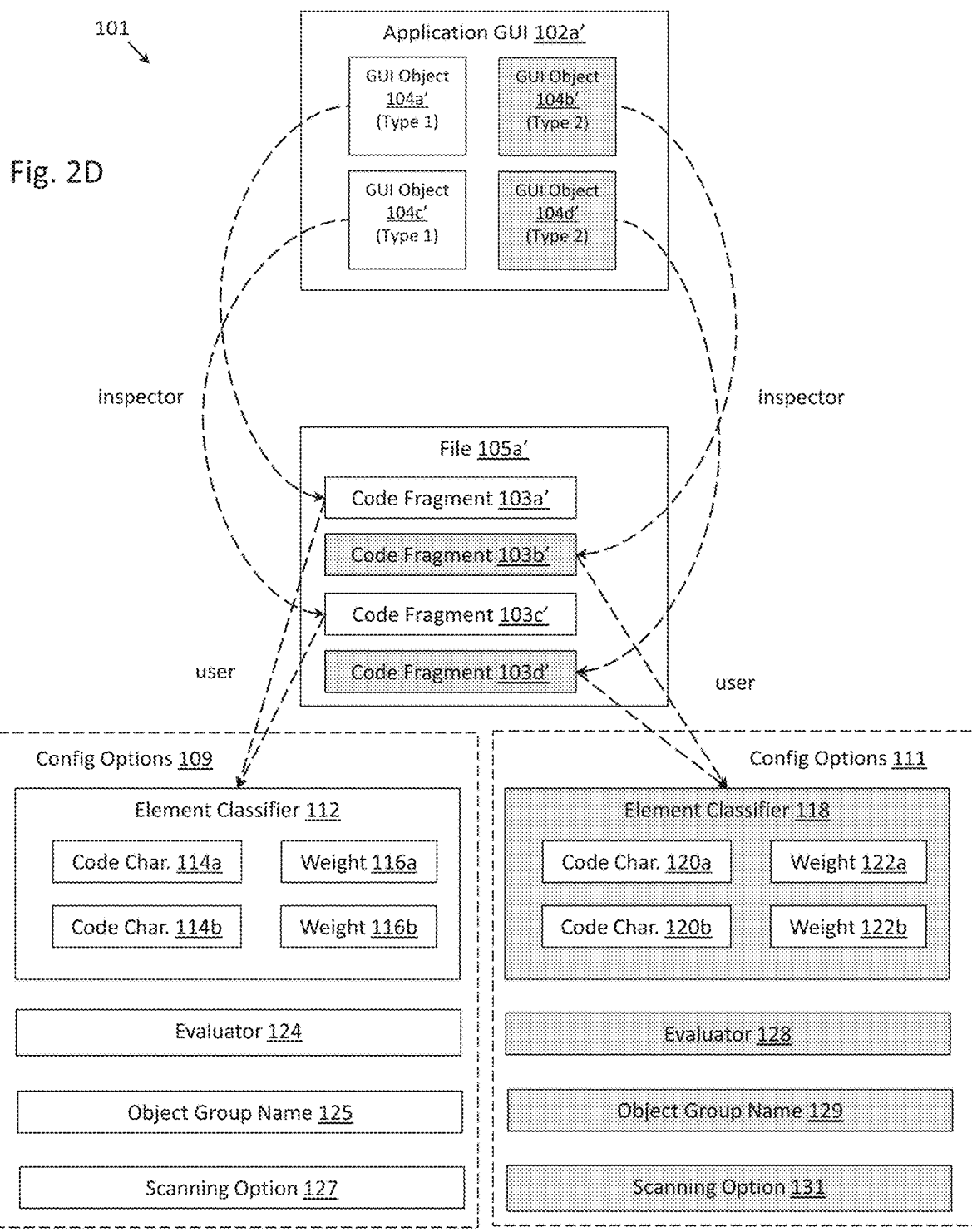
FIG. 2D depicts a block diagram that describes the specification of a first group of configuration options associated with graphical user interface (GUI) objects of a first type, and the specification of a second group of configuration options associated with GUI objects of a second type (in the context of a mobile application), in accordance with one embodiment of the invention.

FIGS. 2C and 2D describe how the modeling of GUI objects for a web application (e.g., website) can be extended to the modeling of GUI objects for a mobile application. FIG. 2C depicts a block diagram that describes the generation of file 105a' (e.g., XML file) and an application GUI 102a' from machine code 180 of a mobile application. A mobile application refers that an application that is intended to be executed on a mobile device, such as a smart phone, a tablet, etc. However, it is understood that the herein described process to model GUI objects of a mobile application need not be performed while the mobile application is executing on a mobile device. Instead, the modeling may be performed while the mobile application executes on any computing device (such as a server, a desktop computer, etc.).

Machine code 180 may be interpreted by an interpreter 182 of an operating system of the computing device into application 184 (e.g., a mobile application). Application scanner 186 may generate DOM 108a' from application 184. DOM 108a' may include one or more DOM elements 110a', 110b', 110c' and 110d'. Serializer 188 may generate file 105a' (e.g., an XML file) from DOM 108a', in which code fragment 103a' corresponds to DOM element 110a', code fragment 103b' corresponds to DOM element 110b', code fragment 103c' corresponds to DOM element 110c', and code fragment 103d' corresponds to DOM element 110d'. It is noted that file 105a' may be generate for the purpose of being viewed and analyzed by a user, but it may not be possible to render file 105a'. Instead, application 184 may be rendered by rendering engine 190 of the operating system of the computing device into application GUI 102a'. Application GUI 102a' may include a plurality of GUI objects. In the present example, application GUI 102a' includes GUI object 104a' (which corresponds to code fragment 103a'), GUI object 104b' (which corresponds to code fragment 103b'), GUI object 104c' (which corresponds to code fragment 103c'), and GUI object 104d' (which corresponds to code fragment 103d').

The process to model GUI objects of a mobile application is from this point onwards quite similar to previously described process to model GUI objects of a web application. Application GUI 102a' from FIG. 2D corresponds to webpage 102a from FIG. 2B and file 105a' from FIG. 2D corresponds to file 105a from FIG. 2B. A user may use an inspector tool (e.g., provided by the open source automation tool Appium®) to view code fragments that correspond to each of the GUI objects, in a manner similar to the inspector tool described in FIG. 2B. By analyzing code fragments 103a' and 103c' that encode GUI objects of the first type, the user may identify code characteristics that are common between the code fragments that encode the GUI objects of the first type. By analyzing code fragments 103b' and 103d' that encode GUI objects of the second type, the user may identify code characteristics that are common between the code fragments that encode the GUI objects of the second type. The remainder of the discussion returns to the context of a web application, but it should now be apparent how concepts discussed herein could readily be extended to a mobile application, since there is a correspondence between file 105a of a web application and file 105a' of a mobile application, a correspondence between DOM 108a of a web application and DOM 108a' of a mobile application; and webpage 102a of a web application and application GUI 102a' of a mobile application.

In fact, the above-described modeling of GUI objects for a mobile application is not specific to only mobile applications, but may be applied to any application, such as a desktop native application, that has an associated application scanner.

Figure 3:
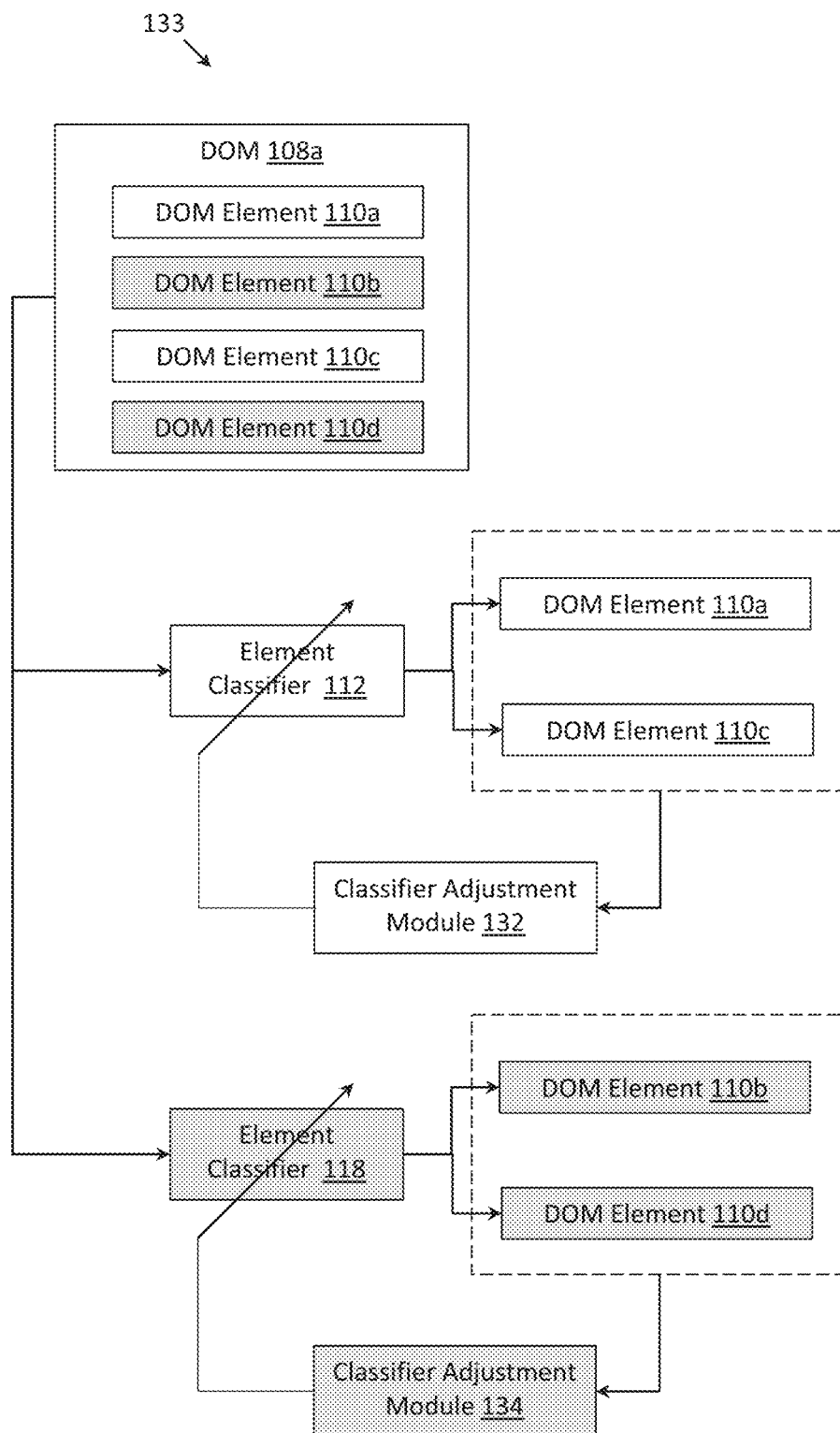
FIG. 3 depicts a block diagram illustrating an application of element classifiers, in which the element classifiers are used to identify DOM elements that correspond to GUI objects of a certain type, and also a feedback mechanism (e.g., also known as "self healing") in which identified DOM elements are used to update parameters of the respective element classifiers, in accordance with one embodiment of the invention.

FIG. 3 depicts block diagram 133 illustrating an application of element classifiers 112 and 118. DOM element 108a is provided as input to element classifier 112 and element classifier 118. Element classifier 118 inspects each of the DOM elements so as to identify zero or more DOM elements that match one or more the code characteristics specified in element classifier 118.

In the example of FIG. 3, the DOM that is provided as input to the element classifiers is, for simplicity of explanation, the same DOM that encoded the webpage that was used by the individual to define element classifiers 112 and 118. Therefore, such an application of the element classifiers could be considered a "sanity check". The individual configured the element classifiers with a certain classification scheme of webpage 102a in mind (indirectly classify objects 104a and 104c in one group, and indirectly classify objects 104b and 104d in another group), and the application of the element classifiers on DOM 108a either shows that the element classifiers were configured properly (if the classification scheme that the individual had in mind is followed) or shows that the element classifiers were not configured properly (if the classification scheme that the individual had in mind is not followed). In the present example, element classifier 112 identifies DOM elements 110a and 110c, and element classifier 118 identifies DOM elements 110b and 110d, which is the intended behavior. More typically, the input to the element classifiers will be one or more DOMs with a previously unknown classification of DOM elements, and the element classifiers will be used to indirectly classify the GUI objects in the webpage.

Classifier adjustment module 132 is configured to automatically revise element classifier 112 (in a scheme also known as "self-healing") based on common characteristics of the identified DOM elements. The conceptual idea of the classifier adjustment module is to make the element classifier adapt or evolve with the DOM elements (associated with GUI objects of a certain type) which might be evolving. For example, DOM elements (associated with GUI objects of a certain type) might initially be characterized by two common code characteristics. However, one of the code characteristics could change over time (e.g., due to updates in the web application), and the classifier adjustment module is used to modify the element classifier to account for the change in the code characteristic. Using an analogy, suppose birds are initially characterized by the characteristics beak, feathers, tail, wings, lay eggs, ability to fly, etc. Over time, the birds could lose their ability to fly (e.g., due to the lack of predators). In the "self-healing" scheme, these evolved creatures without the ability to fly would still be identified as birds, and in this sense the element classifier evolves along with the DOM elements that are being classified. It is noted that the classifier adjustment module is an optional component and may be enabled or disabled as desired by the user.

In the present example of FIG. 3, there could be a refinement in the element classifier. For instance, the individual configuring element classifier 112 may have only identified two code characteristics that are common among DOM elements 110a and 110c. However, there may be a third common code characteristics that the individual failed to identify. Classifier adjustment module 132 may identify this third common code characteristic and modify element classifier 112 to include this third common code characteristic.

More generally, classifier adjustment module 132 may determine a set of code characteristics and its associated weights based on the set of DOM elements identified by element classifier 112. In a procedure similar to what may be performed by an individual, classifier adjustment module 132 may identify code characteristics that are common to two or more of the set of DOM elements identified by element classifier 112. It is noted that there may be certain aspects of DOM elements that are more important to be included as code characteristics. Less important aspects may include the class (because many DOM elements may share the same class), whereas more important aspects may include custom attributes (because it is more common that DOM elements of different types are labeled with their own unique custom attributes). The more important aspects may be chosen over the less important aspects.

For each of the identified code characteristics, an associated weight may be calculated as the number of DOM elements in the set that included the code characteristics divided by the total number of DOM elements in the set. Once the code characteristics and weights have been determined by classifier adjustment module 132, the existing set of code characteristics and its associated weights stored in element classifier 112 may be updated in light of the code characteristics and weights determined by classifier adjustment module 132, as necessary. For example, for an existing code characteristic with weight A, if the classifier adjustment module 132 determines a new weight of B, the weight of the existing code characteristic may be updated as the average of A and B. As another example, for an existing code characteristic, if the classifier adjustment module 132 determines a new weight of 0, the code characteristic might be deleted. A similar description applies to classifier adjustment module 134.

FIGS. 4A and 4B depict a more detailed example of the training of element classifier 112. At a first time (e.g., time 1) prior to the adjustment by classifier adjustment module 132, element classifier 112 may include code characteristics 114a, 114b and its associated weights 116a, 116b, respectively. At a second time (e.g., time 2) after the adjustment by classifier adjustment module 132, element classifier 112 may include code characteristics 114a, 114b, 114c and its associated weights 116*a*, 116*b'*, 116*c*, respectively. Weight 116*b* may have been improperly entered by a user (e.g., mistakenly entered "09", instead of "90"). Classifier adjustment module 132 may analyze DOM elements 110*a* and 110*c* and find no reason for such a low weight for code characteristic 114*b* and thus increase the weight to "50". Additionally, classifier adjustment module 132 may determine code characteristic 114*c* that characterizes DOM elements 110*a* and 110*c*. Upon determining that code characteristic 114*c* has not yet been included in element classifier 112, classifier adjustment module 132 may insert code characteristic 114*c* along with its associated weight 116*c* into element classifier 112.

In FIG. 4B, element classifier 112 processes file 108*b* with DOM elements 110*e*-110*i*. Element classifier 112 identifies DOM elements 110*e*, 110*g* and 110*h* as DOM elements which are likely to encode the first type of GUI object. Classifier adjustment module 132 analyzes DOM elements 110*e*, 110*g* and 110*h* and based on its analysis, adjusts element classifier 112. In the specific example of FIG. 4B, classifier adjustment module 132 sets the weight of code characteristic 114*b* to 0 (equivalently removing code characteristic 114*b*), and inserts code characteristic 114*d* with its associated weight 116*d*. At the implementational level, it is more efficient to remove code characteristics with a weight of 0, as it eliminates the consideration of that code characteristic entirely. One possible scenario for such adjustment to element classifier 112 is the replacement of one attribute (formerly captured in code characteristic 114*b*) for another attribute (now captured in code characteristic 114*d*) in the DOM elements that correspond to for the first GUI object.

Figure 5:
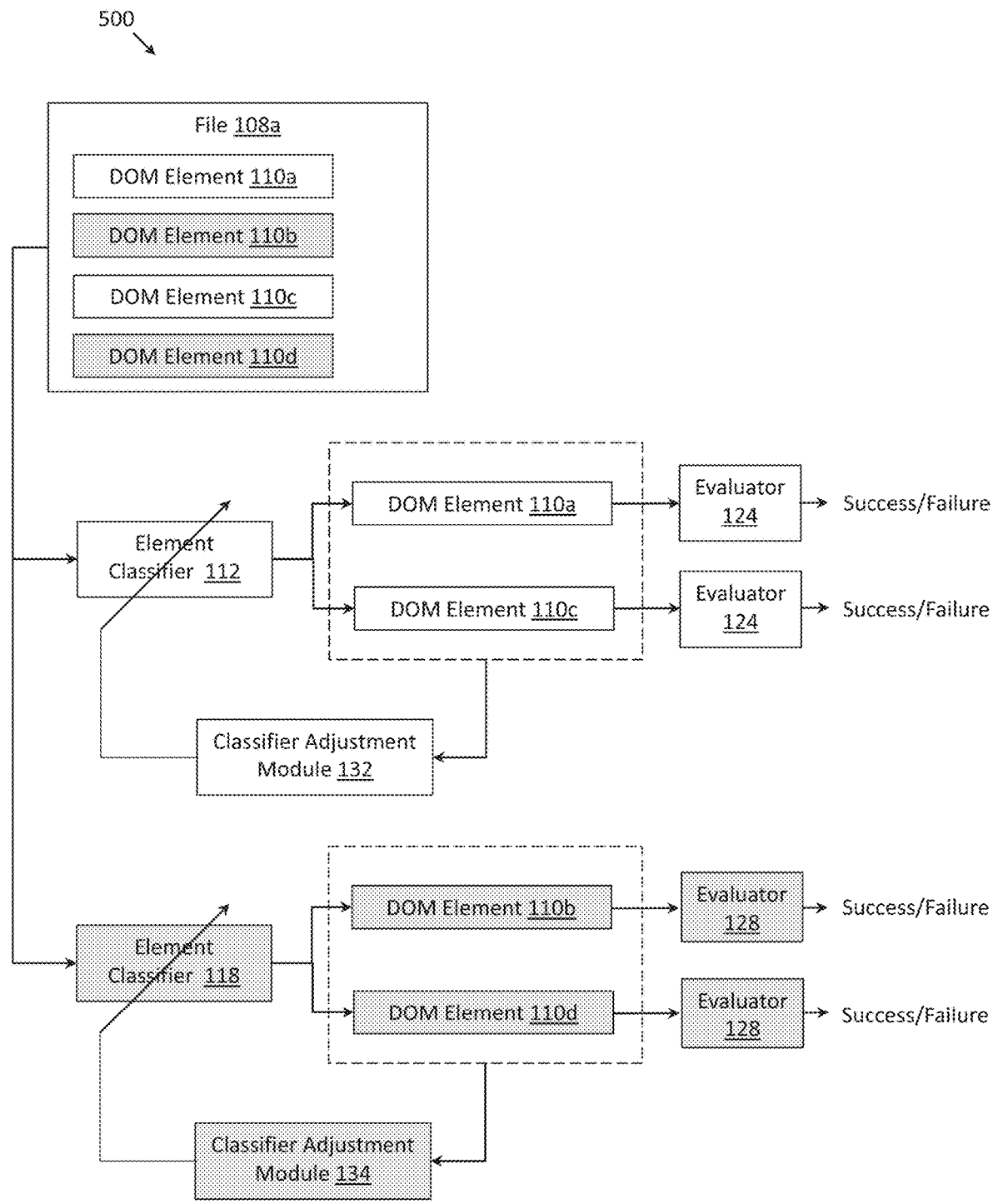
FIG. 5 depicts a block diagram of a system in which evaluators are used to perform an evaluation on DOM elements identified by element classifiers, in accordance with one embodiment of the invention.

FIG. 5 depicts block diagram 500 in which evaluators 124, 128 are used to perform an evaluation on identified DOM elements. DOM elements 110*a* and 110*c* are evaluated by evaluator module 124, which returns the output of success or failure. Similarly, DOM elements 110*b* and 110*d* are evaluated by evaluator 128, which returns the output of success or failure. A failed output of the evaluators may be returned to the user to alert the user of errors, failures, or other unexpected behavior of the webpage. Examples of evaluators are now provided in FIGS. 6-8.

Figure 6:
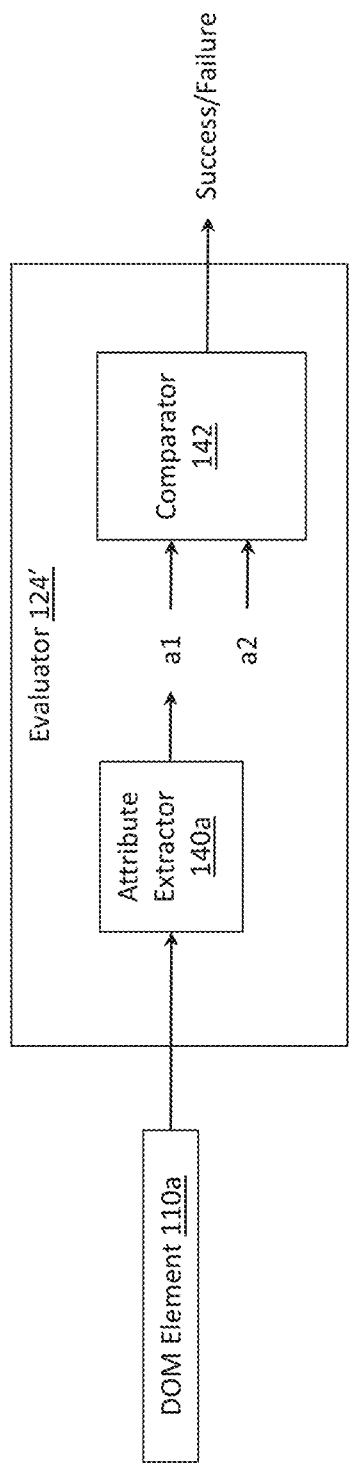
FIG. 6 depicts a block diagram of a particular evaluator in which an attribute of a DOM element is compared to a predetermined (or user provided) attribute, in accordance with one embodiment of the invention.

FIG. 6 depicts a block diagram of evaluator 124' in which an attribute of DOM element 110*a* is compared to a predetermined (or user provided) attribute. Attribute extractor 140*a* extracts attribute a1 from DOM element 110*a* and comparator 142 compares the extracted attribute a1 to a predetermined attribute a2. The particular comparison may be an equality comparison "=", a greater than comparison ">", a less than comparison "<", or other comparison. For text comparisons, the particular comparison may be "match", "does not match", "contains text", "does not contain text", etc. If the comparison evaluates to true, comparator 142 may return the output of "success"; otherwise, comparator 142 may return the output of "failure". The example of comparing the price of a product to 0 was already discussed above.

Figure 7:
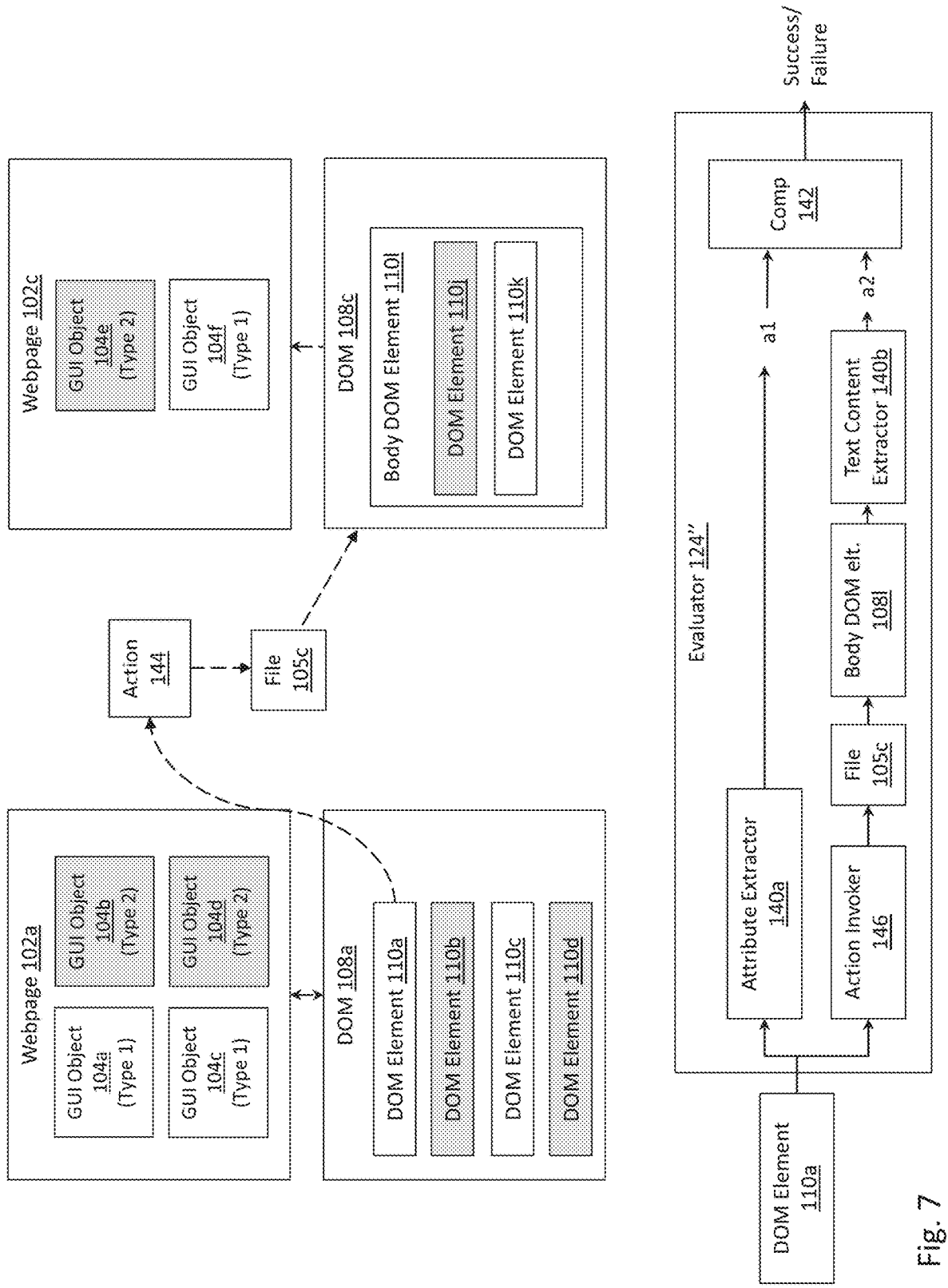
FIG. 7 depicts a block diagram of a particular evaluator in which an attribute of a DOM element is compared to an attribute extracted from a resulting webpage, in accordance with one embodiment of the invention.

FIG. 7 depicts a block diagram of evaluator 124" in which an attribute of DOM element 110*a* is compared to an attribute extracted from the "text content" of the body DOM element of a resulting webpage, in which the "text content" refers to the text of the body DOM element that might be rendered (depending on fonts and layouts). In the context of a body DOM element, the "text content" the body DOM is equivalent to the "textContent property" of the body DOM element.

Before describing the implementation of evaluator 124" in detail, a motivating example is first provided. Suppose a link is "Ruby on Rails Bag", and the resulting webpage provides details of the Ruby on Rails Bag. The instant evaluator may extract the anchor text from the code fragment that encodes the link "Ruby on Rails Bag" and determine whether the extracted anchor text (i.e., "Ruby on Rails Bag") is present in the text content of the body DOM of the resulting page. If so, the evaluation is determined to be a success; otherwise the evaluation is determined to be a failure (e.g., might indicate a broken link).

Now returning to the discussion of evaluator module 124", attribute extractor 140*a* may first extract attribute a1 from DOM element 110*a* (e.g., an anchor text). Action invoker 146 in evaluator module 124" may then perform action 144 (e.g., click) on DOM element 110*a*. File 105*c* may be returned in response to the action being performed on DOM element 110*a*. File 105*c* may be parsed into DOM 108*c* (which in turn may be rendered into webpage 102*c*—which may not factor into the evaluation). DOM 108*c* may contain body DOM element 110l, which in turn may contain DOM elements 110*j* and 110*k*. Text content extractor 140*b* may extract the text content (i.e., a2) from the body DOM element 108l. The text content a2 and attribute a1 may be provided to comparator 142, which determines whether attribute a1 is present in the text content. If so, comparator 142 returns the output of success; otherwise comparator 142 returns the output of failure.

Figure 8:
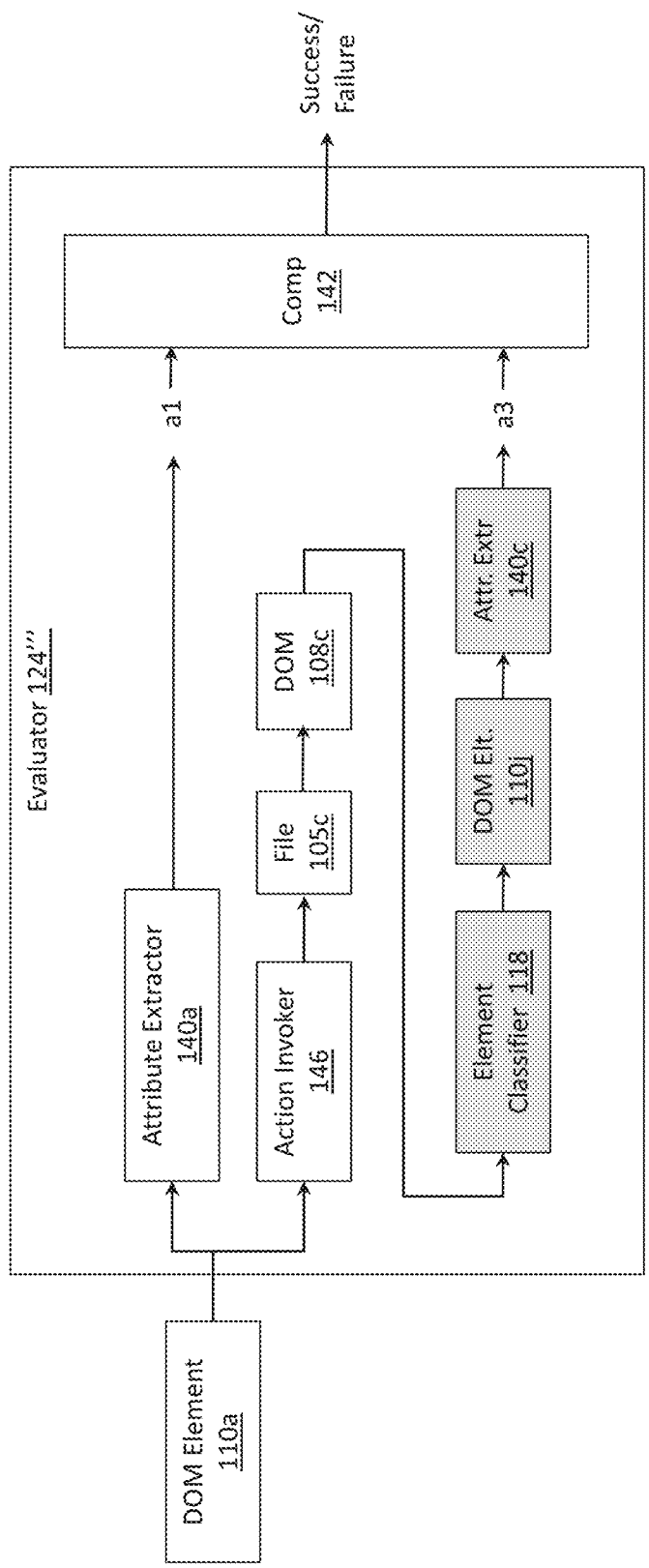
FIG. 8 depicts a block diagram of a particular evaluator module in which an attribute of a code fragment is compared to an attribute extracted from a DOM element of a resulting webpage, in accordance with one embodiment of the invention.

FIG. 8 depicts a block diagram of evaluator 124' in which an attribute of DOM element 110*a* is compared to an attribute extracted from DOM element 110*j* of the resulting webpage (i.e., webpage that is returned as a result of performing an action on DOM element 110*a*). Similar to evaluator 124", attribute extractor 140*a* may first extract attribute a1 from DOM element 110*a*. Action invoker 146 may then perform action 144 (e.g., click) on DOM element 110*a*. File 105*c* may be returned in response to the action being performed on DOM element 110*a*. File 105*c* may be parsed into DOM 108*c*, which may contain body DOM element 110l, which in turn may contain DOM elements 110*j* and 110*k*.

Rather than determining whether attribute a1 is present anywhere in the text content of body DOM element 110l, (as in the example of FIG. 7), evaluator 124''' determines whether attribute a1 is present in a particular DOM element of body DOM element 110l. To contrast with the previous example in which "Ruby on Rails Bag" was determined to be present anywhere in the resulting webpage, the current example may determine whether "Ruby on Rails Bag" is, for example, the title of the resulting webpage (in which case element classifier 118 would be configured to identify DOM elements that correspond to titles). In the example of FIG. 8, DOM 108*c* is processed by element classifier 118 which identifies DOM element 110*j*. Attribute extractor 140*c* then extracts attribute a3 from DOM element 110*j*, and comparator 142 compares attributes a1 and a3. Assume for the example of FIG. 8 that the comparison is an equality comparison, so if attribute a1 equals attribute a3, comparator 142 returns the output of success; otherwise, comparator 142 returns the output of failure.

The modeling of GUI objects will now be described in the context of webpages 10, 12, 18 and 19, depicted again in FIGS. 9A, 9C, 9E and 9G, respectively, with additional annotations. It is intended that the description of a specific example of the modeling of GUI objects will help elucidate the concepts previously explained in block diagram 100 of FIG. 2 (i.e., the creation of the Smart Tags).

Definition of the Menu Smart Tag

As previously stated, in the first step of the process to model GUI objects, an individual may inspect one or more webpages to categorize or group the GUI objects displayed in the webpages. In webpages 10 and 12, depicted in FIGS. 9A and 9C, respectively, the individual may identify "Bags" 28, "Mugs" 30 and "Clothing" 32 as menu objects (e.g., based on their respective functions to access categories of products). The individual may then use the developer tools of the Chrome browser (or other browser) to view the code fragments which encode each of these objects. The developer tool may reveal code fragments 103*j*, 103*k* and 103*l* (see FIGS. 9B and 10B) associated with "Bags" menu object 28, "Mugs" menu object 30 and "Clothing" menu object 32, respectively.

Figure 10A:
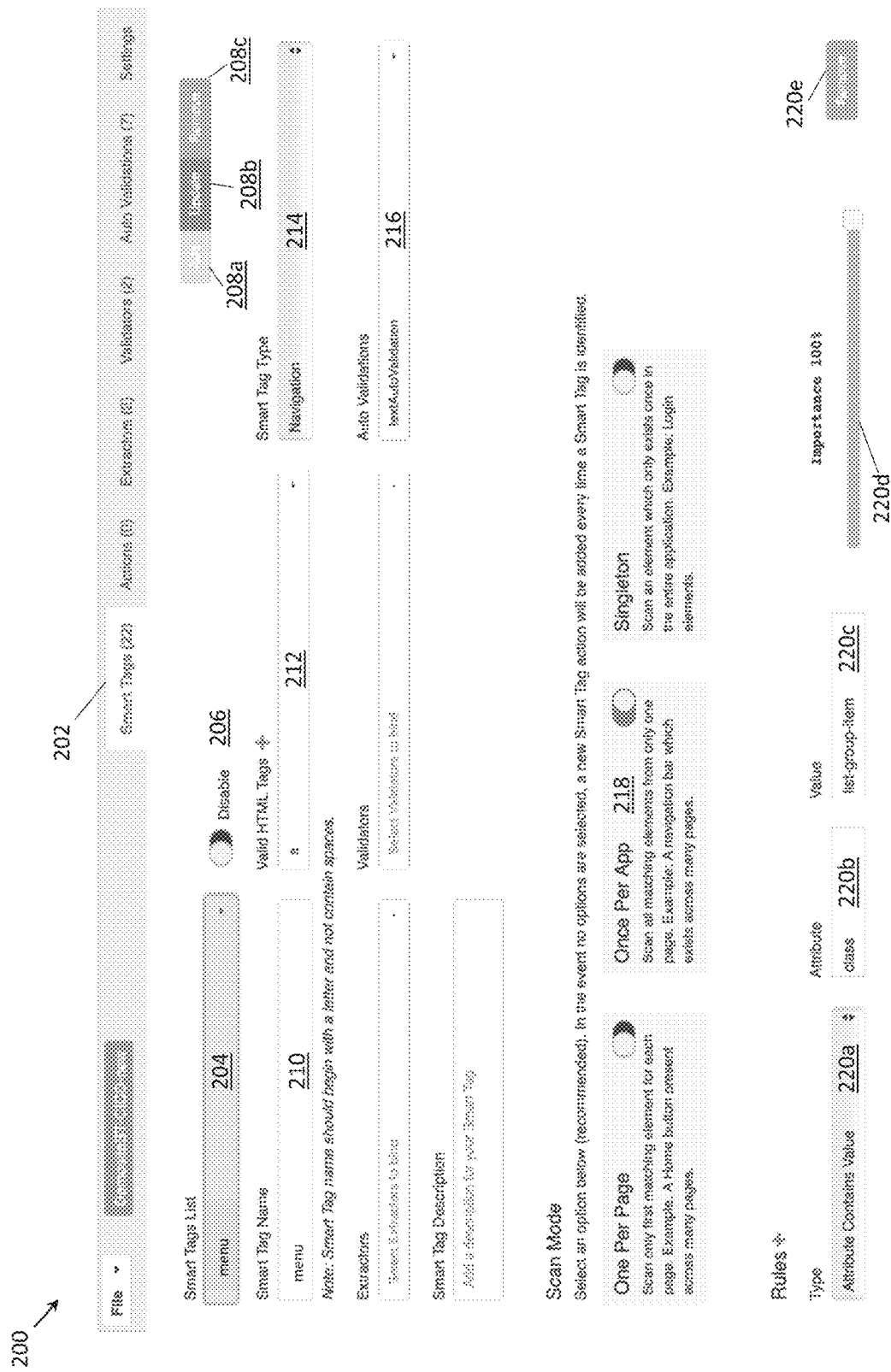
FIG. 10A depicts a screenshot of a user interface for configuring an element classifier for identifying DOM elements encoding menu objects and its associated evaluator and scanning option, in accordance with one embodiment of the invention.

The user interface depicted in screenshot 200 of FIG. 10A may be accessed by the selection of Smart Tags tab 202, and may be used to input configuration options associated with menu objects. For the sake of brevity in explanation, all the configuration options associated with the menu objects have already been entered in the user interface, and explanation will now be provided as to the meaning of each of the fields. To input the configuration options from scratch, the individual may select add button 208*a*, which would display a similar user interface, except with all fields/options being blank. In the present example, update button 208*b* is selected, allowing all fields/options to be updated. If for some reason, all configuration options associated with menu objects should be removed, remove button 208*c* may be selected.

Dropdown menu 204 may display a list of previously created Smart Tags, analogous to configuration options 109 and 111 depicted in FIG. 2. In the instant example, the "menu" Smart Tag was already created to automatically identify DOM elements that correspond to menu objects such as "Bags" menu object 28, "Mugs" menu object 30 and "Clothing" menu object 32, so "menu" appears in dropdown menu 204.

"Disable" toggle button 206 may allow enabling or disabling the instant Smart Tag. Enabling the instant Smart Tag will enable the automatic identification and evaluation of DOM elements that correspond to menu objects in webpages during the modeling of a website (i.e., during process of creating the state machine model). Disabling the instant Smart Tag will disable the automatic identification and evaluation of DOM elements that correspond to menu objects in webpages during the modeling of a website. In the current example, the menu Smart Tag is enabled. Field 210 may allow the designation of a Smart Tag name, analogous to object group names 125, 129 in FIG. 2. In the instant example, the Smart Tag name is specified as "menu". Dropdown menu 212 may allow the designation of a valid HTML tag (or an XML tag in the case of a mobile application) that is associated with the menu objects. Code fragments 103*j/k/l* (as shown in FIGS. 9B and 9D) all include the HTML tag <a> associated with links, so "a" is selected in dropdown menu 212. The valid HTML tag is one example of the previously described code characteristics.

Dropdown menu 214 may allow the designation of a Smart Tag type that is associated with the menu objects. The Smart Tag type determines how edges are created from states, whether with additional user input or without additional user input. Choices in dropdown menu 214 include "Prop", "Navigation", "Action", "Radio", "Check", "Select", "Form", "Text", "Menu", "Search", "Hover", "Noise", "Drag" and "Drop".

The Smart Tag type of "Prop" is used to label DOM elements that may correspond to the parent and children of other Smart Tags (and may enable Rules such as "Child Tag", "Parent Tag", "Parents Tag", "Child Smart Tag", "Parent Smart Tag" and "Parents Smart Tag", as will be described below), and may be used to characterize a state (as in the title Smart Tag described below). GUI objects of the "Prop" Smart Tag type are not clicked on during the blueprint generation process and are not presented in the "inputs found" during the blueprint creation process (i.e., do not require any user input).

The Smart Tag type of "Navigation" is used to label DOM elements corresponding to links that should be automatically clicked during the blueprint generation process, and is the most common type of Smart Tag. GUI objects of the "Navigation" Smart Tag type do not require any user action during the blueprint creation process, and consequently are not presented in the "inputs found" during the blueprint creation process.

The Smart Tag type of "Action" is used to label DOM elements corresponding to links that should not be automatically clicked during the blueprint generation process. Smart Tags of this type are presented in the "inputs found" during the blueprint creation process and prompt the user for instruction on whether the link should be clicked/not clicked and/or whether the link should be clicked as part of a sequence of custom actions, as will be described in the example of FIG. 12-14.

The Smart Tag type of "Radio" is used to label DOM elements corresponding to radio buttons that require user input. GUI objects of the "Radio" Smart Tag type are presented in the "inputs found" during the blueprint creation process, and require the user's input as to whether zero or more of the radio buttons should be selected. In the blueprint creation process, each selected radio button may result in the creation of a new edge from the current state.

The Smart Tag type of "Check" is used to label DOM elements corresponding to checkboxes that require user input. GUI objects of the "Check" Smart Tag type are presented in the "inputs found" during the blueprint creation process, and require the user's input as to whether the checkbox should be selected or not.

The Smart Tag type of "Hover" is used to label a DOM element corresponding to a GUI object that accepts a hover action. GUI objects of the "Hover" Smart Tag type are presented in the "inputs found" during the blueprint creation process, and require the user's input as to whether a hover action should or should not be performed on the associated element.

The Smart Tag type of "Text" is used to label a DOM element corresponding to a GUI object that accepts text. GUI objects of the "Text" Smart Tags type are presented in the "inputs found" during the blueprint creation process, and require the user's input as to what text should be input into the textbox of the object. In one embodiment, data (such as an email, a username, a password, an address, an integer like "3") may be preloaded into a data production library (DPL), and the user may decide what data from the DPL should be provided as input to a textbox of the GUI object.

The Smart Tag type of "Search" is used to label a DOM element corresponding to a GUI object that accepts text. GUI objects of the "Search" Smart Tags type are presented in the "inputs found" during the blueprint creation process, and require the user's input as to what text should be input into the textbox of the GUI object. In one embodiment, data (such as an email, a username, a password, an address, an integer like "3") may be preloaded into a data production library (DPL), and the user may decide what data from the DPL should be provided as input to a textbox of the GUI object. There is a conceptual difference between the Smart Tag type of "Search" (indicating a DOM element that corresponds to a GUI object that accepts a search query), as compared to the Smart Tag type of "Text" (indicating a DOM element that corresponds to a GUI object that accepts text provided to fill a form).

The Smart Tag type of "Select" is used to label a DOM element corresponding to select combo box that requires user input. GUI objects of the "Select" Smart Tag type are presented in the "inputs found" during the blueprint creation process, and require the user's input as to whether zero or more options of the combo box should be selected. In the blueprint creation process, each selected option may result in the creation of a new edge from the current state.

The Smart Tag type of "Form" is used to label a DOM element corresponding to a HTML form that could be submitted. GUI objects of the "Form" Smart Tag type are presented in the "inputs found" during the blueprint creation process, and require the user's input as to whether the form should be submitted or not.

The Smart Tag type of "Menu" is used to label a DOM element corresponding to a menu object that can be expanded. GUI objects of the "Menu" Smart Tag type are presented in the "inputs found" during the blueprint creation process, and require the user's input as to whether the menu should be expanded or not.

The Smart Tag type of "Noise" is used to label DOM elements corresponding to GUI objects such as advertisements that should be ignored. GUI objects of the "Noise" Smart Tag type are not clicked on during the blueprint generation process and are not presented in the "inputs found" during the blueprint creation process (i.e., do not require any user input). Further, DOM elements of the "Noise" Smart Tag type are not taken into account when determining the fingerprint of a state. DOM elements of all other Smart Tag types may be taken into account when determining the fingerprint of a state.

The Smart Tag type of "Drag" is used to label DOM elements corresponding to GUI objects that might be dragged (and might be used in association with GUI objects of the Smart Tag type of "Drop", described immediately below). GUI objects of the "Drag" Smart Tag type are not clicked on during the blueprint generation process, but are presented as values for the GUI objects of the "Drop" Smart Tag type in the "inputs found" during the blueprint creation process.

The Smart Tag type of "Drop" is used to label DOM elements corresponding to GUI objects within which GUI objects of the Smart Tag type of "Drag" can be dropped. GUI objects of the "Drop" Smart Tag type are presented in the "inputs found" during the blueprint creation process, and require the user's input as to whether zero or more of the GUI objects of the Smart Tag type of "Drag" should be dropped into the GUI object of the "Drop" Smart Tag type. The Smart Tag type of "Drag" and the Smart Tag type of "Drop" are logically coupled to one another.

In the present example of FIG. 10A, the menu objects 28, 30, 32 are links that do not require any user action during the blueprint creation process, so the Smart Tag type of "Navigation" is selected in dropdown menu 214.

Dropdown menu 216 may allow the designation of one or more auto validations to be executed whenever a menu object is identified by the menu Smart Tag (or more precisely, when the DOM element corresponding to a menu object is identified by an element classifier of the menu Smart Tag), and an action is performed on the corresponding DOM element. In the instant example, the auto validation is specified as "textAutoValidation", which determines whether the text content of the DOM element, as identified by the element classifier (i.e., equivalent to the "textContent property" of the DOM element) immediately before an action is performed on the DOM element, is present anywhere in the text content of the body DOM element of the resulting webpage. Further details regarding the "textAutoValidation" evaluator will be provided in FIG. 10B below.

Scanning options (or scan mode) may allow the selection of zero or one scan option. In the instant example, the "once per app" scan mode 218 is selected, which causes edges corresponding to identical menu objects across different webpages to automatically point to the same resulting state. For instance, an edge created for the "Bags" menu object 28 on webpage 10 and an edge created for the "Bags" menu object 28 on webpage 12 (as depicted on FIG. 1A) will automatically point to the same resulting state. The time savings is provided by relying upon the assumption that most of the times identical menu objects across different webpages lead to the same resulting webpage, so the check of whether or not this is actually so can be omitted for increased computational efficiency when generating the state machine model of the website. The check involves clicking on a DOM element encoding the menu object, navigating to the resulting webpage, comparing identifying characteristics of the resulting webpage with identifying characteristics of previously accessed webpages in order to determine whether or not the resulting webpage is identical to a previously modeled webpage, so omitting such check provides the time savings.

Figure 9A:
FIG. 9A depicts a webpage with a particular categorization of GUI objects, in accordance with one embodiment of the invention.
Figure 9C:
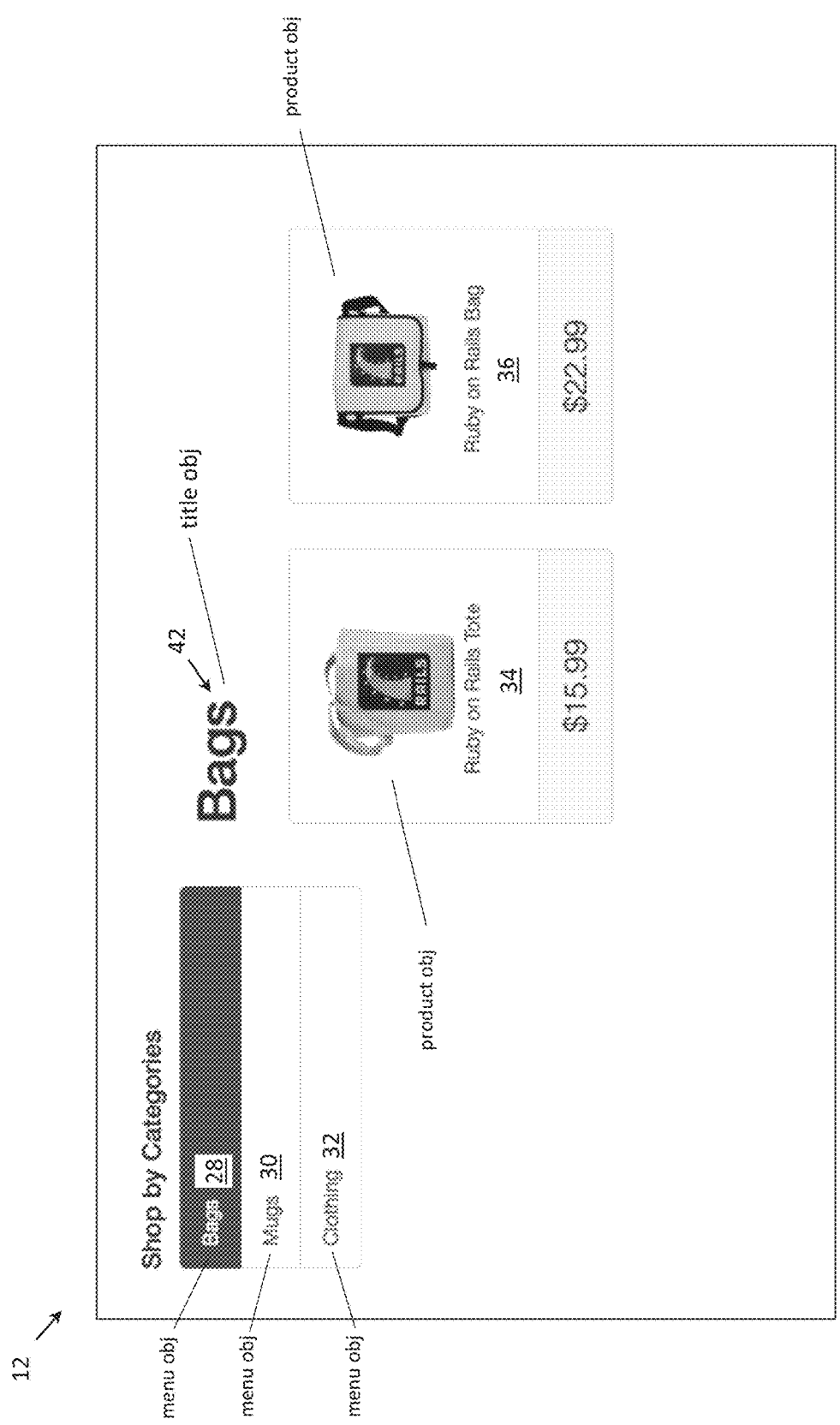
FIG. 9C depicts a webpage with a particular categorization of GUI objects, in accordance with one embodiment of the invention.

The "Rules" may allow the input of one or more additional code characteristics associated with the menu objects 28, 30, 32 (i.e., in addition to HTML Tag 212), as depicted in FIGS. 9A and 9C. Upon inspecting code fragments 103j/k/l (as depicted in FIGS. 9B and 9D), one may notice that these code fragments all include the code characteristic—class="list-group-item"—that is expressed as an attribute—value pair. As such, a rule (i.e., a code characteristic) is added of the type "Attribute Contains Value" (via dropdown menu 220a), in which the attribute is specified as "class" (via field 220b) and the value is specified as "list-group-item" (via field 220c). Such rule (i.e., "Attribute Contains Value") specifies that a code fragment must include a certain attribute-value pair. Such code characteristic is associated with importance value 220d, analogous to the weights described in FIG. 2. In the present example, the importance value is specified as 100% since the code characteristic (i.e., class="list-group-item") was common to all instances of the code fragments corresponding to the menu objects. If such code characteristic is no longer needed, it may be removed by selecting remove button 220e. Additional code characteristics may be added by, for example, selecting the "+" sign next to the heading Rules.

Other types of rules that are selectable in dropdown menu 220a may include "Attribute Does Not Contain Value", "Contains Text", "Contains HTML", "Child Tag", "Parent Tag", "Parents Tag", "Child Smart Tag", "Parent Smart Tag" and "Parents Smart Tag". The rule "Attribute Does Not Contain Value" specifies that within a DOM element, an attribute must not contain a certain value. The rule "Contains Text" specifies that the text content of a DOM element must contain a certain text string. The rule "Contains HTML" specifies that a DOM element must contain a certain HTML string. The rule "Child Tag" specifies that at least one child tag within a DOM element must be a certain tag. The rule "Parent Tag" specifies that the direct parent tag of a DOM element must be a certain tag. The rule "Parents Tag" specifies that at least one higher tag (e.g., direct parent, grandparent, etc.) in the hierarchy of tags of a DOM element must be a certain tag. The rule "Child Smart Tag" specifies that at least one child tag within a DOM element must be a certain previously defined Smart Tag. The rule "Parent Smart Tag" specifies that the direct parent tag of a DOM element must be a certain previously defined Smart Tag. The rule "Parents Smart Tag" specifies that at least one higher tag (e.g., direct parent, grandparent, etc.) in the hierarchy of tags of a DOM element must be a certain previously defined Smart Tag.

Other rules may be possible. For example, a rule may specify that the rendered GUI object of a DOM element must be present within a certain portion of the webpage. As another example, a rule may specify that the rendered GUI object of a DOM element must be substantially similar to a pre-defined image. As another example, a rule may specify that the rendered GUI object of a DOM element must be smaller than a certain number of pixels in the x-dimension and smaller than a certain number of pixels in the y-dimension. As another example, a rule may specify that the rendered GUI object of a DOM element must be greater than a certain number of pixels in the x-dimension and greater than a certain number of pixels in the y-dimension.

Definition of textAutoValidation

Figure 10B:
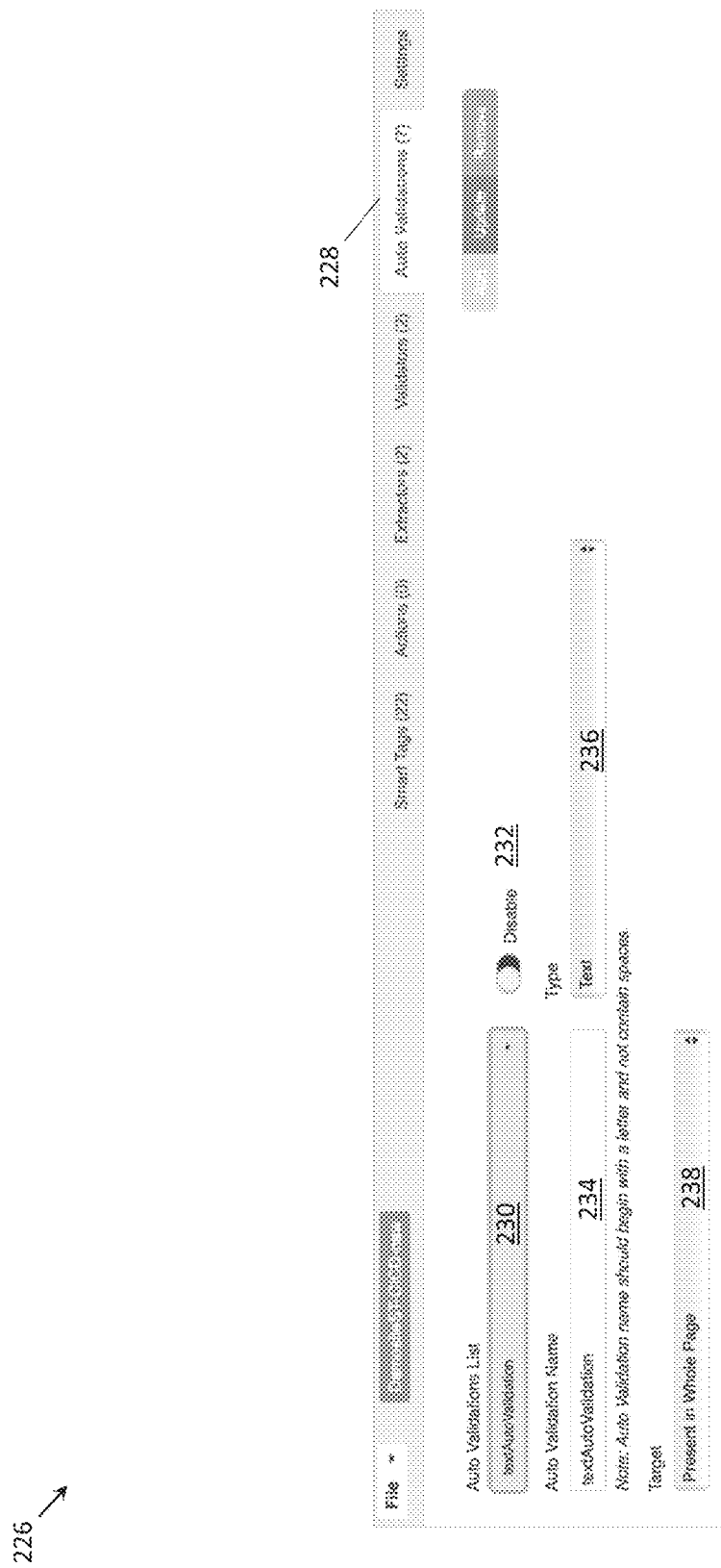
FIG. 10B depicts a screenshot of a user interface for configuring a textAutoValidation for determining whether the text content of a DOM element is present anywhere in text content of the body DOM element of the resulting webpage, following an action being performed on the DOM element, in accordance with one embodiment of the invention.

The user interface depicted in screenshot 226 of FIG. 10B may be accessed by the selection of Auto Validations tab 228. Selection of textAutoValidation in dropdown menu 230 results in the display of the definition of the above-mentioned textAutoValidation. Toggle button 232 may be provided to disable or enable the present auto validation (i.e., "textAutoValidation"). In the present example, textAutoValidation is enabled. Field 234 may be provided to specify the auto validation name. In the present example, the auto validation name is specified as textAutoValidation. Dropdown menu 236 specifies the "Type" of comparison performed by the auto validation. Options in dropdown menu 236 include "Attribute", "Text", "Id", "Static Text" and "Element Exists". In the present example, the type of "Text" is selected, which causes the text content of the DOM element identified by the element classifier (i.e., element classifier of the Smart Tag that called the auto validation) to be extracted immediately before an action is performed on the DOM element. Selection of the "Type" as "Text" triggers the additional designation of the "Target" in dropdown menu 238. Options present in dropdown menu 238 include "Present in Whole Page", "Not Present in Whole Page" and "Locator" (which means that the validation should be performed on a specific DOM element of the resulting webpage, as specified by the "Locator"). Locators are described in more detail below in FIGS. 11A-11G. In the present example, the "Target" is specified as "Present in Whole Page". To clarify, the "Page" refers to the text content of the body DOM element of the resulting webpage (i.e., the webpage following the execution of the action on the DOM element). Therefore, in short, the textAutoValidation determines whether the text content of a DOM element (that is extracted immediately prior to an action being performed on the DOM element) is present anywhere in the text content of the body DOM element of the resulting webpage.

Other "Types" may have the following meaning. Selection of the "Type" of "Attribute" specifies that after an action is performed on a DOM element, an attribute present in the DOM element (as specified by a locator) of the resulting webpage must match a certain value. Selection of the "Type" of "Id" specifies that after an action is performed on a DOM element, the "Id" attribute present in the DOM element (as specified by a locator) of the resulting webpage must match a certain value. The "Type" of "Id" is a special case of the "Type" of "Attribute". Selection of the "Type" of "Static Text" specifies that after an action is performed on a DOM element, a certain text string must be present in (i) the text content of the body DOM element of the resulting webpage or (ii) the text content of a specific DOM element of the resulting webpage, depending on the option selected in dropdown menu 238. Selection of the "Type" of "Element Exists" specifies that after an action is performed on a DOM element, a specific DOM element (as specified by a locator) should exist in the DOM of the resulting webpage.

Using webpage 10 from FIG. 9A as an example, a DOM element corresponding to bags menu object 28 may be identified by the element classifier of the menu Smart Tag. Upon an action being performed on the instant DOM element, the textAutoValidation may be executed, causing the determination of whether the text content in the instant DOM element (i.e., "Bags") is present in the text content of the body DOM element of webpage 12. In the present case, "Bags" is present in the text content of the body DOM element of webpage 12 (since it is present as a title in webpage 12); therefore, the textAutoValidation will return the result of success. It is noted that even in the initial process of modeling the website (as a state machine or blueprint), some initial testing of the website occurs by way of validation and auto validation routines. Such initial testing may be part of a "smoke test", in which preliminary test results are available even before a test script has been generated.

Definition of the Product Smart Tag

Now continuing with the specification of other smart tags, an individual may identify "Ruby on Rails Tote" 34, "Ruby on Rails Bag" 36, "Ruby on Rails Ringer T-Shirt" 38 and "Ruby Baseball Jersey" 40 as product objects (e.g., based on each of these GUI objects being links to products) in webpage 10 of FIG. 9A and webpage 12 of FIG. 9C. The individual may then use the developer tools of the Chrome browser (or other browser) to view the code fragments which encode each of these product objects. The developer tool may reveal code fragments 103*n*, 103*o*, 103*p* and 103*q* (see FIGS. 9B and 9D) associated with "Ruby on Rails Tote" product object 34, "Ruby on Rails Bag" product object 36, "Ruby on Rails Ringer T-Shirt" product object 38 and "Ruby Baseball Jersey" product object 40, respectively.

Figure 10C:
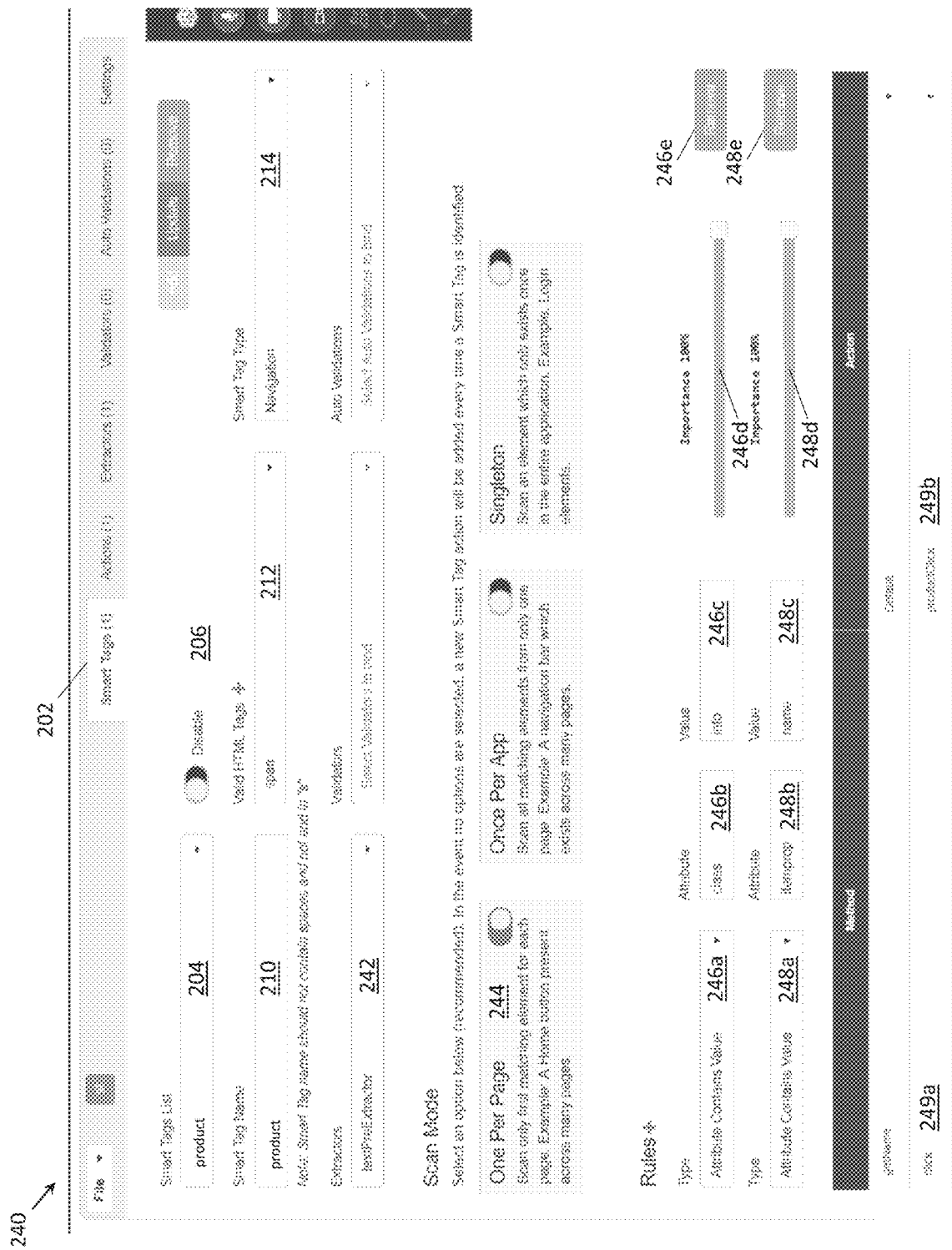
FIG. 10C depicts a screenshot of a user interface for configuring an element classifier for identifying DOM elements encoding product objects and its associated evaluator and scanning option, in accordance with one embodiment of the invention.

The user interface depicted in screenshot 240 of FIG. 10C includes the definition of a Smart Tag to model product objects 34, 36, 38 and 40 so as to identify and evaluate DOM elements that correspond to product objects in a webpage. Selection of product in dropdown menu 204 results in the display of the definition of the "product". "Disable" toggle button 206 may allow enabling or disabling the instant Smart Tag. Enabling the instant Smart Tag will enable the automatic identification and evaluation of DOM elements that correspond to product objects in webpages during the modeling of a website (i.e., during process of creating the state machine model). Disabling the instant Smart Tag will disable the automatic identification and evaluation of DOM elements that correspond to product objects in webpages during the modeling of a website (i.e., during process of creating the state machine model). In the current example, the product Smart Tag is enabled.

Field 210 may allow the designation of a Smart Tag name, analogous to object group names 125, 129 in FIG. 2. In the instant example, the Smart Tag name is specified as "product". Dropdown menu 212 may allow the designation of a valid HTML tag that is associated with the product objects. Code fragments 103n/o/p/q (see FIGS. 9B and 9D) all include the HTML tag <span>, so "span" is selected in dropdown menu 212. The valid HTML tag is one example of the previously described code characteristics. Dropdown menu 214 may allow the designation of a Smart Tag type that is associated with the product objects. The product objects 34, 36, 38, 40 are links that do not require any user action during the blueprint creation process, so the Smart Tag type of "Navigation" is selected in dropdown menu 214.

Dropdown menu 242 may allow the designation of an extractor to be executed whenever a product object is identified by the product Smart Tag (or more precisely, when the DOM element encoding a product object is identified by an element classifier of the product Smart Tag). In the instant example, the extractor is specified as "textPreExtractor", which extracts the text content of a DOM element immediately before an action is performed on the DOM element. The definition of the "textPreExtractor" extractor will be presented in FIG. 10D.

Scanning option (or scan mode) may allow the selection of zero or one scan option. In the present example, the "one per page" scanning option 244 is selected, which causes only one (or a small number) of edges to be created corresponding to one (or a small number) of the product objects displayed on a webpage. For instance, for the four product objects 34, 36, 38 and 40 included in webpage 10, only one (or a small number) of the product objects will be modeled in the state machine (or blueprint) representation of the website. In FIG. 1B, only four product objects were included in webpage 10 for simplicity, but in a more realistic example, there may be twenty or thirty or even hundreds of product objects, in which case the computational efficiencies provided by the "one per page" scanning option will be more apparent.

The "one per page" scanning option essentially assumes that the structure of the website (types of buttons, links, etc.) after clicking on any of the product objects will be quite similar, so there is only a need to capture the aforementioned structure once (or a small number of times) in the state machine (or blueprint). Stated differently, even if the informational content of the products differ (e.g., cup versus bowl versus plate, etc.), the type of information in the resulting product pages is similar (e.g., front view, back view, dimensions, weight, etc.). As such, it is appropriate to select the "one per page" scanning option so that only one (or a small number) of the product objects per page is modeled in the state machine.

The "Rules" section may allow the input of one or more additional code characteristics associated with the product objects 34, 36, 38 and 40 (i.e., in addition to the span HTML Tag specified in dropdown menu 212). Upon inspecting code fragments 103n/o/p/q (as depicted in FIGS. 9B and 9D), one may notice that these code fragments all include the code characteristics class="info" and itemprop="name", which are expressed as attribute—value pairs. As such, a first rule is added of the type "Attribute Contains Value" (via dropdown menu 246a), in which the attribute is specified as "class" (via field 246b) and the value is specified as "info" (via field 246c). Such rule (i.e., code characteristic) is associated with importance value 246d. In the present example, the importance value is specified as 100%, since the code characteristic (i.e., class="info") was common to all instances of the code fragments corresponding to the product objects. If such code characteristic is no longer needed, it may be removed by selecting remove button 246e.

A second rule is added of the type "Attribute Contains Value" (via dropdown menu 248a), in which the attribute is specified as "itemprop" (via field 248b) and the value is specified as "name" (via field 248c). Such rule (i.e., code characteristic) is associated with importance value 248d. In the present example, the importance value is specified as 100%, since the code characteristic (i.e., itemprop="name") was common to all instances of the code fragments corresponding to the product objects. If such code characteristic is no longer needed, it may be removed by selecting remove button 248e.

Lastly, dropdown menu 249b may allow the substitution of a default action behavior, as specified in method 249a, with a custom action behavior specified in dropdown menu 249b. In the instant example, method 249a is the default "click" action behavior, and the custom action behavior is selected as "productClick". The custom action behavior "productClick" is defined in the user interface presented in FIG. 10J below.

In one embodiment, the default action behavior may include a first set of DOM events arranged in a first order that is triggered with a DOM element in order to simulate an action being performed on the DOM element. In the instant example, the DOM element would be a DOM element that is identified by an element classifier of the product Smart Tag, and the action would be a "click" action. The custom action behavior may include a second set of DOM events arranged in a second order that is triggered with the DOM element in order to simulate the same action (although with a different behavior) being performed on the DOM element. The second order may be different from the first order. Additionally, at least one DOM event from the second set of DOM events (e.g., a focus event) may not present in the first set of DOM events. A motivation for using a custom action behavior is when the default action behavior has errors. For example, the default action behavior corresponding to the "click" action may fail to properly perform a click on the DOM element, so a custom action behavior may be used in place of the default action behavior.

Definition of textPreExtractor

Figure 10D:
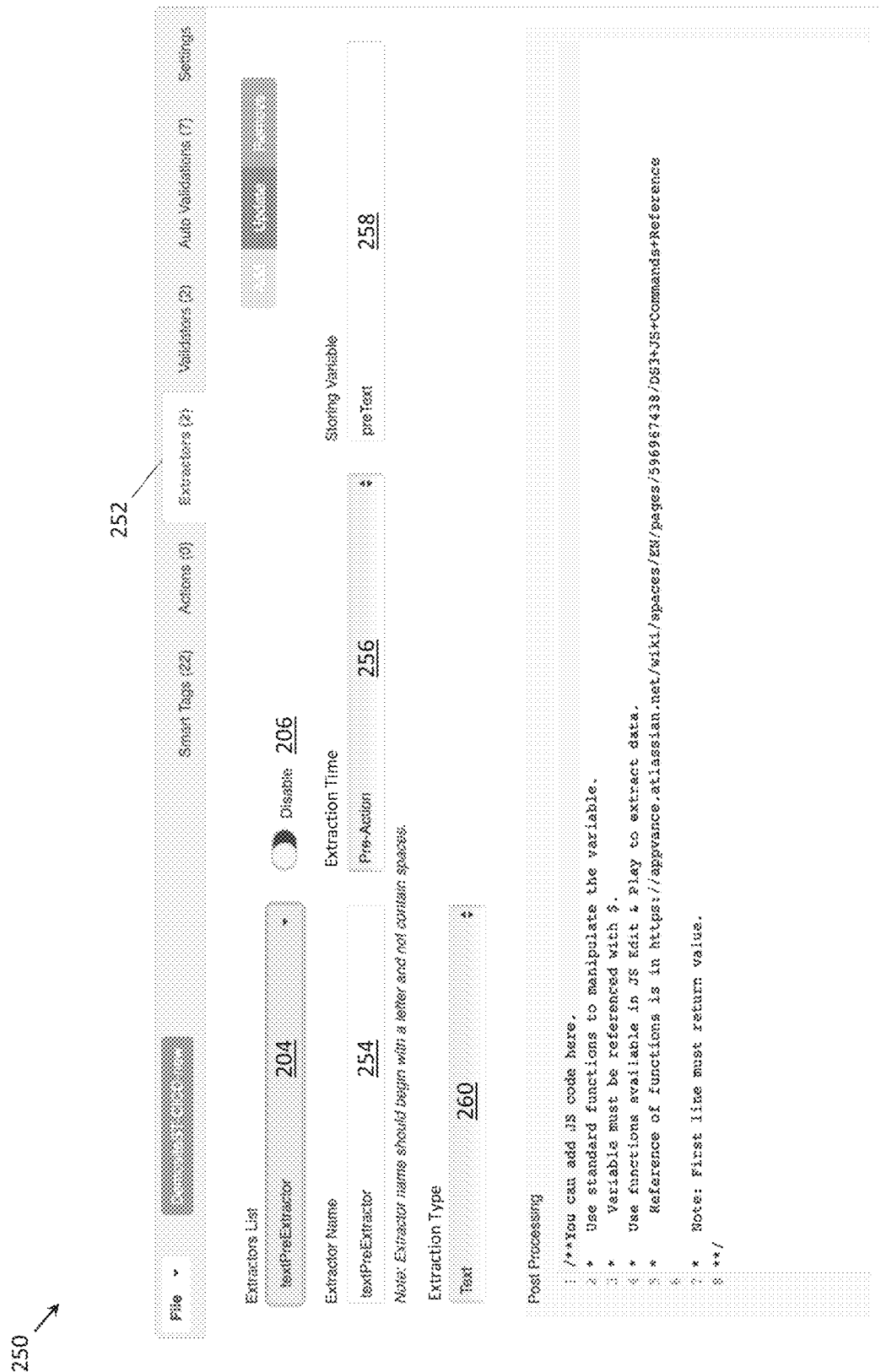
FIG. 10D depicts a screenshot of a user interface for configuring a textPreExtractor for extracting the text content of a DOM element immediately prior to an action being performed on the DOM element, in accordance with one embodiment of the invention.

The user interface depicted in screenshot 250 of FIG. 10D may be accessed by the selection of extractors tab 252. Selection of textPreExtractor in dropdown menu 204 results in the display of the definition of the above-mentioned textPreExtractor. Toggle button 206 may be provided to disable or enable the present extractor (i.e., "textPreExtractor"). In the present example, textPreExtractor is enabled. Field 254 may be provided to specify the extractor name. In the present example, the extractor name is specified as textPreExtractor. Dropdown menu 256 specifies the time of the extraction, whether to occur immediately before an action is performed on the DOM element (i.e., pre-Action) or immediately after an action is performed on the DOM element (i.e., post-Action). In the present example, the "Extraction Time" of "Pre-Action" is selected. Text field 258 allows the input of a name for a "Storing Variable" (i.e., a variable that stores the extracted value). In the present example, the variable name is "preText". Dropdown menu 260 specifies the type of value that is extracted by the extractor (i.e., the "Extraction Type"). Options for dropdown menu 260 include "Attribute", "Text" and "Id". For the option "Attribute", the value of a defined attribute will be extracted from the DOM element identified by the element classifier. For the option "Id" (which is a special case of the option "Attribute"), the value of a defined "Id" attribute will be extracted from the DOM element identified by the element classifier. For the option "Text", the text content of the DOM element will be extracted from the DOM element identified by the element classifier.

In the present example, the "Extraction Type" of "Text" is selected along with the "Extraction Time" of "Pre-Action", which causes the text content of the DOM element identified by the element classifier (i.e., the element classifier associated with the Smart Tag that calls the textPreExtractor) to be (i) extracted immediately before an action is performed on the DOM element corresponding to the DOM element and (ii) then stored in the variable preText.

Using webpage 10 from FIG. 9A as an example, the DOM element corresponding to product object 34 may be identified by the element classifier of the product Smart Tag. Immediately before an action is performed on the identified DOM element, textPreExtractor may be executed, causing the text content from identified DOM element (i.e., "Ruby on Rails Tote") to be stored in the variable preText. Stated differently, the extraction of the text content from the DOM element may be temporally coupled with the action being performed on the DOM element corresponding to product object 34, such that the extraction of the text content occurs immediately before the action is performed on DOM element corresponding to product object 34.

As will be explained in more detail below, the creation of each edge during the blueprint generation process may involve a separate thread (and/or browser). One thread (and/or browser) will create an edge for the "Ruby on Rails Tote" product object 34 with one copy of the variable preText. If an edge is also created for the "Ruby on Rails Bag" product object 36, a separate thread (and/or browser) will create the edge for the "Ruby on Rails Bag" product object 36, with one another copy of the variable preText. Therefore, there may be multiple copies of the variable preText, one for each thread.

Definition of the addToCartButton Smart Tag

Figure 10E:
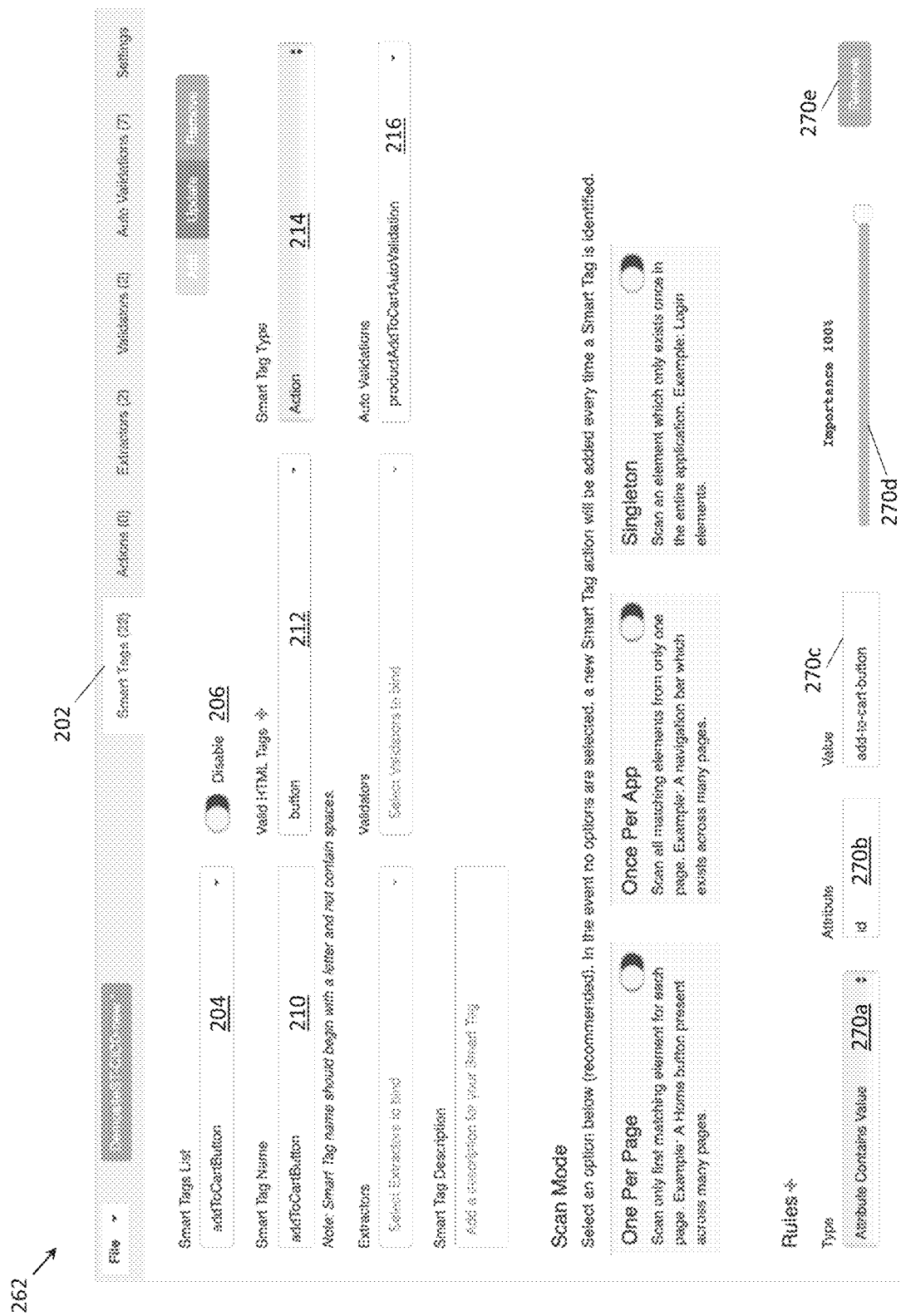
FIG. 10E depicts a screenshot of a user interface for configuring an element classifier for identifying DOM elements encoding add-to-cart buttons and its associated evaluator, in accordance with one embodiment of the invention.

The user interface depicted in screenshot 262 of FIG. 10E includes the definition of a Smart Tag to model addToCartButton objects 54 in webpages 18, 20, 22 and 24 so as to identify and evaluate DOM elements that correspond to addToCartButton objects in a webpage. Selection of addToCartButton in dropdown menu 204 results in the display of the definition of the "addToCartButton". "Disable" toggle button 206 may allow enabling or disabling the instant Smart Tag. Enabling the instant Smart Tag will enable the automatic identification and evaluation of DOM elements that correspond to addToCartButton objects in webpages during the modeling of a website (i.e., during process of creating the state machine model). Disabling the instant Smart Tag will disable the automatic identification and evaluation of DOM elements that correspond to addToCartButton objects in webpages during the modeling of a website (i.e., during process of creating the state machine model). In the current example, the addToCartButton Smart Tag is enabled.

Field 210 may allow the designation of a Smart Tag name, analogous to object group names 125, 129 in FIG. 2. In the instant example, the Smart Tag name is specified as "addToCartButton". Dropdown menu 212 may allow the designation of a valid HTML tag that is associated with the addToCartButton objects. Code fragment 103p (which is identical for the "addToCartButton" objects 54 in webpages 18, 20, 22 and 24) includes the HTML tag <button>, so "button" is selected in dropdown menu 212. The valid HTML tag is one example of the previously described code characteristics. Dropdown menu 214 may allow the designation of a Smart Tag type that is associated with the addToCartButton objects. In the present case, the Smart Tag type is selected as "Action", because the addToCartButton object should not be automatically clicked during the blueprint generation process. Instead, it is more logical that a number should first be input into the quantityText object 55, followed by the selection of the addToCartButton object 54. Such sequence of steps can be carried out as part of a custom action, the definition of which will be described in FIGS. 12-14 below.

Dropdown menu 216 may allow the designation of an auto validation, and such auto validation may be executed whenever a (custom) action is performed on the DOM element that corresponds to the addToCartButton object. In the present example, the auto validation is specified as "productAddToCartAutoValidation", which determines whether the value of a variable is present anywhere in the text content of the body DOM element of the resulting webpage following an action being performed on the DOM element encoding the addToCartButton object. The definition of the "productAddToCartAutoValidation" extractor will be presented in FIG. 10F. Since no scanning mode (or scan option) is selected for the addToCartButton Smart Tag, the element classifier of the addToCartButton Smart Tag will identify all DOM elements that match the code characteristics defined for the addToCartButton Smart Tag.

The "Rules" section may allow the input of one or more additional code characteristics associated with the addToCartButton objects 54 (i.e., in addition to the button HTML Tag specified in dropdown menu 212). Upon inspecting the code fragments associated with the addToCartButton objects 54, one may notice that these code fragments all include the code characteristics id="add-to-cart-button", which is expressed as an attribute—value pair. As such, a rule is added of the type "Attribute Contains Value" (via dropdown menu 270a), in which the attribute is specified as "id" (via field 270b) and the value is specified as "add-to-cart-button" (via field 270c). Such rule (i.e., code characteristic) is associated with importance value 270d. In the present example, the importance value is specified as 100% since the code characteristic (i.e., id="add-to-cart-button") was common to all instances of the code fragments corresponding to the addToCartButton objects. If such code characteristic is no longer needed, it may be removed by selecting remove button 270e.

Definition of productAddToCartAutoValidation

Figure 10F:
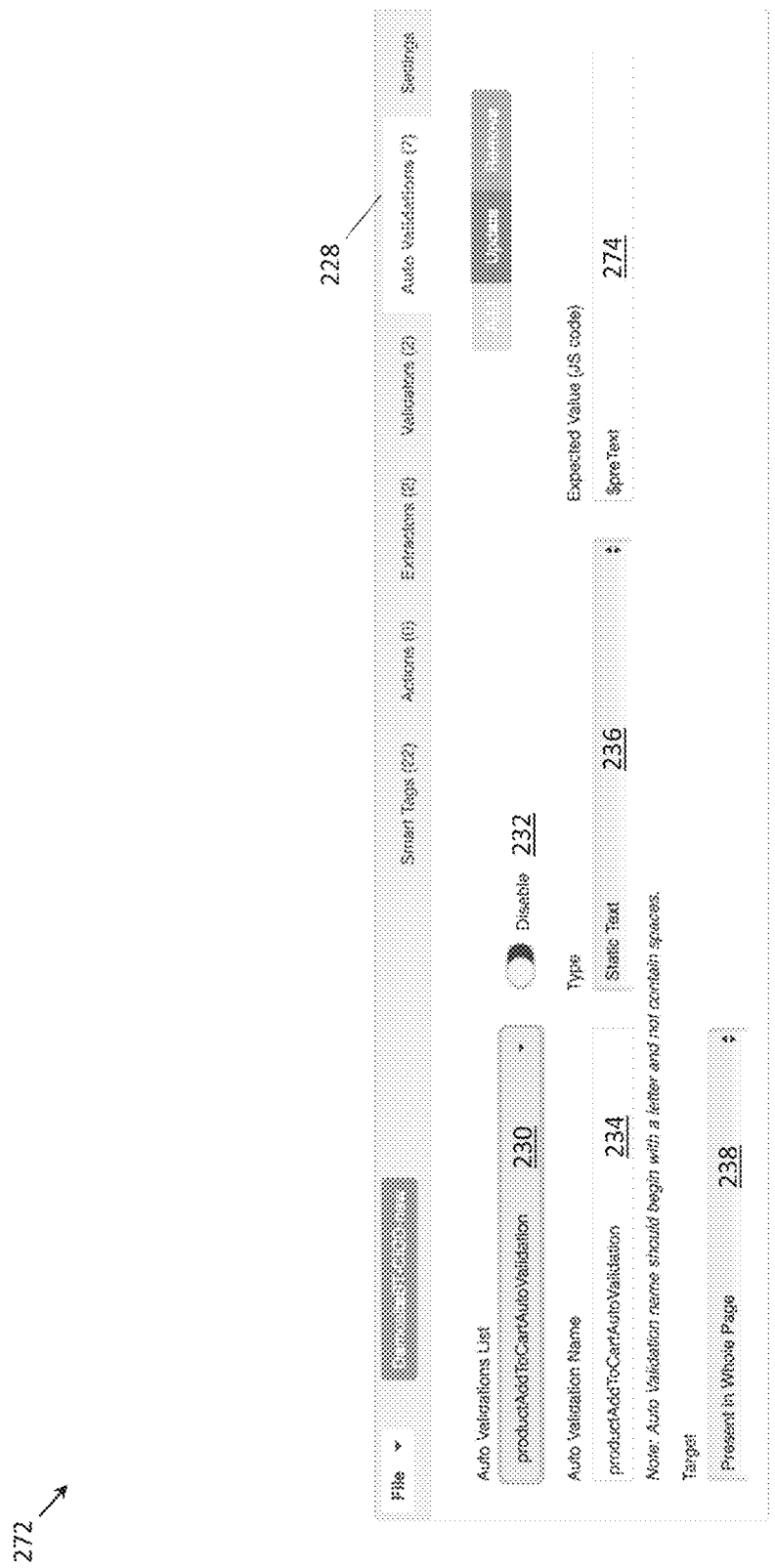
FIG. 10F depicts a screenshot of a user interface for configuring a productAddToCartAutoValidation for determining whether the text content extracted by the textPreExtractor is present anywhere in text content of the body DOM element of the resulting webpage, following an action being performed on a DOM element, in accordance with one embodiment of the invention.

The user interface depicted in screenshot 272 of FIG. 10F may be accessed by the selection of Auto Validations tab 228. Selection of productAddToCartAutoValidation in dropdown menu 230 results in the display of the definition of the above-mentioned productAddToCartAutoValidation. Toggle button 232 may be provided to disable or enable the present auto validation (i.e., "productAddToCartAutoValidation"). In the present example, productAddToCartAutoValidation is enabled. Field 234 may be provided to specify the auto validation name. In the present example, the auto validation name is specified as productAddToCartAutoValidation. Dropdown menu 236 specifies the "Type" of comparison performed by the auto validation. In the present example, the type of "Static Text" is selected, which causes the determination of whether a static text (specified in text box 274) is present in the Target (specified in dropdown menu 238). In the present case, the value of the variable preText is specified in text box 274 (i.e., $preText), and the Target is specified as "Present in Whole Page". Therefore, the determination being performed by the productAddToCartAutoValidation includes determining whether the value of the preText variable is present anywhere in the text content of the body DOM element of the webpage that is displayed following the action being performed on the DOM element. Recall, the preText variable was also used in connection with the "textPreExtractor" extractor, and the "textPreExtractor" extractor was referenced by the product Smart Tag. Therefore, the functionality of the product Smart Tag is coupled with the functionality of the addToCartButton Smart Tag, as the following example will illustrate.

Using webpage 10 from FIG. 9A as an example, the DOM element corresponding to "Ruby on Rails Tote" object 34 may be identified by the element classifier of the product Smart Tag. Upon performing an action on the identified DOM element, the textPreExtractor may be executed, causing the text content from the identified DOM element (i.e., "Ruby on Rails Tote") to be stored in the variable preText. Performing an action on the identified DOM element also causes a transition from webpage 10 of FIG. 9A to webpage 18 of FIG. 9E. In webpage 18 of FIG. 9E, the DOM element corresponding to "Add To Cart" button 54 may be identified by the element classifier of the addToCartButton Smart Tag. Upon performing an action on the DOM element corresponding to "Add To Cart" button 54 (as part of a custom action), the productAddToCartAutoValidation may be executed, causing the determination of whether the static text "Ruby on Rails Tote" is present anywhere in the text content of the body DOM element of resulting webpage 19 of FIG. 9G. In summary, the chaining of the product Smart Tag with the addToCartButton Smart Tag allows the determination of whether the text content "Ruby on Rails Tote" extracted from the DOM element corresponding to "Ruby on Rails Tote" product object 34 from webpage 10 of FIG. 9A is present in the text content of the body DOM element of webpage 19 in FIG. 9G. Such a determination is useful because it allows the verification of whether the product a user selected is the same product that eventually was placed in the shopping cart of the user. To emphasize, the chaining of the two Smart Tags allowed an evaluation to be performed between webpages 10 and 19, which are graphically linked by webpage 18.

Definition of the quantityText Smart Tag

Figure 10G:
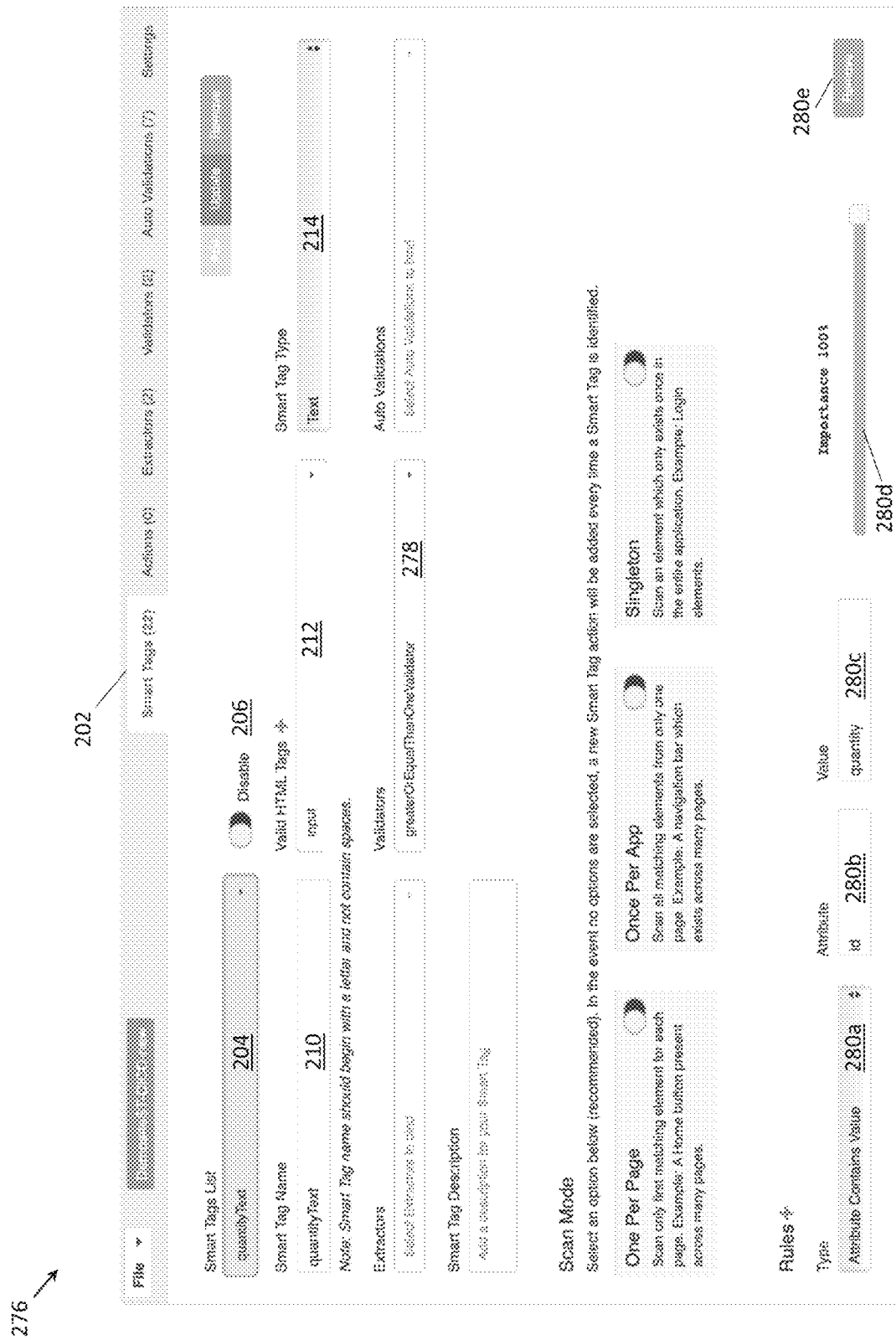
FIG. 10G depicts a screenshot of a user interface for configuring an element classifier for identifying DOM elements encoding quantityText objects and its associated evaluator, in accordance with one embodiment of the invention.

The user interface depicted in screenshot 276 of FIG. 10G includes the definition of a Smart Tag to model quantityText objects 55 in webpages 18, 20, 22 and 24 so as to identify and evaluate DOM objects that correspond to quantityText objects in a webpage. Selection of quantityText in dropdown menu 204 results in the display of the definition of the "quantityText" Smart Tag. "Disable" toggle button 206 may allow enabling or disabling the instant Smart Tag. Enabling the instant Smart Tag will enable the automatic identification and evaluation of DOM elements corresponding to quantityText objects in webpages during the modeling of a website (i.e., during the process of creating the state machine model). Disabling the instant Smart Tag will disable the automatic identification and evaluation of DOM elements corresponding to quantityText objects in webpages during the modeling of a website (i.e., during process of creating the state machine model). In the current example, the quantityText Smart Tag is enabled.

Field 210 may allow the designation of a Smart Tag name, analogous to object group names 125, 129 in FIG. 2. In the instant example, the Smart Tag name is specified as "quantityText". Dropdown menu 212 may allow the designation of a valid HTML tag that is associated with the quantityText objects. Code fragment 103q as depicted in FIG. 9F (which is identical for the quantityText objects 54 in webpages 18, 20, 22 and 24) includes the HTML tag <input>, so "input" is selected in dropdown menu 212. The valid HTML tag is one example of the previously described code characteristics. Dropdown menu 214 may allow the designation of a Smart Tag type that is associated with quantityText objects 55. In the present case, the Smart Tag type is selected as "Text", because such object receives text. With the Smart Tag type of "Text" specified for the quantityText Smart Tag, an edge associated with an quantityText object will not be created unless a "custom action" is created. In the present example, a custom action might be inputting the number "3" (or other number) into textbox 55.

Dropdown menu 278 may allow the designation of a validation, and such validation may be executed whenever a (custom) action is performed on the DOM element corresponding to the quantityText object. In the instant example, the validation is specified as "greaterOrEqualToOneValidator", which determines whether the text content present in the DOM element corresponding to quantityText object 55 after an action is performed on the DOM element (i.e., corresponding to text being input into quantityText object 55) is greater than or equal to one. In the instance of an input tag, it is noted that the text content refers to the "value property" of the input tag, and not the "textContent property" of the input tag. The definition of the "greaterOrEqualToOneValidator" extractor will be presented in FIG. 10H. Since no scanning mode (or scan option) is selected for the quantityText Smart Tag, the element classifier of the quantityText Smart Tag will identify all DOM elements that match the defined code characteristics of the quantityText Smart Tag.

The "Rules" section may allow the input of one or more additional code characteristics associated with quantityText objects 55 (i.e., in addition to the "input" HTML Tag specified in dropdown menu 212). Upon inspecting the code fragments associated with the quantityText objects 55, one may notice that these code fragments all include the code characteristic id="quantity", which is expressed as an attribute—value pair. As such, a rule is added of the type "Attribute Contains Value" (via dropdown menu 280a), in which the attribute is specified as "id" (via field 280b) and the value is specified as "quantity" (via field 280c). Such rule (i.e., code characteristic) is associated with importance value 280d. In the present example, the importance value is specified as 100%, since the code characteristic (i.e., id="quantity") was common to all instances of the code fragments corresponding to the quantityText objects. If such code characteristic is no longer needed, it may be removed by selecting remove button 280e.

Definition of greaterOrEqualToOneValidator

Figure 10H:
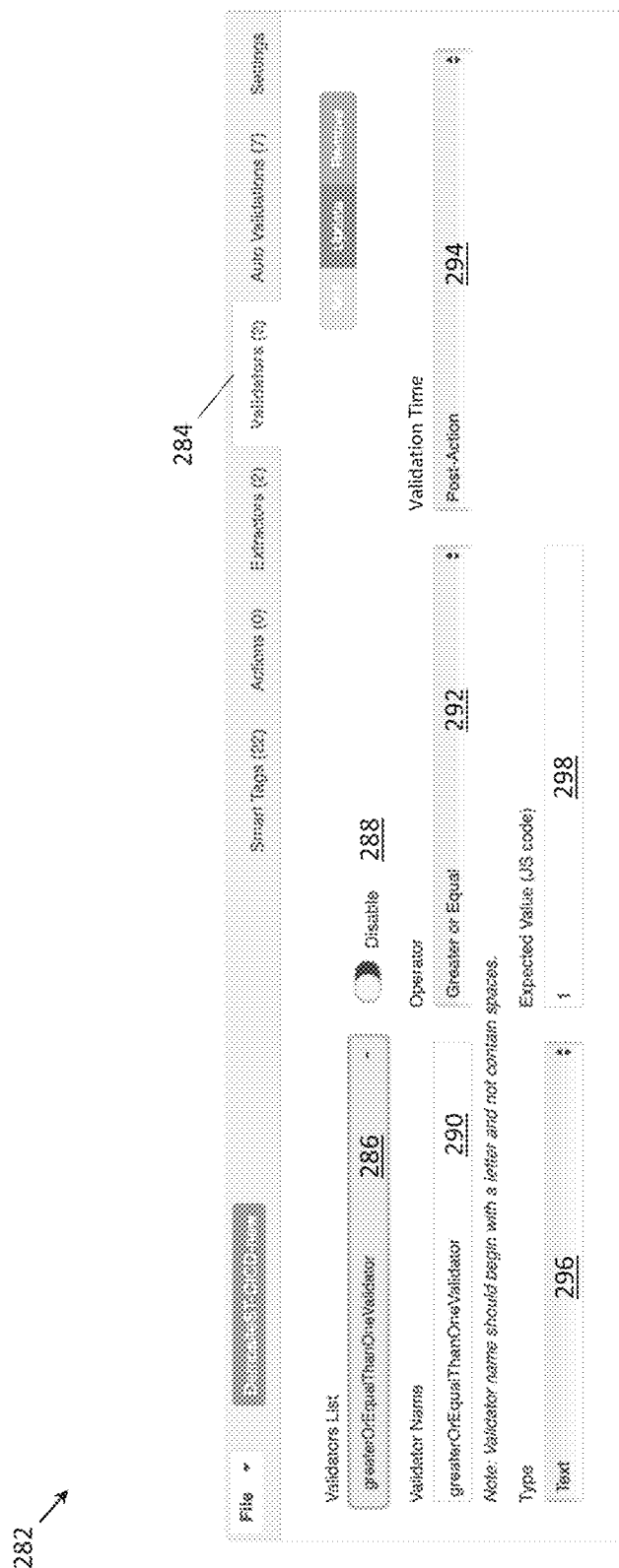
FIG. 10H depicts a screenshot of a user interface for configuring a greaterOrEqualThanOneValidator to determine whether the text content of a DOM element following the input of the text into the GUI object encoded by the DOM element is greater to or equal than 1, in accordance with one embodiment of the invention.

The user interface depicted in screenshot 282 of FIG. 10H may be accessed by the selection of validations tab 284. Selection of greaterOrEqualToOneValidator in dropdown menu 286 results in the display of the definition of the above-mentioned greaterOrEqualToOneValidator. Toggle button 288 may be provided to disable or enable the present validation (i.e., "greaterOrEqualToOneValidator"). In the present example, greaterOrEqualToOneValidator is enabled. Field 290 may be provided to specify the validator name. In the present example, the validator name is specified as greaterOrEqualToOneValidator. Dropdown menu 292 specifies the "Operator" or type of evaluation performed by the validator. Choices for the "Operator" include "Equals", "Not equals", "Contains", "Does not contain", "Less Than", "Greater Than", "Less or Equal", "Greater or Equal", "Starts with" and "Ends with". In the present example, the operator of "Greater or Equal" is selected. Dropdown menu 294 specifies the time at which the evaluation will be performed, whether performed immediately before an action is performed on the DOM element (i.e., pre-Action) or immediately after an action is performed on the DOM element (i.e., post-Action). In the present example, the "Action" of "Post-Action" is selected. Dropdown menu 296 specifies a variable type, the value of which will be subject to the evaluation. Choices for the variable type include "Attribute", "Text" and "Id".

In the present example, the variable type is "Text", so the text content present in the DOM element corresponding to quantityText object 55 will be subject to the evaluation specified in dropdown menu 292. Text field 298 specifies an expected value for the evaluation (in this example, the evaluation is a comparison). The expected value could be the value of a variable (as in "$preText" from FIG. 10F), or could be a static value. In the present example, the expected value is the static value of "1". In summary, the greaterOrEqualToOneValidator determines whether the text content present in the DOM element corresponding to the quantityText object 55 after an action is performed on the instant DOM element (i.e., corresponding to text being input into quantityText object 55) is greater than or equal to one.

Figure 9E:
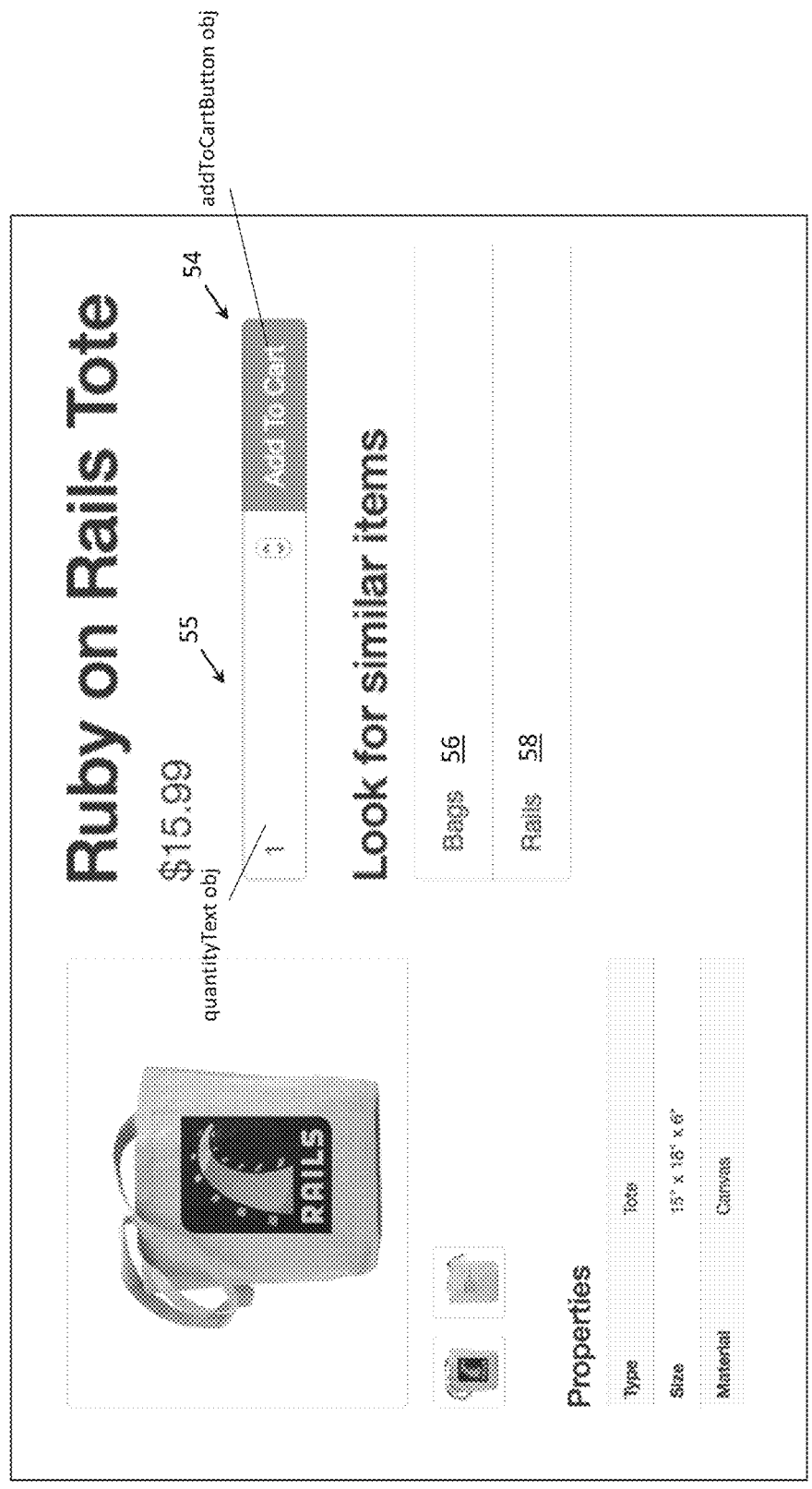
FIG. 9E depicts a webpage with a particular categorization of GUI objects, in accordance with one embodiment of the invention.
Figure 9G:
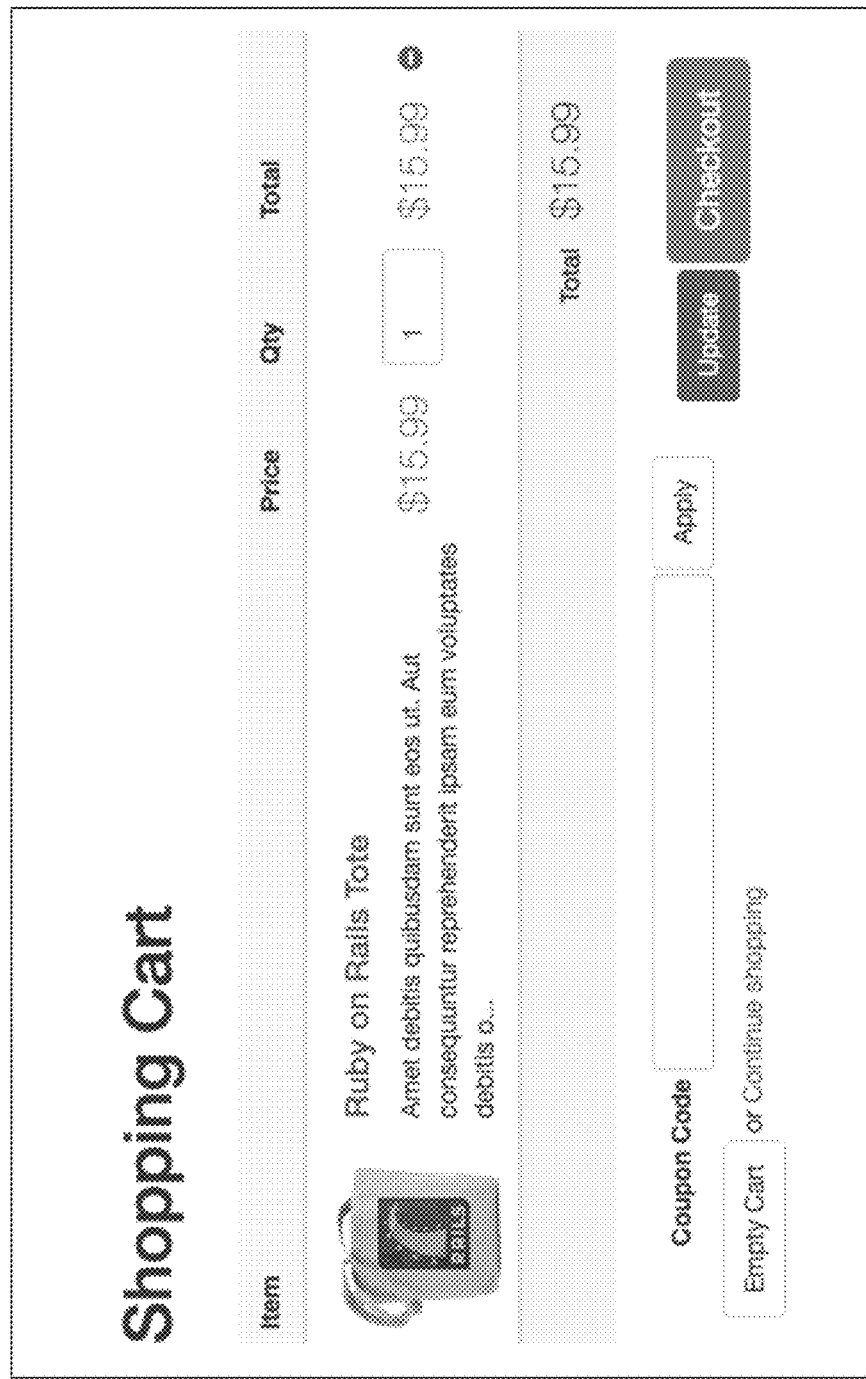
FIG. 9G depicts a webpage, in accordance with one embodiment of the invention.

Using webpage 18 from FIG. 9E as an example, upon the number "3" being input into quantityText object 55 as part of a custom action during the blueprint generation process, the greaterOrEqualToOneValidator associated with the quantityText Smart Tag may be executed, which determines that "3" is greater than 1. As a result, the greaterOrEqualToOneValidator returns the result of success.

Definition of the Title Smart Tag

Figure 10I:
FIG. 10I depicts a screenshot of a user interface for configuring an element classifier for identifying DOM elements encoding title objects, in accordance with one embodiment of the invention.

The user interface depicted in screenshot 300 of FIG. 10I includes the definition of a Smart Tag to model title objects 42, 44, 50 in webpages 12, 14 and 16, respectively, so as to identify DOM elements that correspond to title objects in a webpage. Selection of title in dropdown menu 204 results in the display of the definition of the "title" Smart Tag. "Disable" toggle button 206 may allow enabling or disabling the instant Smart Tag. Enabling the instant Smart Tag will enable the automatic identification of DOM elements that correspond to title objects in webpages during the modeling of a website (i.e., during the process of creating the state machine model). Disabling the instant Smart Tag will disable the automatic identification of DOM elements that correspond to title objects in webpages during the modeling of a website (i.e., during the process of creating the state machine model). In the current example, the title Smart Tag is enabled.

Field 210 may allow the designation of a Smart Tag name, analogous to object group names 125, 129 in FIG. 2. In the instant example, the Smart Tag name is specified as "title". Dropdown menu 212 may allow the designation of a valid HTML tag that is associated with the title objects. The code fragment of title object 42 is <h1 class="taxon-title">Bags</h1>, as depicted in FIG. 9D. The code fragment of title object 44 is <h1 class="taxon-title">Mugs</h1>. The code fragment of title object 50 is <h1 class="taxon-title">Clothing</h1>. All of these code fragments include the HTML tag <h1>, so "h1" is selected in dropdown menu 212. The valid HTML tag is one example of the previously described code characteristics. Dropdown menu 214 may allow the designation of a Smart Tag type that is associated with the title objects. In the present case, the Smart Tag type is selected as "prop", because the title is solely to be used to create a locator (for purposes of creating the fingerprint of state) and is not for creating new edges or "Navigation actions". The use of the title Smart Tag will be more clearly understood in the blueprint creation process explained in FIGS. 11A-11J. No extractors or evaluations (whether validators or auto validation) are indicated for the title Smart Tag. Likewise, no scanning mode (or options) are indicated for the title Smart Tag.

The "Rules" section may allow the input of one or more additional code characteristics associated with the title objects 42, 44 and 50 (i.e., in addition to HTML Tag 212). Upon inspecting the code fragments associated with the title objects 42, 44 and 50, one may notice that these code fragments all include the code characteristic class="taxon-title", which is expressed as an attribute—value pair. As such, a rule is added of the type "Attribute Contains Value" (via dropdown menu 302a), in which the attribute is specified as "class" (via field 302b) and the value is specified as "taxon-title" (via field 302c). Such rule (i.e., code characteristic) is associated with importance value 302d. In the present example, the importance value is specified as 100%, since the code characteristic (i.e., class="taxon-title") was common to all instances of the code fragments corresponding to the title objects. If such code characteristic is no longer needed, it may be removed by selecting remove button 302e.

Figure 10J:
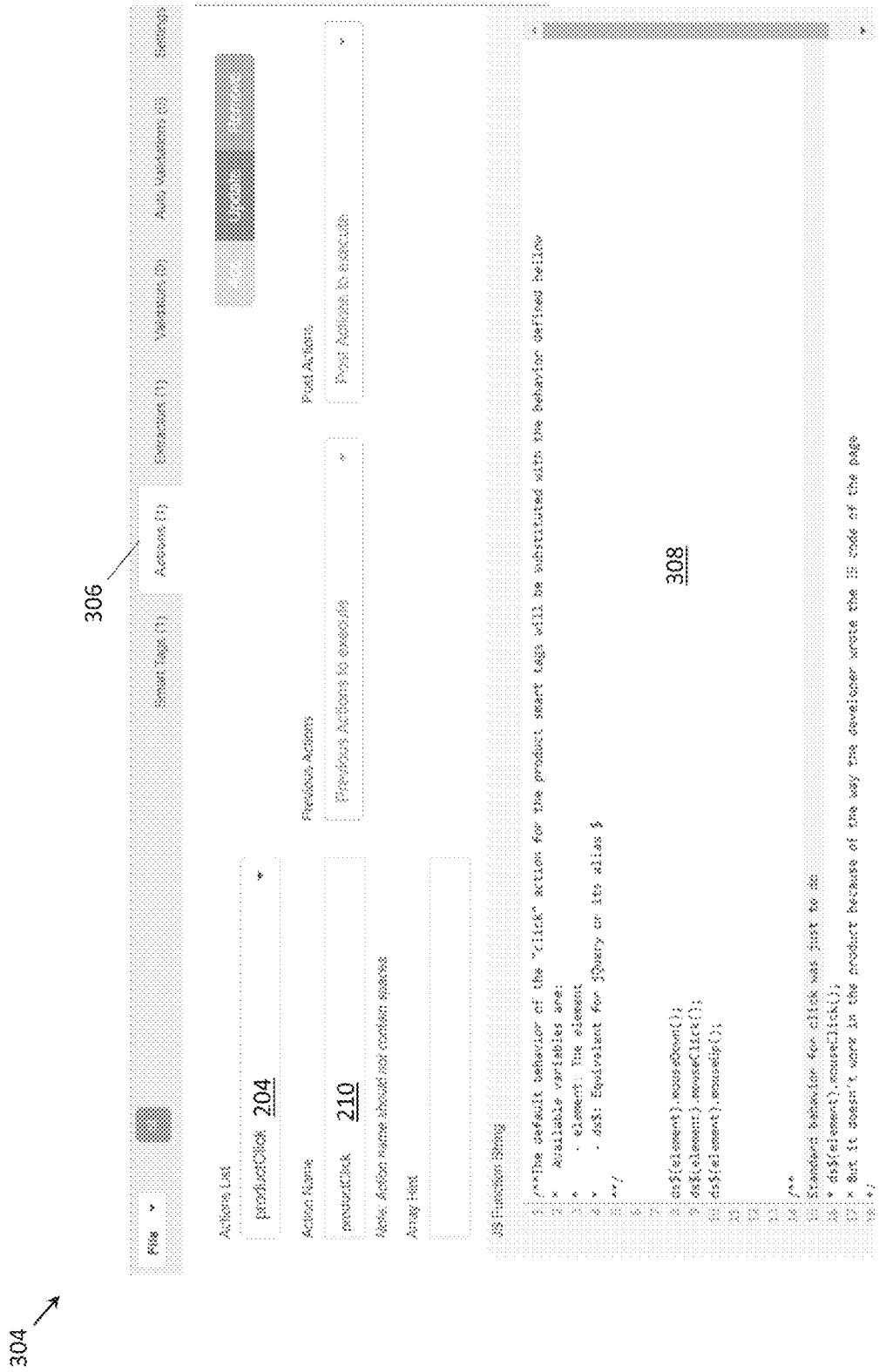
FIG. 10J depicts a screenshot of a user interface for configuring an action behavior, in accordance with one embodiment of the invention.

FIG. 10J depicts user interface 304 for defining a custom action behavior that may be accessed by the selection of actions tab 306. Dropdown menu 204 may be used to select a custom action behavior. In the present example, the custom action behavior is selected as "productClick". Textbox 210 may be used to specify an "action name" (i.e., a name for the custom action behavior). In the present example, the "action name" is specified as "productClick". Textbox 308 may be used to input javaScript, and such javaScript may specify DOM events arranged in a first order that is triggered with a DOM element in order to simulate an action being performed on the DOM element.

FIG. 10K provides a summary of extractors, validators and auto validations. Extractors are logically grouped into two types: pre-action extractors and post-action extractors. Pre-action extractors are extractors with the "Extraction Time" specified as "Pre-Action", and Post-action extractors are extractors with the "Extraction Time" specified as "Post-Action". For pre-action extractors, an extraction of a value from a DOM element and the storing of the extracted value into a variable is performed immediately prior to an action being performed on the DOM element. For post-action extractors, an extraction of a value from a DOM element and the storing of the extracted value into a variable is performed after an action is performed on the DOM element.

Validators are logically grouped into two types: pre-action validators and post-action validators. Pre-action validators are validators with the "Validation Time" specified as "Pre-Action", and Post-action validators are validators with the "Validation Time" specified as "Post-Action". For pre-action validators, an extraction of a value from a DOM element and an evaluation (e.g., a validation) of the extracted value is performed immediately prior to an action being performed on the DOM element. For post-action validators, an extraction of a value from a DOM element and an evaluation (e.g., a validation) of the extracted value is performed after an action is performed on the DOM element.

There is only one logical group of auto validations. For auto validations, an extraction of a value from a DOM element is performed immediately prior to an action being performed on the DOM element, and then an evaluation of the extracted value is performed immediately after the action is performed on the DOM element.

Blue Print Creation

After the modeling of the GUI objects has been completed via the creation of the Smart Tags, the process then continues with the modeling of the website via the creation of a state machine (or blueprint). For clarity of explanation, the creation of the state machine will be explained in the context of the website depicted in FIGS. 1A-1J. It is understood that such a process to create a state machine can be applied to other websites (or other applications in general). The following description will concentrate on generating a state machine (or blueprint) based on Smart Tags. However, it is noted that it is possible to generate a state machine (or blueprint) based on a subset of conventional HTML or XML tags (e.g., <a>, <input>, <button>, <select>, etc.), but scanning options such as "once per app" and "one per page" may not be usable with the conventional HTML tags, since regular HTML tags may not have sufficient specificity to discriminate between different types of objects (such as product objects and menu objects).

Figure 11A:
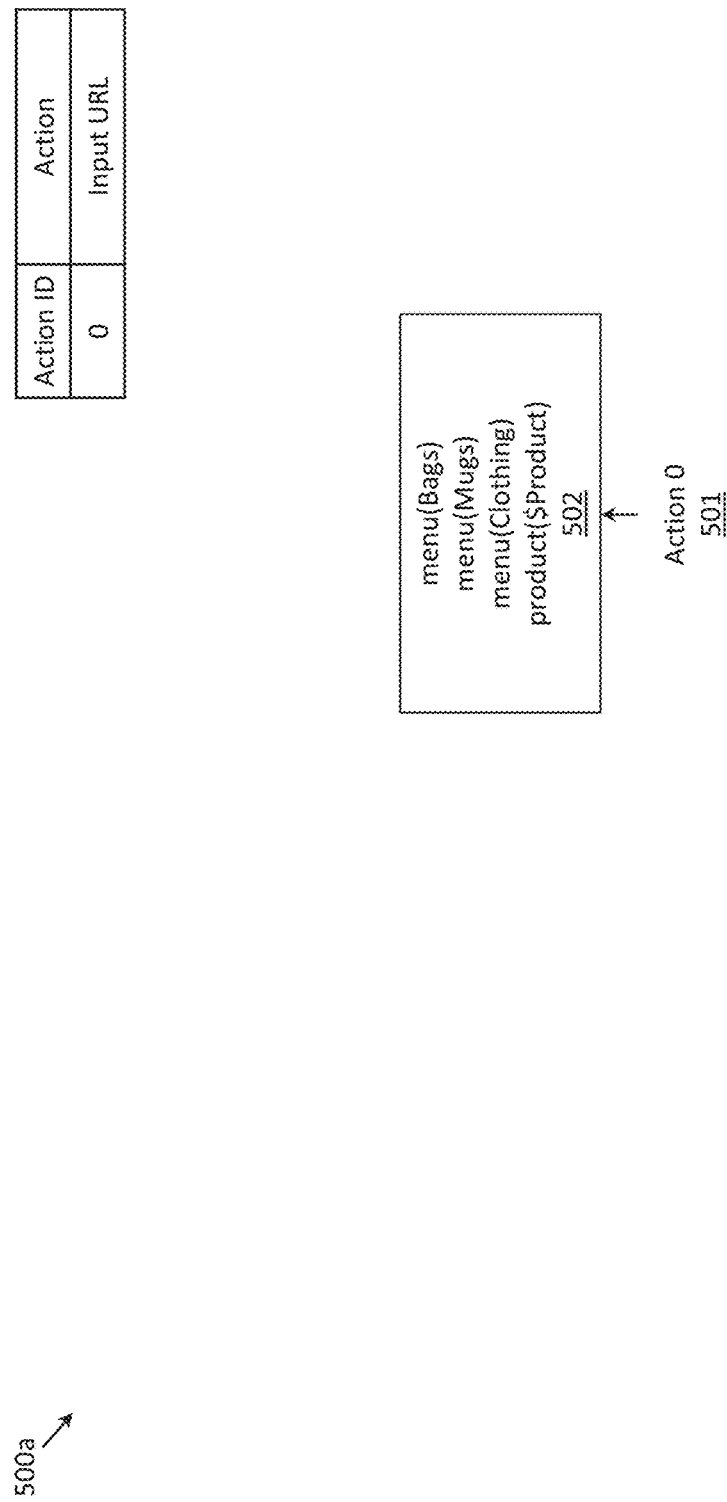

FIG. 11A depicts partial state machine 500a after the creation of edge 501 to model the action to navigate to home page 10 and the creation of state 502 to model home page 10. Edge 501 may include an action identifier, which may be an integer that is unique to each of the edges. In the present example, edge 501 records the action identifier of "Action 0". An auxiliary table may map each of the action identifiers to an action. In the present example, the auxiliary table maps "Action 0" to the action of "Input URL". The action of "Input URL" is simplified so as to simplify the presentation of the auxiliary table in FIG. 11A. In a more realistic example, "Action 0" may be mapped to the action of "Input https://demosite(dot)appvance(dot)com into the browser". Edge 501 may also record the one or more HTTP requests that are transmitted from the client device (on which the browser is running) to the server (on which the website is hosted). Such HTTP requests are transmitted as a result of executing "Action 0", and cause the loading of home page 10. For conciseness of presentation, the HTTP requests are not depicted with edge 501.

The one or more HTTP requests that are recorded may belong to user-defined domains, in order to allow the elimination of HTTP requests for advertisements, and other HTTP requests such as tracking requests. One or more portions of the HTTP requests that are recorded may include at least one of a uniform resource locator (URL), a header and at least a fragment of a body of an HTTP request. The reason for recording HTTP requests will become more apparent during the subsequent description of the automated generation of test scripts based on prior user logs. In short, the HTTP requests recorded in the user logs can be compared to the HTTP requests stored in association with the edges of the state machine in order to determine the particular edges that were encountered in the user log. The determination of the edges encountered in the user log then may allow for the inference of likely path(s) by the user through the state machine, allowing the generation of test cases which resemble the likely path(s) that were taken by the user.

State 502 may include certain identifying characteristics of home page 10. In one embodiment, the identifying characteristics are determined based on the one or more DOM elements identified by the previously defined Smart Tags (e.g., the menu Smart Tag, the product Smart Tag, the addToCartButton Smart Tag, the quantityText Smart Tag, and the title Smart Tag). In the present case, the menu Smart Tag identifies a DOM element corresponding to the "Bags" menu object 28, a DOM element corresponding to the "Mugs" menu object 30, and a DOM element corresponding to the "Clothing" menu object 32. The DOM elements identified by the menu Smart Tag may be summarized into "locators", which may form part of the identifying characteristics of state 502 that models home page 10. A locator may include the name of the Smart Tag (in this case "menu"), followed by the text content of the DOM element in parentheses. Hence, the DOM element corresponding to "Bags" menu object 28 may be summarized into the locator "menu(Bags)"; the DOM element corresponding to "Mugs" menu object 30 may be summarized into the locator "menu (Mugs)"; and so on. The syntax of a locator need not be exactly as defined above. What is important is that a locator unambiguously identifies a DOM element.

Recall, the "once per app" scanning option 218 was selected for the menu Smart Tag. Such scanning option only has an effect when edges of the state machine are created, so it does not influence the determination of the identifying characteristics of home page 10. On the other hand, the "one per page" scanning option 244 of the product Smart Tag does influence the determination of the identifying characteristics of home page 10. With the "one per page" scanning option selected for the product Smart Tag, the element classifier of the product Smart Tag may identify whether or not there exists at least one DOM element that corresponds to the product Smart Tag). In the present case, at least one DOM element that corresponds to the product Smart Tag is identified (since there are four product objects in home page 10), so the locator may include the name of the Smart Tag (in this case "product"), followed by a variable name (in this case "$Product") within parentheses. The motivation for using the variable name instead of the text content of a product is that the variable can represent any instances of the product objects (e.g., "Ruby on Rails Tote", "Ruby on Rails Bag", "Ruby on Rails Ringer T-Shirt", etc.).

A fingerprint of each state may be computed as a hash of a sorted list (e.g., an alphabetically sorted list) of the locators of a state. Such a fingerprint may be useful when determining whether a new state needs to be created for a new webpage. More specifically, a new state may be created whenever the fingerprint of a new state does not equal any of the fingerprints of the existing states, and an edge may point to an existing state whenever the fingerprint of the new state equals one of the fingerprints of the existing states. The computed fingerprint may be stored in association with its corresponding state. For the sake of conciseness, fingerprints are not depicted in FIGS. 11A-11G.

It is noted that there may be objects in webpage 10 that are not summarized in the identifying characteristics of state 502, such as the "Shop by Categories" heading. In the present case, "Shop by Categories" is encoded by the code fragment (<h4 class="taxonomy-root">Shop by Categories</h4>). DOM elements with code characteristics present in the above code fragment are not identified by any of the previously defined Smart Tags, so the "Shop by Categories" heading is not summarized in the identifying characteristics of state 502. In short, whether or not a DOM element is summarized in the identifying characteristics of a state may depend on the Smart Tags that are defined and enabled. In the present example, the identifying characteristics of state 502 include menu(Bags), menu(Mugs), menu(Clothing) and product($Product).

At this point, the concept of using multiple threads and multiple browsers (or multiple devices, in the case of a mobile application) for creating the state machine (or blueprint) is described. The use of multiple threads allows for the execution of multiple browsers in parallel, one browser for each of the threads. The reason for using multiple browsers is to allow multiple paths of a state machine (or blueprint) to be created in parallel. In the example of FIG. 11A, the path from "Action 0" to an action being performed on the DOM element identified by menu(Bags) may be created by one thread; the path from "Action 0" to an action being performed on the DOM element identified by menu(Mugs) may be created by another thread; and so on. A thread (and its associated browser) may continue to exist as long as there are additional DOM elements in the current webpage displayed in the browser that have not yet been explored (e.g., clicked on, dragged on, etc.)

Returning to the present example of FIG. 11A, the thread that performs "Action 0" in order to arrive at home page 10 may continue to model an edge associated with the DOM element corresponding to "Bags" menu object 28 from state 502. As a result of the "once per app" scanning option, before even clicking on the DOM element corresponding to "Bags" menu object 28, the thread may first determine whether another instance of DOM element corresponding to the "Bags" menu object 28 has previously been clicked (i.e., by searching for whether the identifying characteristics of menu(Bags) already exists for a previously created edge). If so, the new edge may duplicate the previously created edge, and the new edge can be created without even clicking on the DOM element corresponding to "Bags" menu object 28.

Figure 11B:
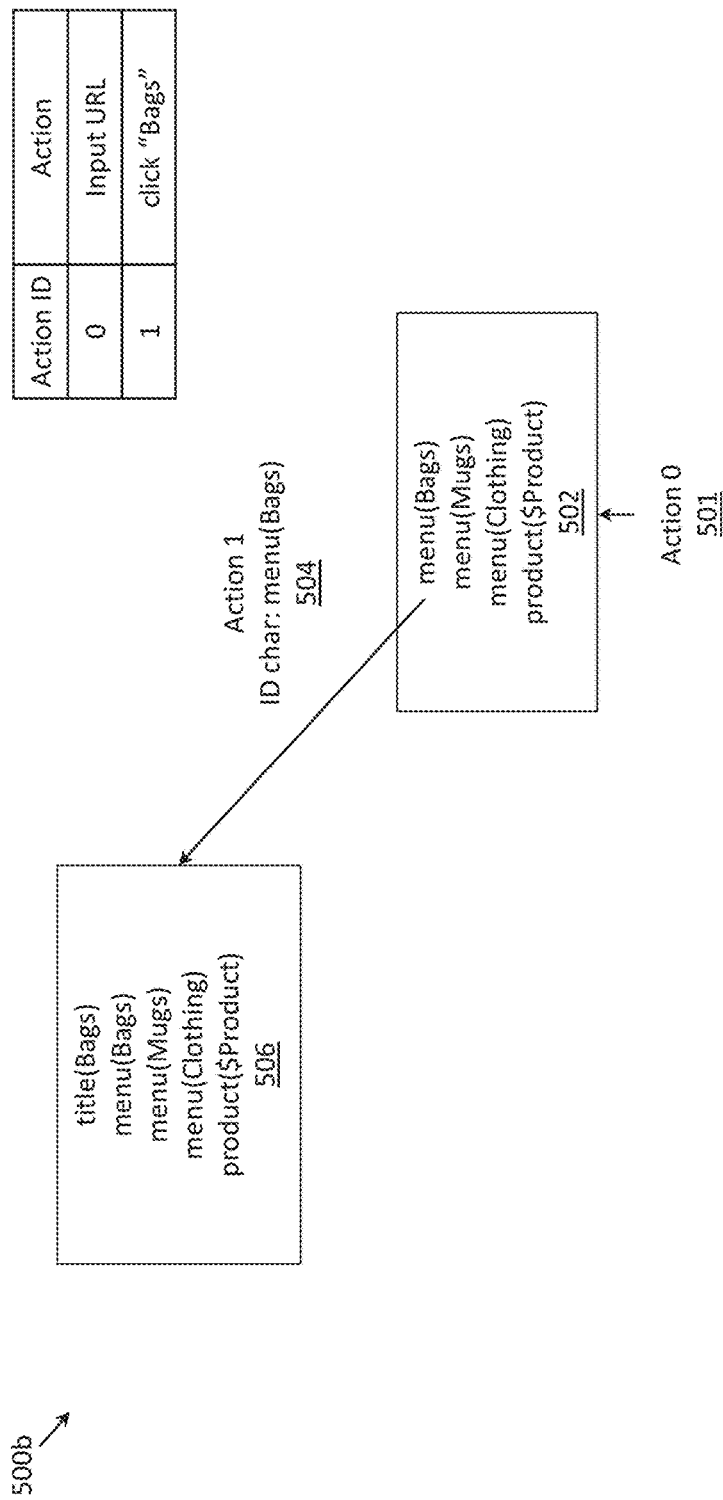

In the present example, there are no previously created edges with the identifying characteristics of menu(Bags), so the "once per app" scanning option does not provide any time savings. (The time savings, however, will be illustrated below in FIG. 11G below.) As such, the thread may click the DOM element corresponding to "Bags" menu object 28 in webpage 10 (without any user input since the menu Smart Tag was defined with the "Navigation" Smart Tag type), and create edge 504 from state 502 (as depicted in FIG. 11B) to model an action being performed on the "Bags" menu object 28 in webpage 10.

Edge 504 may be labeled with two attributes: an action identifier and an identifying characteristic. In the present example, Action 1 is mapped to the action of click "Bags" (which generally includes any selection action by a cursor, whether the action was a click by a mouse, a tap on a trackpad, a tap on a touchscreen, etc.). The identifying characteristic of edge 504 may be the locator of the DOM element that was the target of the action (i.e., locator of the "Bags" menu object 28). In the instant example, the identifying characteristic is menu(Bags).

Next, the file encoding webpage 12 is retrieved, and identifying characteristics of webpage 12 are determined based on the file encoding webpage 12. In the present example, the identifying characteristics are title(Bags) corresponding to "Bags" title object 42, menu(Bags) corresponding to "Bags" menu object 28, menu(Mugs) corresponding to "Mugs" menu object 30, menu(Clothing) corresponding to "Clothing" menu object 32, and product ($Product) corresponding to any of the product objects 34, 36. The determined identifying characteristics are then compared to the identifying characteristics of the existing states. In an efficient implementation, the fingerprint of the new state is compared to the fingerprint of the existing states. If an existing state is determined with the same identifying characteristics, edge 504 would point to this existing state. In the present example, there are no existing states with the same identifying characteristics that were determined for webpage 12. Therefore, a new state 506 is created with those identifying characteristics, and edge 504 points from state 502 to state 506, as depicted in partial state machine 500*b* of FIG. 11B.

Since the menu Smart Tag was defined with the textAutoValidation, the thread performing an action on the DOM element corresponding to Bags menu object 28 also executes the textAutoValidation, which causes the text content "Bags" to be extracted from the DOM element corresponding to the Bag menu object 28, and the text content of the body DOM element of webpage 12 (i.e., the resulting webpage) to be searched for the text content "Bags". Since webpage 12 contains the title "Bags", the textAutoValidation returns the result of success. Such result may be saved with edge 504. In addition, the HTTP requests transmitted from the client to the server as a result of performing Action 1 may be saved with edge 504.

Figure 11C:
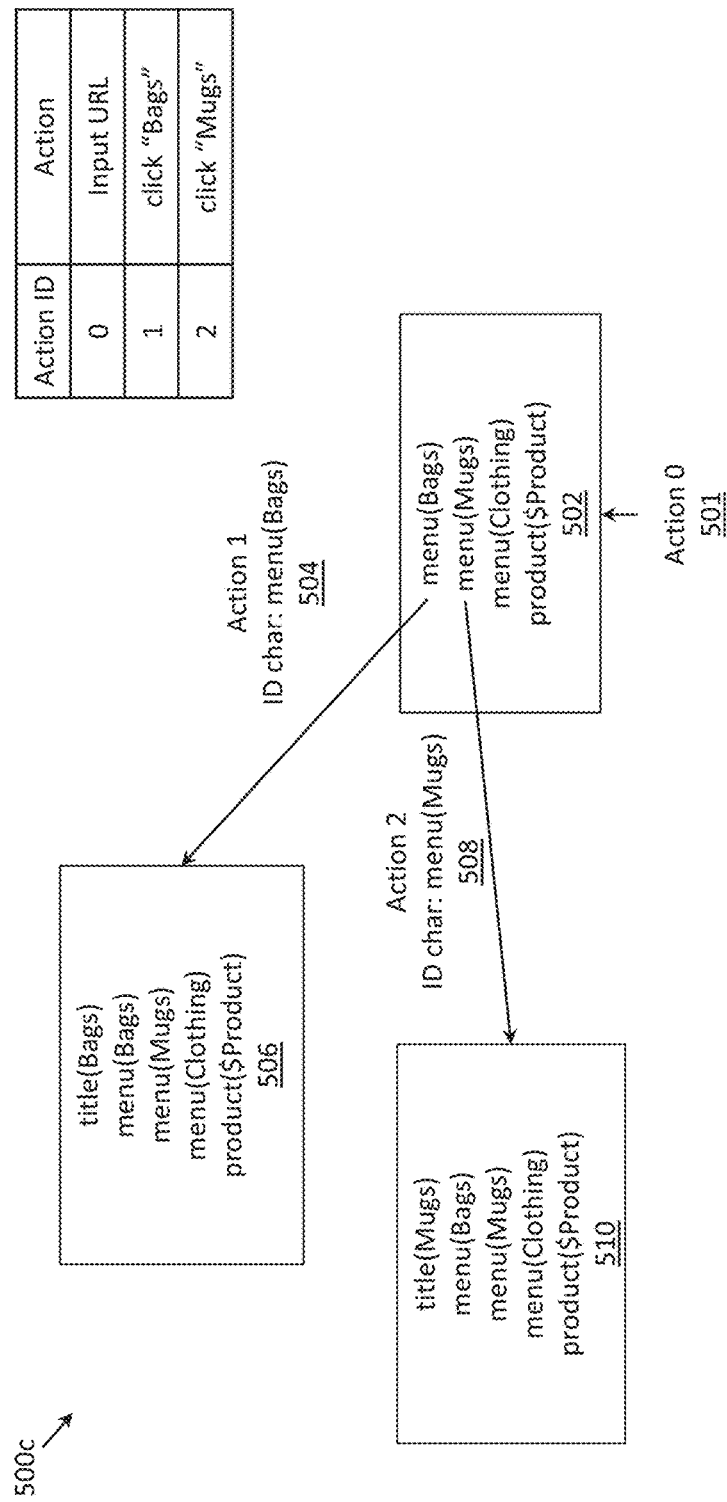

While the thread and its associated browser are creating edge 504 and state 506, a separate thread with its own browser may create edge 508 and state 510 (as shown in FIG. 11C). Even though the creation of edges 504 and 508 from state 502 are depicted in a sequential fashion in FIGS. 11B and 11C for clarity, it is noted that such processes may occur in parallel using two separate threads. In order to perform an action on the DOM element corresponding to the "Mugs" menu object 30 in webpage 10, a thread (i.e., a thread separate from the thread that created edges 501/504 and states 502/506) first performs a sequence of actions from the root of the state machine in the browser to reach webpage 10. In the current example, the sequence of actions just includes action 0 ("Input URL"). Upon reaching webpage 10, the thread may determine that the "once per app" scanning option has been enabled for the menu Smart Tag. As a result of the "once per app" scanning option, before even performing an action on the DOM element corresponding to the "Mugs" menu object 30, the thread may first determine whether another a DOM element corresponding to another instance of the "Mugs" menu object 30 has previously been clicked (i.e., by searching for whether the identifying characteristics of menu(Mugs) already exists for a previously created edge). If so, edge 508 may duplicate the previously created edge, and edge 508 can be created without even performing an action on the DOM element corresponding to the "Mugs" menu object 30.

In the present example, there are no previously created edges with the identifying characteristics of menu(Mugs), so the "once per app" scanning option does not provide any time savings. As such, the thread may perform an action on the DOM element corresponding to the "Mugs" menu object 30 in webpage 10 and create edge 508 from state 502 (as depicted in FIG. 11C) to model the action of selecting the "Mugs" menu object 30 in webpage 10.

Edge 508 may be labeled with two attributes: an action identifier of "2" (that is mapped to the action of click "Mugs") and an identifying characteristic of "menu(Mugs)". The file encoding webpage 14 may then be retrieved, and identifying characteristics of webpage 14 may be determined (i.e., title(Mugs) corresponding to "Mugs" title object 44, menu(Bags) corresponding to "Bags" menu object 28, menu(Mugs) corresponding to "Mugs" menu object 30, menu(Clothing) corresponding to "Clothing" menu object 32, and product($Product) corresponding to any of the product objects 46, 48). Since there are no existing states with the same identifying characteristics as webpage 14, state 510 may be created with those identifying characteristics, and edge 508 may point from state 502 to state 510, as depicted in partial state machine 500*c* of FIG. 11C.

Since the menu Smart Tag was defined with the textAutoValidation, the selection of the DOM element corresponding to Mugs menu object 30 by the thread may also execute the textAutoValidation, which causes the text content "Mugs" to be extracted from the DOM element corresponding to Mugs menu object 30, and the body DOM element corresponding to webpage 14 (i.e., the resulting webpage) to be searched for the text content "Mugs". Since webpage 12 contains the title "Mugs", the textAutoValidation returns the result of success. Such result may be saved with edge 508. In addition, the HTTP requests transmitted from the client to the server as a result of performing Action 2 may be saved with edge 508.

Figure 11D:
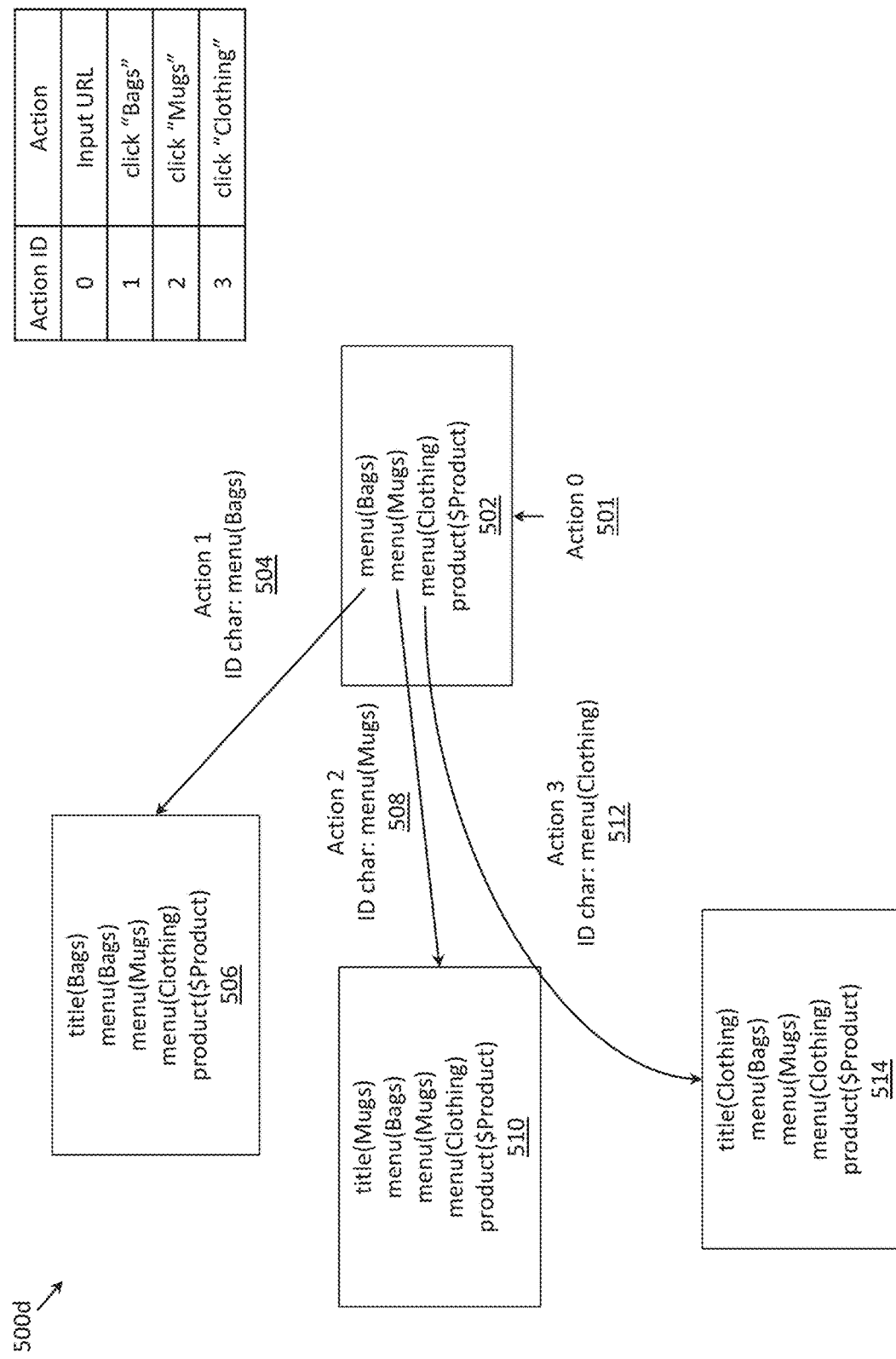

In parallel with the creation of edges 504/508 and states 506/510, a separate thread with its own browser may create edge 512 and state 514 (as shown in FIG. 11D). Even though the creation of edges 504, 508 and 512 from state 502 are depicted in a sequential fashion in FIGS. 11B, 11C and 11D for clarity, it is again noted that such processes may occur in parallel with three separate browsers (and three threads). The creation of edge 512 and state 514 follows the same logical steps as the creation of edge 508 and state 510, and hence such process will be omitted for conciseness.

Figure 11E:
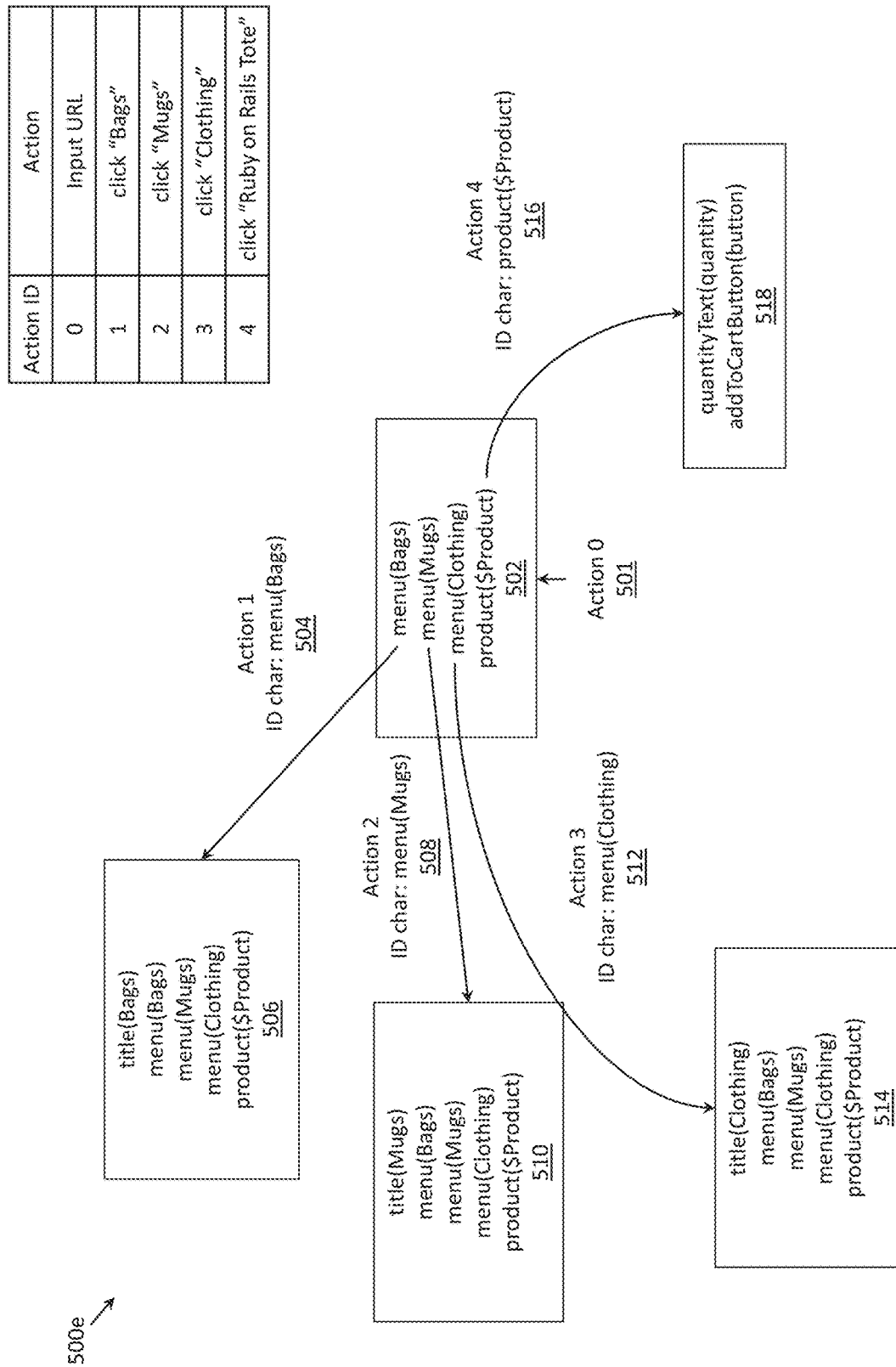

In parallel with the creation of edges 504/508/512 and states 506/510/514, a separate thread with its own dedicated browser may create edge 516 and state 518 (as shown in FIG. 11E). Even though the creation of edges 504, 508, 512 and 516 from state 502 are depicted in a sequential fashion in FIGS. 11B, 11C, 11D and 11E for clarity, it is noted that such processes may occur in parallel with four separate browsers (and four threads). In one embodiment, there may be a user-specified parameter called "max browsers", which limits the number of browsers (and threads) that are executed in parallel. In the present example, if the max browsers were set as "3", three browsers may execute in parallel to create edges 504/508/512 and states 506/510/514. Then, one of the three browsers may close, before a new browser opens to create edge 516 and state 518.

In the example of creating edge 516 (i.e., which models the action of clicking the "Ruby on Rails Tote" product object 34 in webpage 10), a new thread (executing on its own browser) may be instantiated. The thread first performs the sequence of actions from the root of the state machine in the browser to reach webpage 10. In the current example, the sequence of actions just includes action 0 ("Input URL"). Upon reaching webpage 10, the thread may recognize that there are multiple products objects present in webpage 10, and as a result of the "one per page" scanning option, the thread clicks on only one (or a small number) of the DOM elements corresponding to the product objects and creates edge 516 from state 502 (as depicted in FIG. 11E) to model the action of selecting one of the product objects in webpage 10. In the present example, the thread only clicks on the DOM element corresponding to the "Ruby on Rails Tote" object 34.

Edge 512 may be labeled with two attributes: action ID of "4" (that is mapped to the action of click "Ruby on Rails Tote") and the identifying characteristic of "product($Product)". The text of the locator is specified as "$Product" instead of "Ruby on Rails Tote" due to the product Smart Tag being defined with the "one per page" scanning option. Next, the file encoding webpage 18 is retrieved, and identifying characteristics of webpage 18 may be determined (e.g., quantityText(quantity) corresponding to textbox 55 and addToCartButton(button) corresponding to add to cart button 54). Since there are no existing states with the same identifying characteristics as webpage 18, new state 518 may be created with those identifying characteristics, and edge 516 may point from state 502 to state 518, as depicted in partial state machine 500e of FIG. 11E. The time savings due to the "one per page" scanning option being selected for the product Smart Tag should now be apparent. Instead of generating four states, one for each of webpages 18, 20, 22 and 24 returned by the selection of product objects 34, 36, 40 and 38, respectively, only state 518 is generated to model one of webpages 18, 20, 22 and 24. In short, the "one per page" scanning option may be interpreted as avoiding the creation of states that are similar to one another.

Since the product Smart Tag was defined with the textPreExtractor extractor, an action being performed on the DOM element corresponding to Ruby on Rails Tote product object 34 on webpage 10 causes the text "Ruby on Rails Tote" to be stored in the variable preText (of the thread used to reach webpage 18). In addition, the HTTP requests transmitted from the client to the server as a result of performing Action 4 may be saved with edge 516.

Since the quantityText object 55 is of Smart Tag type "Text" and the addToCartButton object 54 is of Smart Tag type "Action", the edge(s) from these objects requires a custom action in order for the edge(s) to be created. In this particular example, the input of a number into the DOM element corresponding to quantityText object 55 does not result in the creation of an edge from state 518 as webpage 18 stays unchanged, except for the number in the quantityText object 55. Alternatively, one may conceptually interpret the input of a number into quantityText object 55 as a self-loop from state 518 back to state 518. As such, an edge may be created from state 518 based on a custom action that performs two actions sequentially. In the custom action, a number is first input into the DOM element corresponding to quantityText object 55 and then an action is performed on the DOM element corresponding to the addToCartButton object 54.

Figure 12:
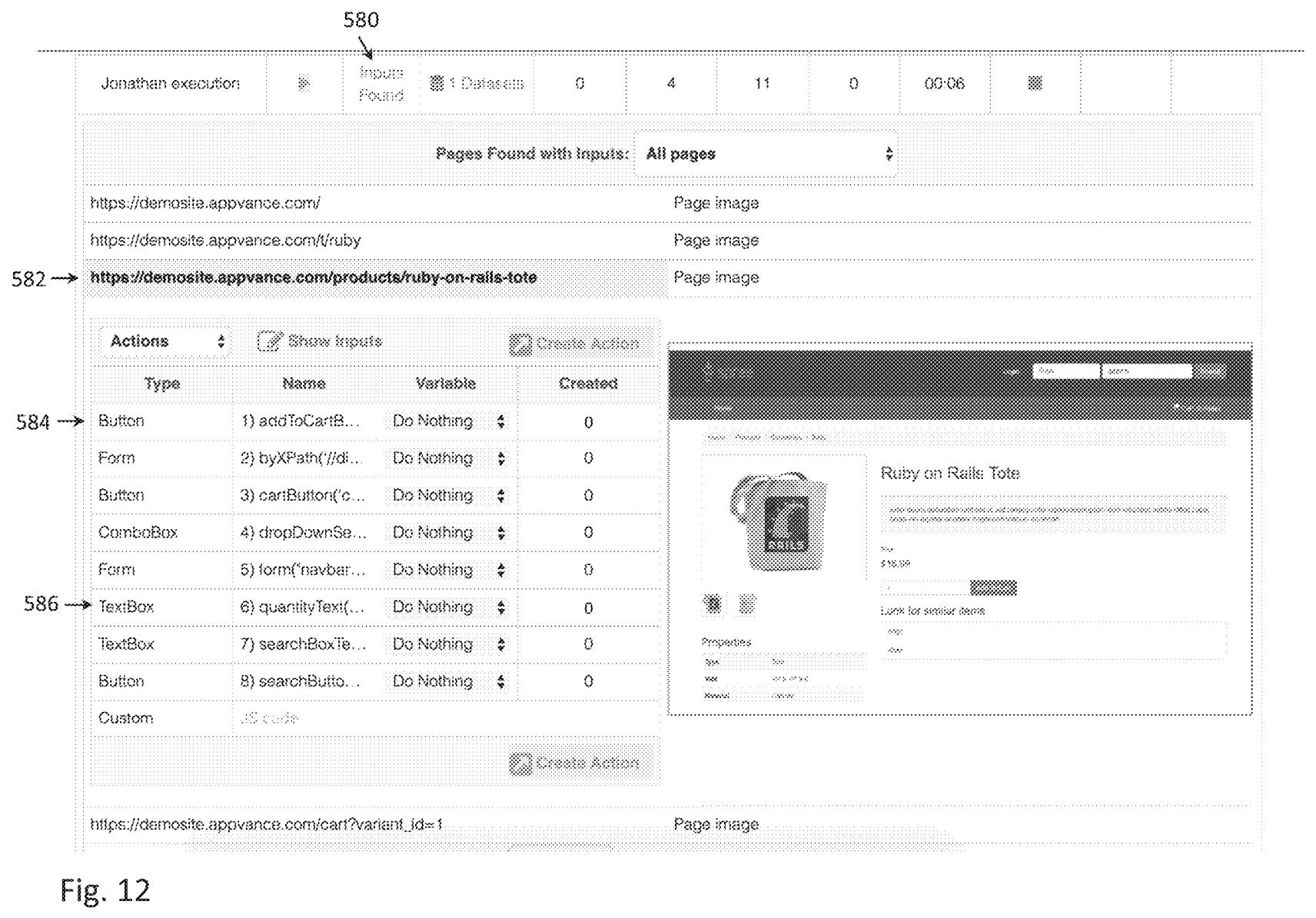
Figure 13:
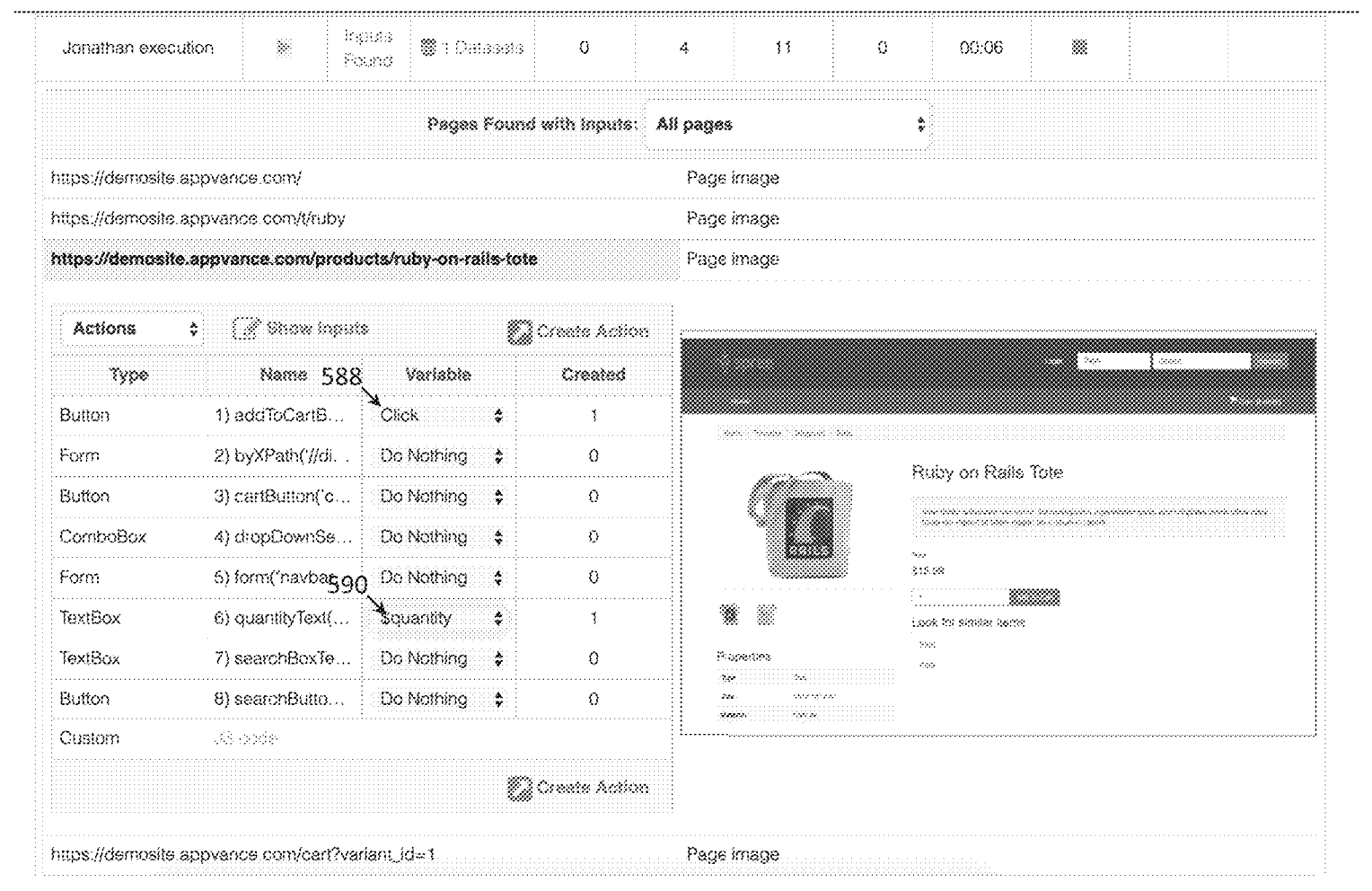
Figure 14:

FIGS. 12-14 include screenshots of a user interface that may be used to specify the above-described custom action. In FIG. 12, the user may first select the "Inputs Found" tab 580 (in which "inputs" refers to the inputs that the user may specify). The user may then select the URL 582, which corresponds to webpage 18 modeled by state 518. In the "show inputs" section, there are various inputs that the user may select to define custom actions. In the present case, in order to input a number into the DOM element corresponding to quantityText object 55 and perform an action (e.g., click) on the DOM element corresponding to addToCartButton object 54, the user locates line 584 which corresponds to addToCartButton object 54 and line 586 which corresponds to the quantityText object 55.

FIG. 13 shows the user interface after actions have been specified for quantityText object 55 and addToCartButton object 54. Using dropdown menu 588, the variable (or option) of "click" has been selected for addToCartButton object 54. Using dropdown menu 590, the variable of "$quantity" has been selected for quantityText object 55. $quantity refers to the value of a variable "quantity" stored in the DPL. In the present example, the value is "3". One advantage of specifying the value for the quantityText object 55 as "$quantity" is to make the script data driven. At a later time, the user can simply change the value of $quantity, and the value input into the DOM element corresponding to quantityText object 55 can be changed accordingly. Such advantage is more readily apparent when there are numerous instances of quantityText object 55 across numerous scripts. If the value of quantityText object 55 were specified as a static value, that value would need to be changed numerous times, once for each instance of quantityText object 55. By specifying the value of all instances of quantityText object 55 as "$quantity", the value of all instances of DOM elements corresponding to all quantityText objects 55 can be changed by only modifying the "$quantity" variable.

The inputs in the table of FIG. 13 are ordered, so the current specified sequence would click on the DOM element corresponding to addToCartButton object 54 followed by inputting 3 into the DOM element corresponding to quantityText object 55. Such sequence is reversed. The user interface allows the user to order the actions as he/she desires.

FIG. 14 shows, after a reordering operation by the user, the inputs in the desired order in which line 586 appears before line 584, such that the number "3" is first input into the DOM element corresponding to quantityText object 55, and then the DOM element corresponding to addToCartButton object 54 is clicked. The user may select "Create Action" button 592 in order to create the custom action that has been specified. Lastly, the user may select "play" button 594 in order to create an edge in the blueprint based on the custom action.

Figure 11F:
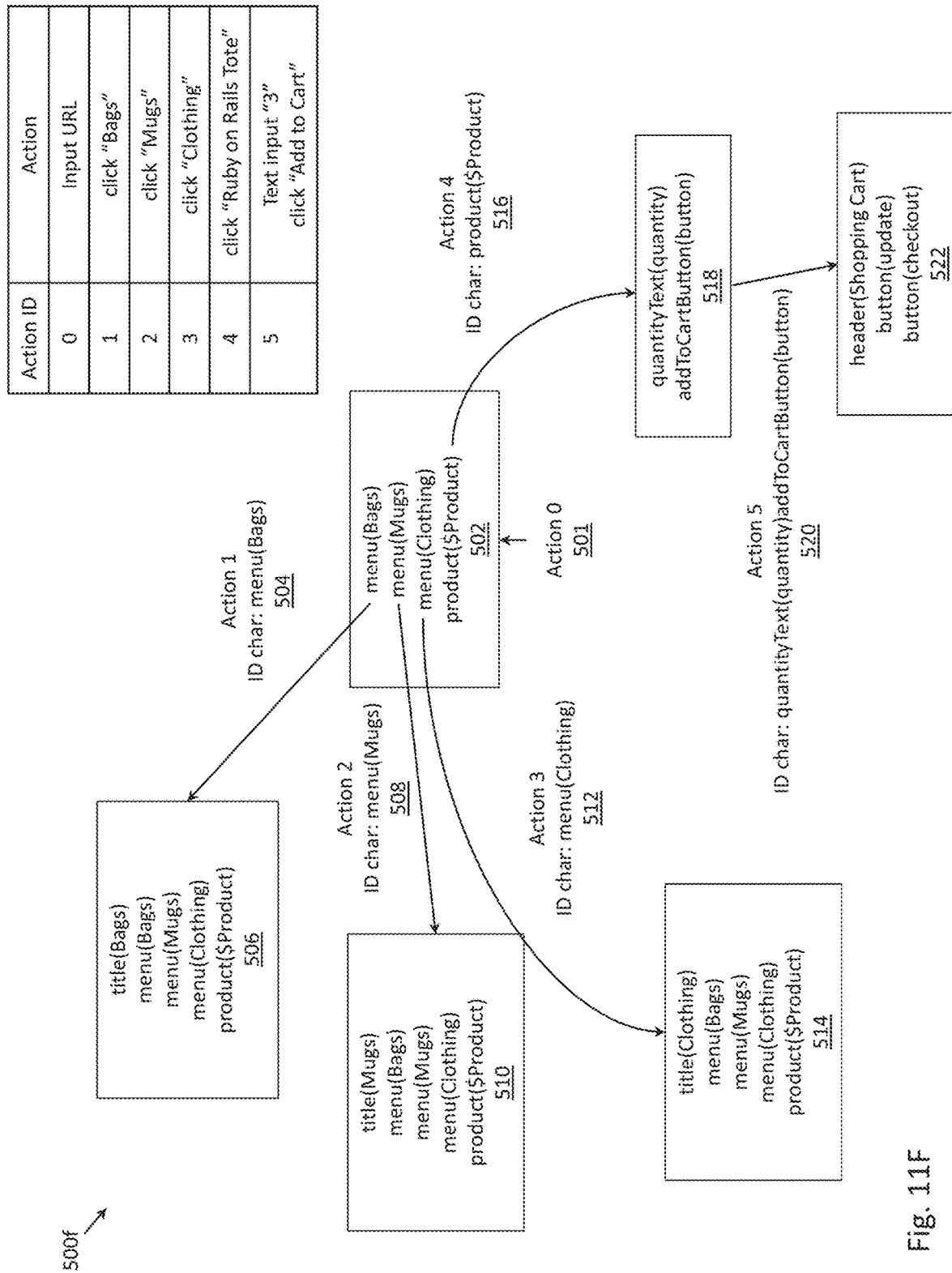
Figure 11G:
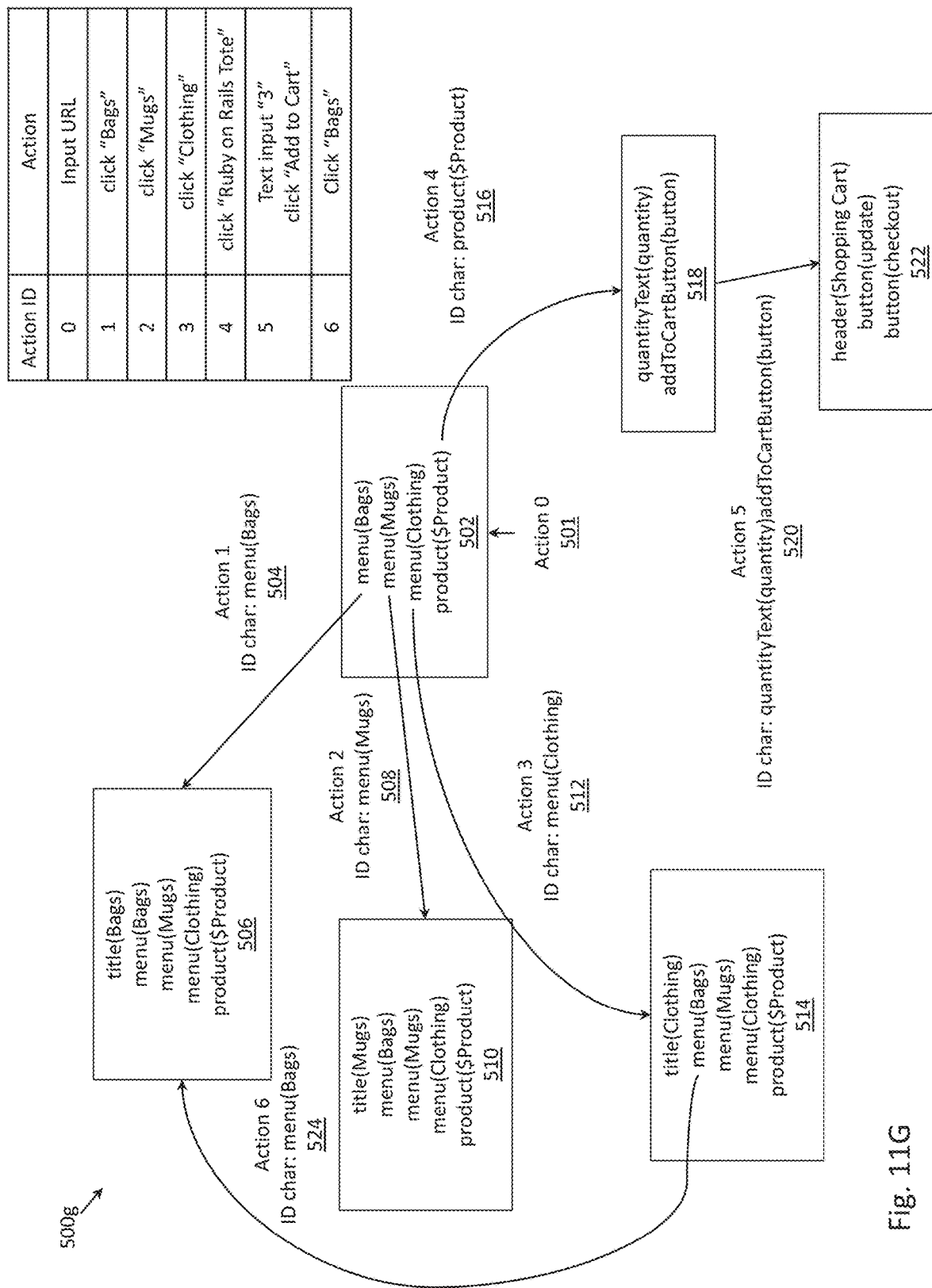

Upon "play" button 594 being selected, a new thread (executing on its own browser) may be instantiated or an existing thread may be used in order to perform the above-defined custom action in webpage 18. The thread first performs the sequence of actions from the root of the state machine in the browser to reach webpage 18. In the current example, the sequence of actions includes action 0 (i.e., "Input URL"), and action 4 (i.e., click "Ruby on Rails Tote"). Due to the product Smart Tag being defined with a textPreExtractor, the text "Ruby on Rails Tote" is stored in the variable preText (in the thread that executes the presently discussed browser). Upon reaching webpage 20, the thread may perform the above-defined custom action in webpage 20, and create edge 520 from state 518 (as depicted in FIG. 11F) to model the above-defined custom action in webpage 18.

Edge 520 may be labeled with action identifier of "5" (that is mapped to the custom action of Text input "3" and click "Add to Cart"), and the identifying characteristic of "quantityText(quantity)addToCartButton(button)" (which may be formed as a concatenated text string of the two locators that identify the two DOM elements that were subject to the custom action). The file encoding webpage 19 is then retrieved, and identifying characteristics of webpage 19 may be determined (e.g., header(Shopping Cart), button(update), button(checkout)). It is noted that the "header Smart Tag" and "button Smart Tag" were not defined in the user interfaces above, but it should now be apparent how these Smart Tags could be defined. Since there are no existing states with the same identifying characteristics as webpage 19, state 522 is created with those identifying characteristics, and edge 520 points from state 518 to state 522, as depicted in partial state machine 500f of FIG. 11F.

Since the quantityText Smart Tag was defined with the greaterOrEqualThanOneValidator, the text input of "3" into the DOM element corresponding to quantityText object 55 causes the greaterOrEqualThanOneValidator to be executed. Since "3" is greater than "1", the result of the greaterOrEqualThanOneValidator is success. Since the addToCartButton Smart Tag was defined with the productAddToCartAutoValidation, a determination is performed as to whether the body DOM element of webpage 19 contains the value "Ruby on Rails Tote" stored in the variable preText. Since "Ruby on Rails Tote" is a title of webpage 19, the result of the productAddToCartAutoValidation is success. The results of the greaterOrEqualThanOneValidator and productAddToCartAutoValidation may be stored with edge 520. In addition, the HTTP requests transmitted from the client to the server as a result of performing Action 5 may be saved with edge 520.

In the example of creating edge 524 (i.e., which models the action of clicking the "Bags" menu object 28 in webpage 16), a new thread (executing on its own browser) may be instantiated. In order to perform an action on the DOM element corresponding to "Bags" menu object 28 in webpage 16, the thread may perform a sequence of actions from the root of the state machine in the browser to reach webpage 16. In the current example, the sequence of actions includes Action 0 (i.e., "Input URL"), followed by Action 3 (i.e., click "Clothing"). Action 3 triggers the previously described textAutoValidation (determining whether the text "clothing" is present in webpage 16), which returns the result of success. Upon reaching webpage 16, the thread may determine that the "once per app" scanning option has been enabled for the menu Smart Tag. As a result of the "once per app" scanning option, before even clicking on the DOM element corresponding to "Bags" menu object 28, the thread may first determine whether a DOM element corresponding to another instance of the "Bags" menu object 28 had previously been clicked (i.e., by searching for whether the identifying characteristics of menu(Bags) already exists for a previously created edge). In the present case, the identifying characteristics of menu(Bags) already exists for edge 504. Therefore, edge 524 can be created by duplicating edge 504 (i.e., duplicating the action, identifying characteristic and the resulting state pointed to by the edge), as shown in partial state machine 500g depicted in FIG. 11G. While not shown in FIG. 11G, the result of the auto validation and HTTP requests can also be duplicated from edge 504 to edge 524. In comparison to the previous examples in which no other instances of the same menu object had previously been clicked, the time efficiency due to the "once per app" scanning option should now be apparent. In the instant example, there is no need to even perform an action on the DOM element corresponding to "Bags" menu object 28 in webpage 16, determine the identifying characteristics of webpage 12 or determine whether a state corresponding to webpage 12 had been previously created. As the creation of states and edges is a process that is repeated numerous times, one can appreciate the time savings provided by the "once per app" scanning option.

FIGS. 15A-15G illustrate the modeling of the website depicted in 1A-1J using an alternative state machine representation, in which the transitions from one webpage of the website to another webpage of the website are also represented as states. For clarity of presentation, states corresponding to webpages are denoted using rectangles, whereas states corresponding to transitions between two states are denoted using ovals. The content of the alternative state machine representation is substantially similar to the content of the state machine described in FIGS. 11A-1G, so the description provided in association with the representation of FIGS. 15A-15G will be more concise.

Figure 15A:
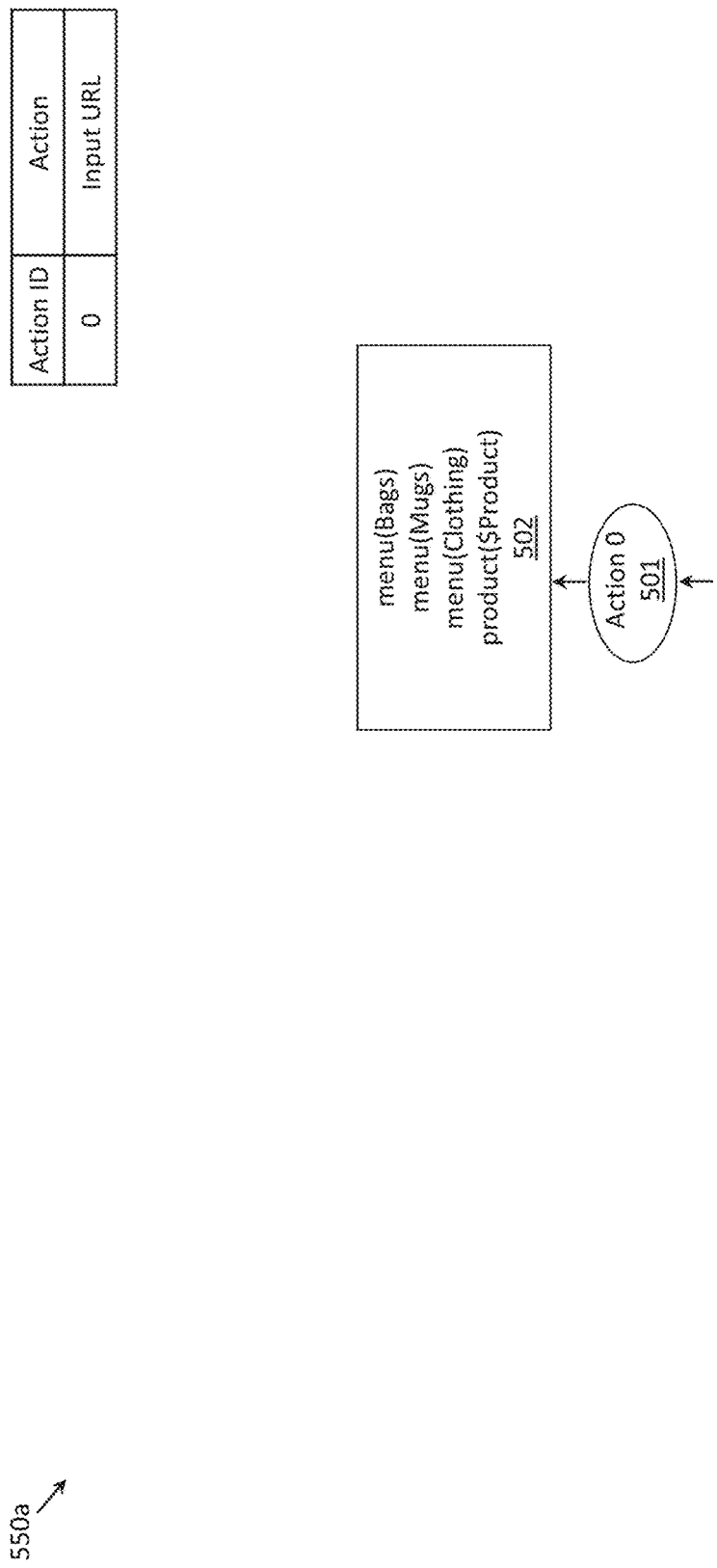
FIGS. 15A-15G depict a construction of an alternative partial state machine model of the website depicted in FIGS. 1A-1J, in accordance with one embodiment of the invention.
Figure 15B:
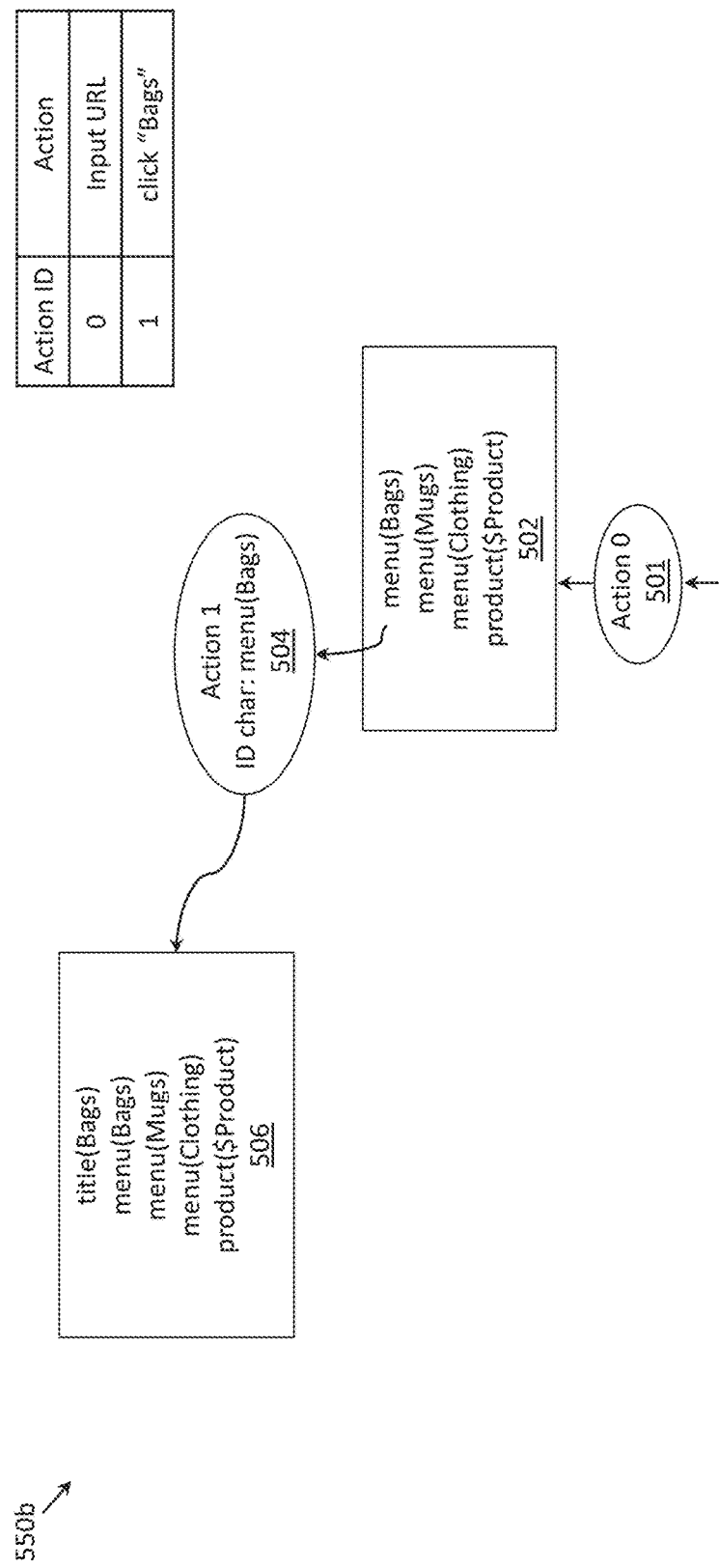
Figure 15C:
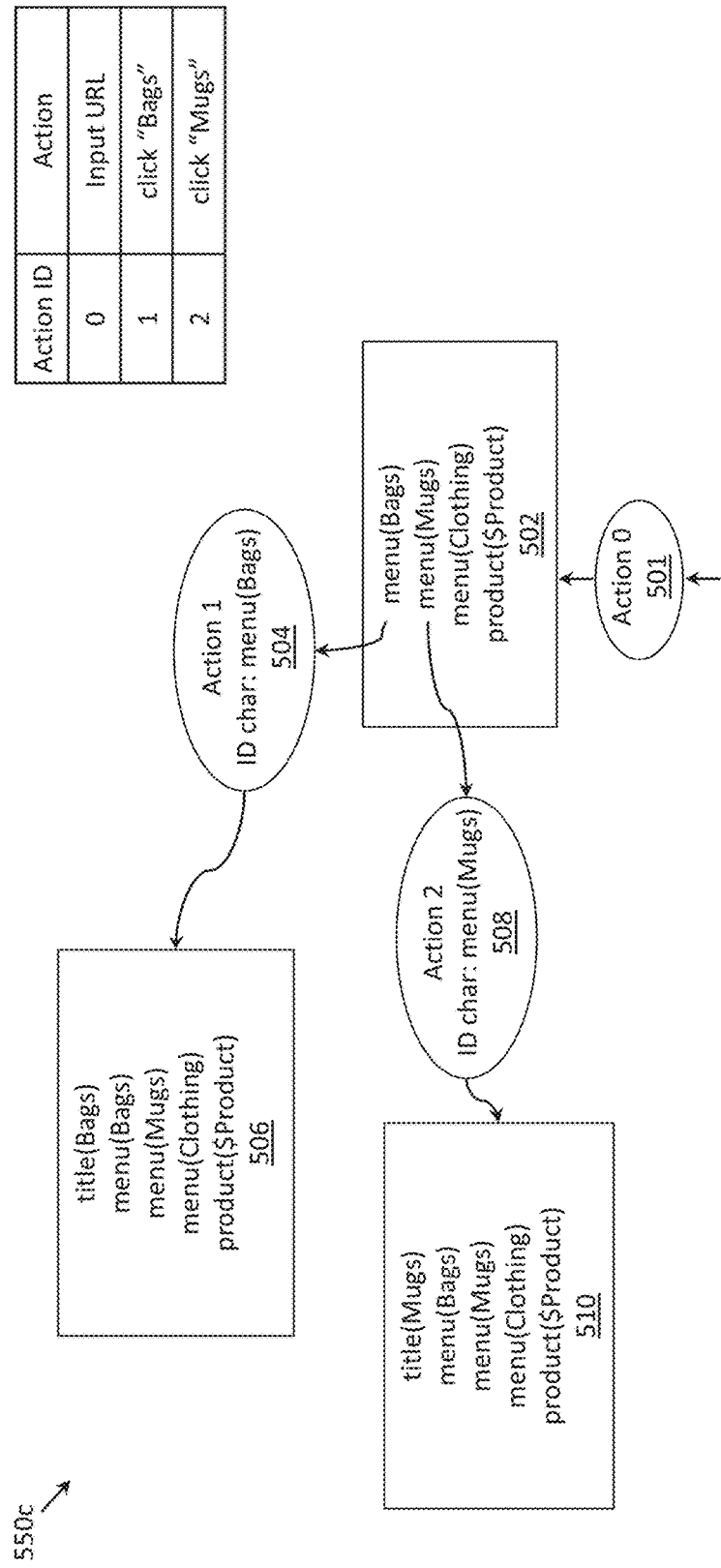
Figure 15D:
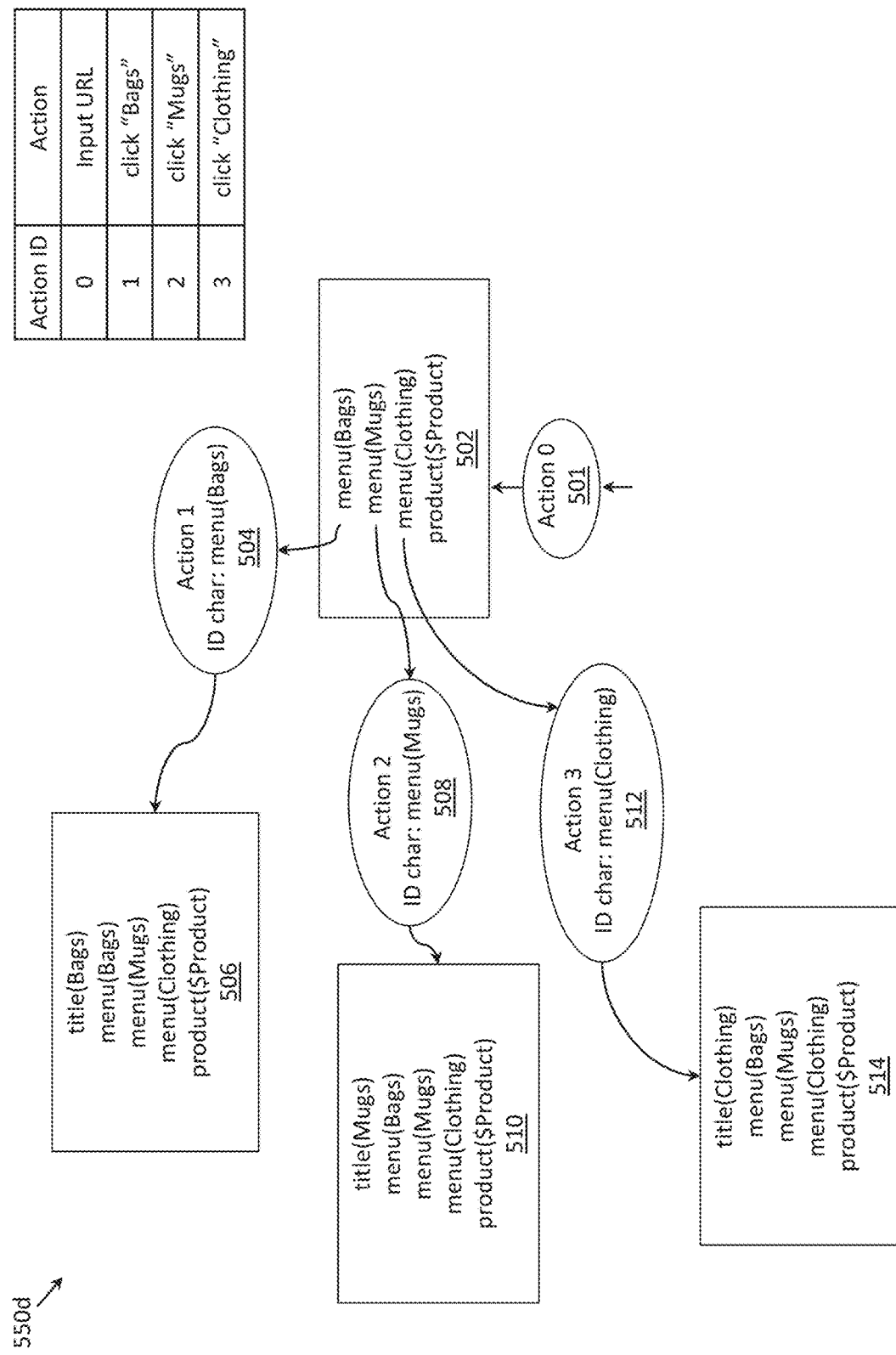
Figure 15E:
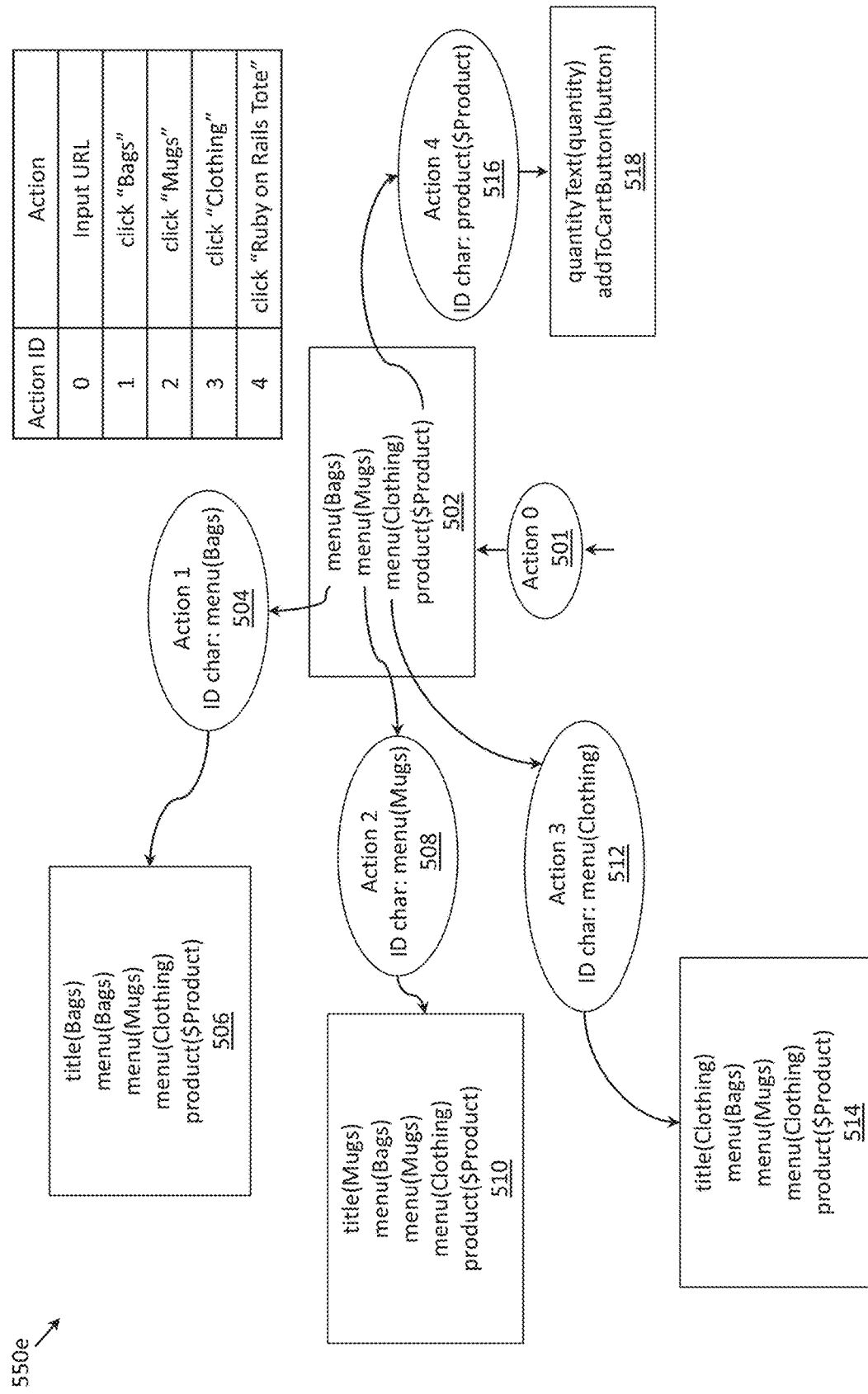
Figure 15F:
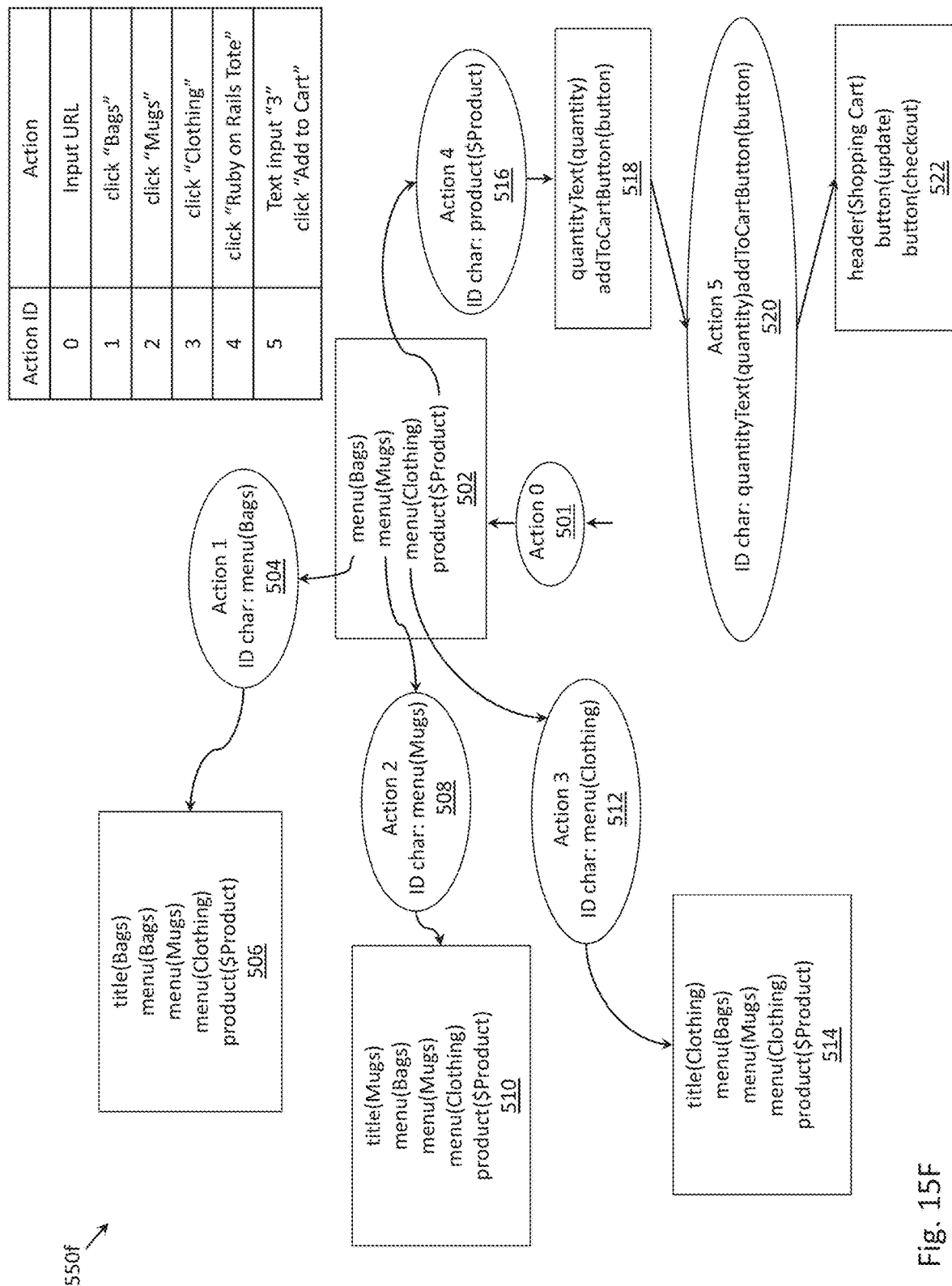

In partial state machine 550a depicted in FIG. 15A, state 502 models webpage 10, and state 501 models action 0 to reach webpage 10. In partial state machine 550b depicted in FIG. 15B, state 506 models webpage 12, and state 504 models action 1 that is performed to transition from webpage 10 to webpage 12. In partial state machine 550c depicted in FIG. 15C, state 510 models webpage 14, and state 504 models action 2 that is performed to transition from webpage 10 to webpage 14. In partial state machine 550d depicted in FIG. 15D, state 514 models webpage 16, and state 512 models action 3 that is performed to transition from webpage 10 to webpage 16. In partial state machine 550e depicted in FIG. 15E, state 518 models webpage 18, and state 516 models action 4 that is performed to transition from webpage 10 to webpage 18. In partial state machine 550*f* depicted in FIG. 15F, state 522 models webpage 19, and state 520 models action 5 that is performed to transition from webpage 18 to webpage 19.

Figure 15G:
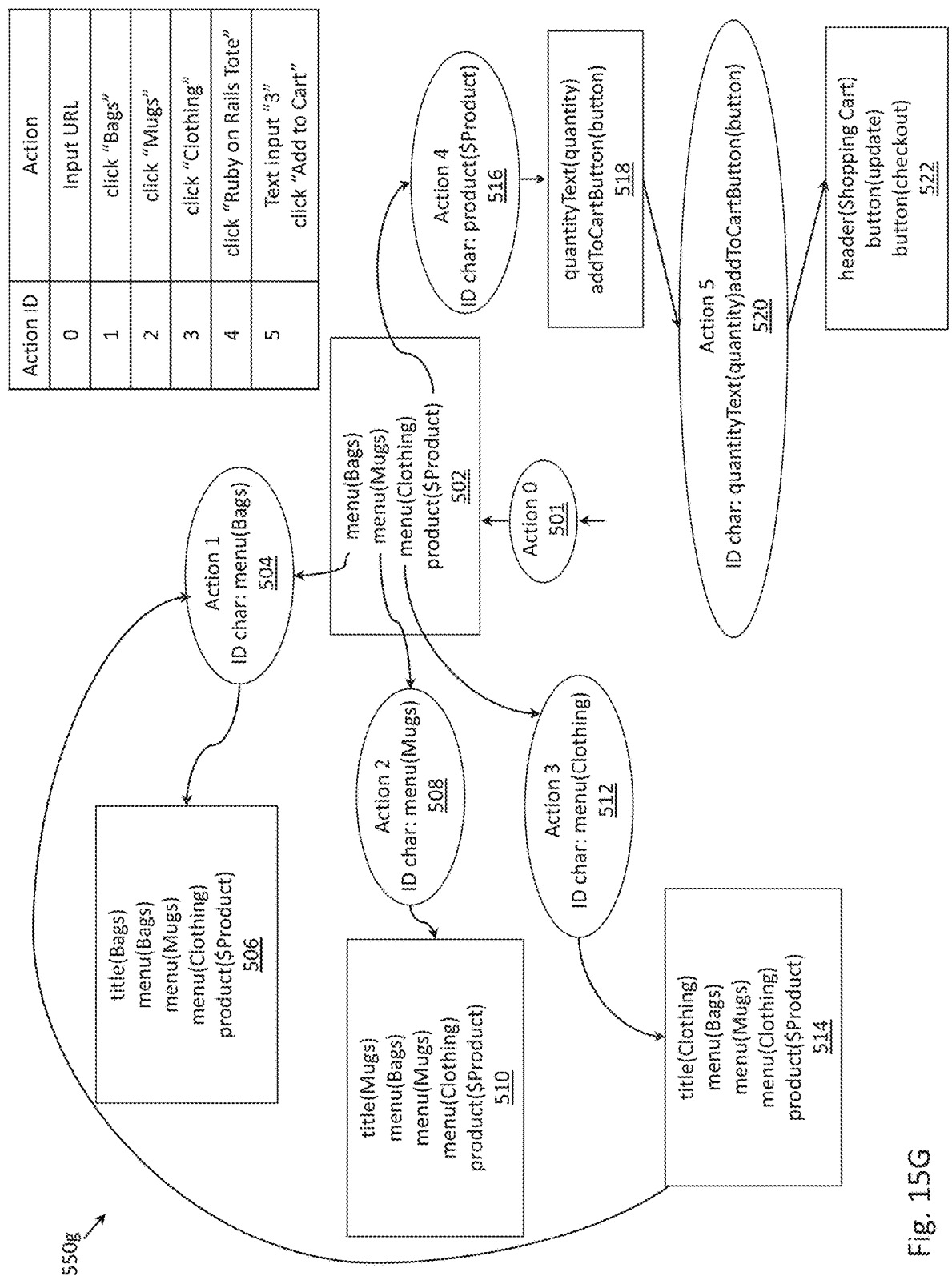

In partial state machine 550*g* depicted in FIG. 15G, there are no new states, but an edge is drawn from state 514 to state 504 so as to model the transition from state 514 to state 506. In comparison to the state machine representation in FIG. 14G, in which edge 524 (with Action 6) was created in a fashion that duplicated edge 504 (with Action 1), the only change to the state machine in FIG. 15G was inserting an edge from state 514 to state 504. It is noted that in FIG. 15G, Action 6 does not even appear. The state machine representation of FIGS. 15A-15G is thus more efficient than the state machine representation of FIGS. 11A-11G in that, in the event that the identifying characteristics of one edge match the identifying characteristics of another edge (with the "once per app" scanning option selected), there is no need to duplicate identifying characteristics, HTTP requests, results of validations/auto validation, etc.

Therefore, the generation of a state machine model of a website has now been described. Each state of the state machine may model a corresponding webpage of the website, and may be characterized by identifying characteristics (e.g., locators) of the associated webpage. Such characteristics may be identified via the models of the GUI objects (e.g., Smart Tags). In the representation of FIGS. 11A-11G, each edge of the state machine may model a transition from one webpage to another webpage, and may be associated with a unique action identifier and an identifying characteristic (e.g., a locator) of the DOM element that was subject to the action. In contrast, in the representation of FIGS. 15A-15G, each oval state of the state machine may model a transition from one webpage to another webpage, and may be associated with a unique action identifier and an identifying characteristic (e.g., a locator) of the DOM element that was subject to the action.

While not described above, each state of the state machine may also be associated with a trustworthiness level that is calculated based on respective evaluations of the DOM elements present within the webpage modeled by the state. For instance, in webpage 10, when respective DOM elements corresponding to menu objects 28, 30 and 32 were selected during the creation of edges 504, 508 and 512, respectively, the textAutoValidation generated the result of success or failure for each of those edges. Accordingly, the trustworthiness level of state 502 may be generated based on the aggregation of the success or failure of evaluations performed on menu objects 28, 30 and 32. Such trustworthiness level (as well as the success or failure returned by individual validators and auto validations) introduces an aspect of testing even into the initial modeling of the website (prior to the generation of test scripts). If a trustworthiness level of a state is below a threshold, the corresponding webpage may be flagged for analysis by a quality assurance engineer.

Test Script Generation

Figure 16:
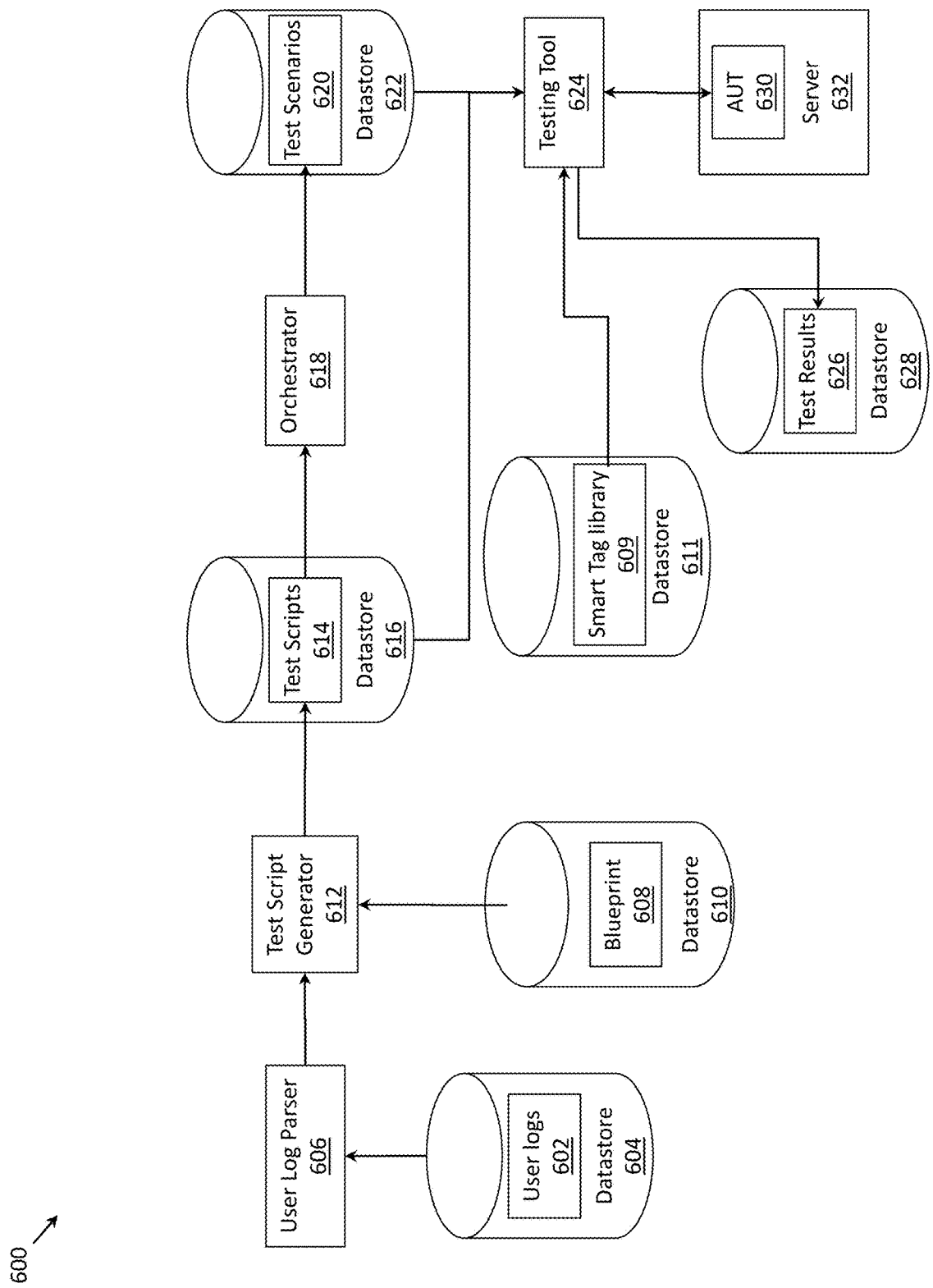
FIG. 16 depicts a system diagram with components for automatically generating a test script from a blueprint and user logs, and using the test script to test a web application, in accordance with one embodiment of the invention.

FIG. 16 depicts system diagram 600 with components for automatically generating one or more test scripts 614 from blueprint 608 and one or more user logs 602, and using test scripts 614 to test web application 630. User logs 602 may be stored in datastore 604, and may record data associated with a user using web application 630 (also called an application under test in FIG. 16). The logged data may include a time ordered log of HTTP requests that are transmitted from a client device to a server when the user uses web application 630. Each of the HTTP requests may include a source IP address, a method (e.g., GET, POST, PUT, PATCH, etc.), a URL, an optionally a body (e.g., in the case of a POST method). While the logged data may be time ordered, there may be gaps in the log of HTTP requests, such that HTTP requests may be missing from the user log. Incomplete user logs are common in practice, because user logs are expensive to store, to typically, only a certain percentage of a user log is stored or saved. The test script generation process explained below is able to handle instances when HTTP requests are missing from a user log.

The user logs, in some instances, may be generated using a different version of the web application than that being tested. For example, the user logs may be generated from version 6 of the web application, whereas version 7 of the web application is being tested. Such discrepancy between the version of the web application used to create the user log and the version of the web application being tested introduces challenges and the techniques to address these challenges will be explained below.

Finally, it is noted that user logs may come in different formats, depending on the vendor (e.g., Splunk, Sumo Logic, etc.) that generates the user log. As a result, user log parser 606 may be used to extract data values from the user logs 602 and arrange the data values into a common format. For example, each line of the parsed user log may record the source IP address of the HTTP request, followed by the method of the HTTP request, followed by the URL of the HTTP request, optionally followed by a hint (which may include a portion of the HTTP body). The reason for including a hint is that certain HTTP requests may be substantially similar, with the same IP Address, method and URL, so a portion of the body is stored as a "hint" in order to distinguish these substantially similar HTTPs from one another.

Parsed user logs are provided to test script generator 612. Blueprint 608 may also be provided to test script generator 612. As previously described, blueprint 608 may model web application 630. Unlike the user logs which may be generated using a prior version of web application 630, it is important for blueprint 608 to be generated from the current version of web application 630 (i.e., the version being tested). Otherwise, the test script that is generated will be tailored for a prior version of the web application and might not be able to properly test the current version of the web application.

Based on the parsed user logs and blueprint 608, test script generator 612 generates one or more test scripts 614 that are stored in datastore 616. To reiterate, the overall goal is to generate test scripts that resembles the user behavior captured in the user logs, so that the test scripts includes test cases that are reflective of actual user behavior. The process in which test script generator 612 generates a test script is presented in FIG. 18 below, followed by a specific example in FIGS. 19-31 to explain the test script generation process.

Orchestrator 618 may aggregate one or more of test scripts 614 into one or more test scenarios 620, which are stored in datastore 622. In another embodiment (not depicted), it is also possible for test script generator 612 to directly group test scripts together into a test scenario, in which case orchestrator 618 may be omitted.

Testing tool 624 may execute one or more test scripts 614 and/or test scenarios 620 on web application 630 hosted on server 632. The test script may include actions being performed on DOM elements identified by Smart Tags. Therefore, the Smart Tags from Smart Tag library 609 (as stored in datastore 611) may be used to parse a DOM corresponding to each webpage of the web application 630 before actions from the test script can be performed. Smart Tag library 609 may include a collection of the Smart Tags used in the blueprint creation process. Test script represent a valid path through the state machine that reflects the most likely path taken by the user (as captured in user logs). The criteria to decide whether a test script fails or succeeds is whether the test script can be run to completion, because test scripts are a series of steps that should be valid. Additional criteria to decide whether a test script fails or succeeds may include the results of validator and auto validations associated with Smart Tags. Test results 626 may be stored in datastore 628. It is noted that while user logs 602, blueprint 608, Smart Tag library 609, test scripts 614, test scenario 620 and test results 626 were shown in FIG. 16 as all being stored in separate datastores, such depiction was for the sake of ease of depiction, and it is understood that the various datastores may be part of the same datastore.

Figure 17:
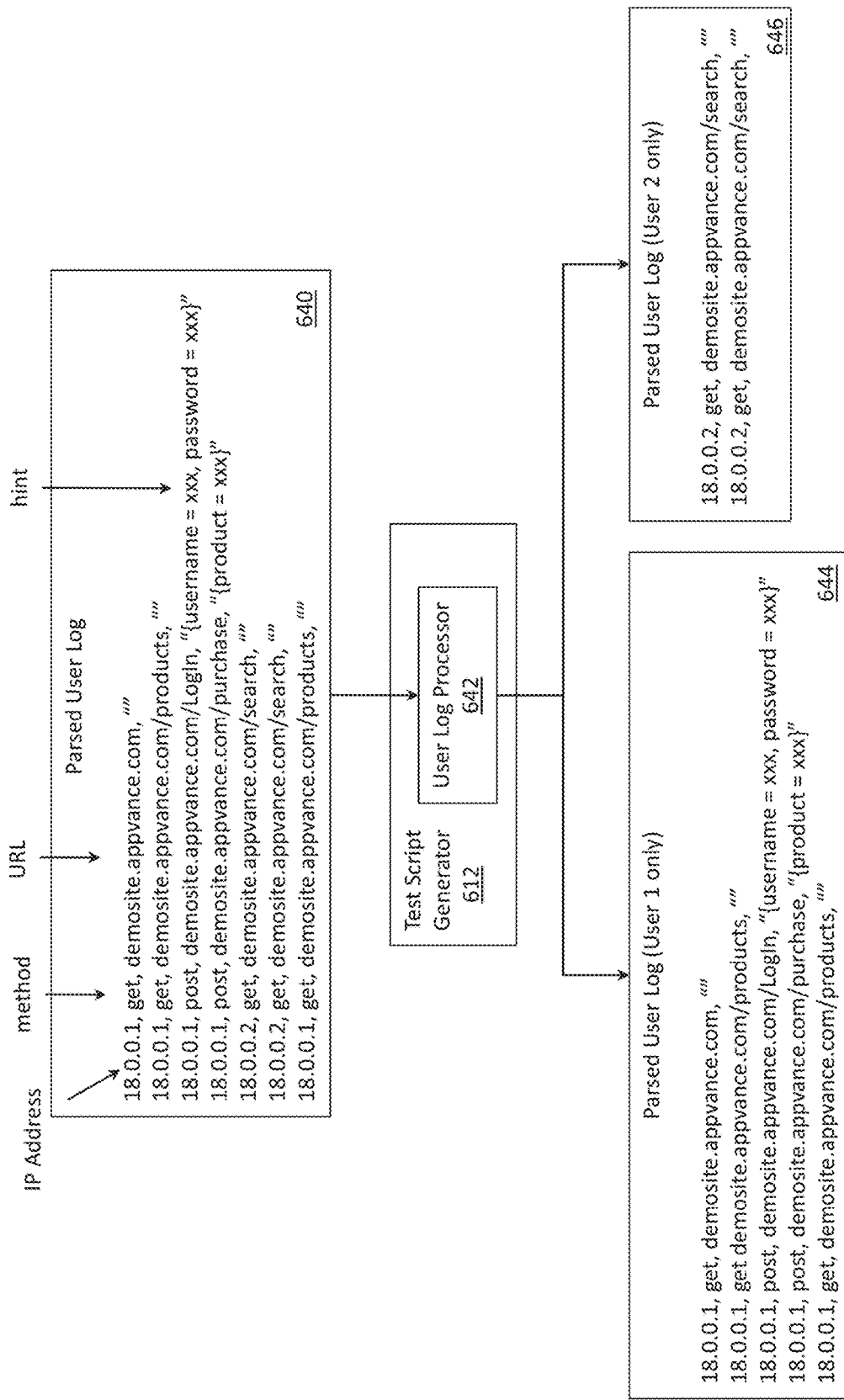
FIG. 17 depicts the processing of a parsed user log into user specific user logs, in accordance with one embodiment of the invention.

FIG. 17 depicts certain processing that may be performed on parsed user logs that are received by test script generator 612. In certain instances, user logs may be an aggregation of the logged data from a plurality of users. Assuming that each user is associated with their own IP address, parsed user log 640 may be separated into user specific user logs by user log processor 642 based on the IP addresses (or other parameters) recorded in parsed user log 640. Other parameters present in the parsed user log that can be used to differentiate users may include the session ID, cookies, user ID, etc.

In the example of FIG. 17, it is assumed that user 1 is associated with IP address 18.0.0.1, and user 2 is associated with IP address 18.0.0.2. Accordingly, user log processor 642 is able to separate parsed user log 640 into one (parsed) user log 644 specific to user 1 and one (parsed) user log 646 specific to user 2. User log processor 642 is shown as a component of test script generator 612. However, it is possible in another embodiment for user log processor 642 to be external to test script generator 612 and provide user specific user logs to test script generator 612. Regardless of where user log processor 642 is instantiated, test script generator 612 subsequently generates one or more test scripts based on each of the user specific user logs, the blueprint and Smart Tag library. In the example of FIG. 17, one or more test scripts would be generated based on parsed user log 644 and one or more test scripts would be generated based on parsed user log 646.

Figure 18:
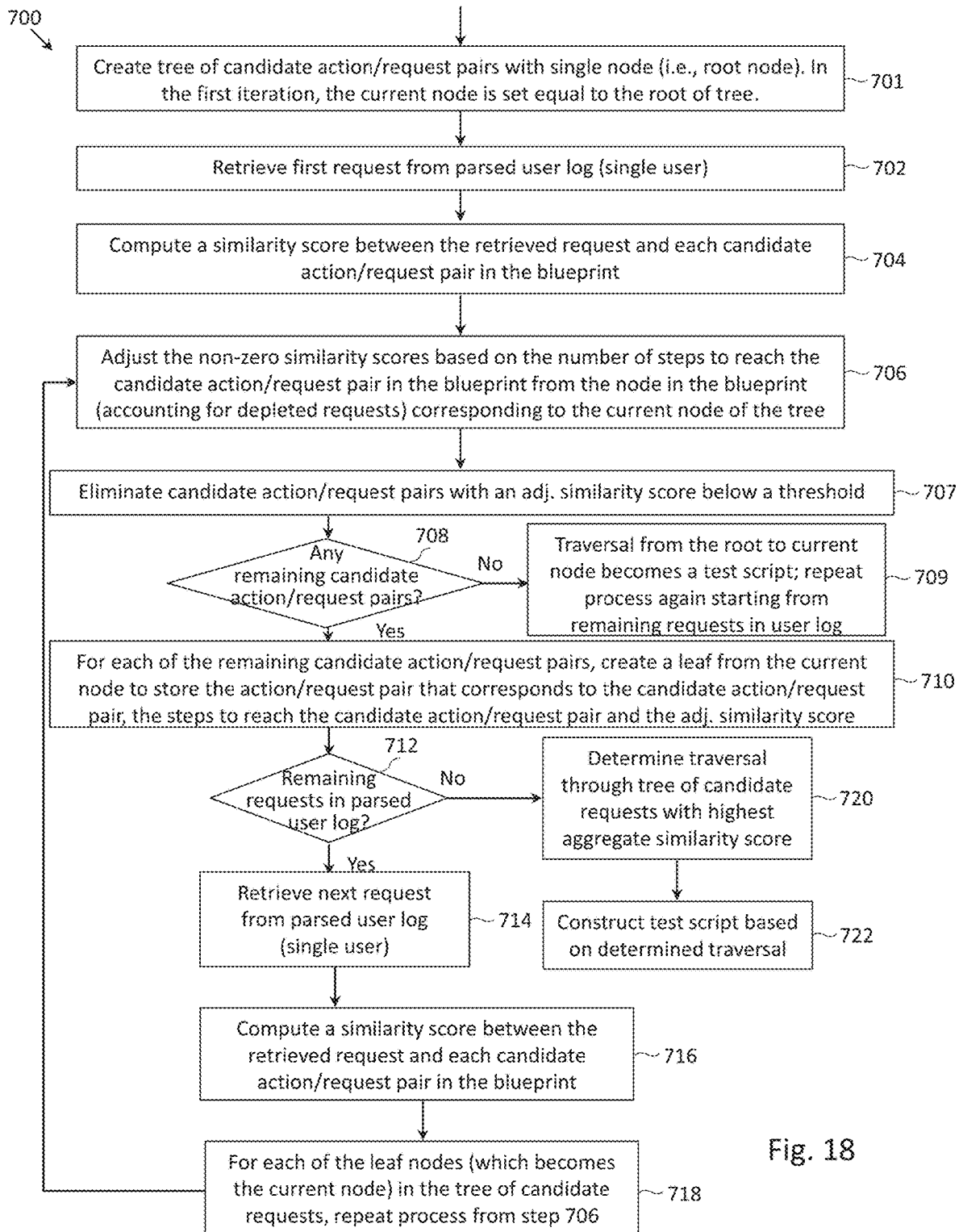
FIG. 18 depicts a flowchart of process for automatically generating a test script from a blueprint and a user log, in accordance with one embodiment of the invention.

FIG. 18 depicts a flowchart of process 700 for automatically generating a test script from a blueprint and a user log. At step 701, test script generator 612 may create a single node of a tree of candidate of action/request pairs. The single node may be called the root of the tree, and may be referred to as the "current node" in the first iteration through process 700. The root of the tree may be set equal to the root of the blueprint.

At step 702, test script generator 612 may retrieve (or receive) the first HTTP request (may be called "request" for conciseness) from the user specific (parsed) user log. The first HTTP request may correspond to the HTTP request (e.g., includes a method, URL and hint) that was first recorded in the user log. The source IP address of the HTTP request may be ignored at this point, as all the source IP addresses will be identical (since the log is user specific).

At step 704, test script generator 612 may compute a similarity score between the retrieved request and each action/request pair in the blueprint. Recall, each edge of the blueprint may store the one or more HTTP requests that are sent from the client to the server in response to an action. The goal of step 704 is to identify the request in the blueprint that most likely matches the request from the user log so that test script generator 612 can infer the edge of the blueprint that was traversed by the user. As all action/request pairs in the blueprint are possible matches to the request from the user log, the action/request pairs in the blueprint will be called "candidate action/request pairs" in this specific context when describing the generation of the test script. The reason that a similarity score is computed is that there may not be an exact match due to the mismatch in the versions of the application (as mentioned above). If user logs are created for one version of an application, and the blueprint is created from a later version of the application, it is possible that requests from the user logs may be substantially similar to requests in the blueprint, but may not be identical due to modification in the paths of URL, parameters of the URL, etc.

At step 706, test script generator 612 may adjust the non-zero similarity scores based on the number of steps to reach the candidate action/request pair in the blueprint from the node of the blueprint that corresponds to the current node of the tree of candidate action/request pairs. In the first iteration through process 700, the current node is the root of the tree of candidate requests. In subsequent iterations through process 700, the current node will become the current leaf node of the tree of candidate request. Such detail will become clearer in the examples to follow. The greater the number of steps, the more the similarity score will be decreased for the following reasons: First, the event of many consecutively missing requests is unlikely. Second, shorter paths are preferred because they save time during the testing process. Additionally, a determination of the steps to reach the candidate action/request pair may take into account candidate action/request pairs that have been depleted from the node of the blueprint corresponding to the current node of the data structure. Such concept of depletion will be discussed in more detail in the example of FIG. 24.

At step 707, test script generator 612 may eliminate candidate action/request pairs with a similarity score below a threshold. Such an elimination may be interpreted as a "predation" step in a "pred-prey" algorithm, in which eliminated candidate action/request pairs are prey that are metaphorically eaten or consumed by predators.

At step 708, test script generator 612 may determine whether there are any remaining candidate action/request pairs after the predation step. If not, the traversal from the root node to the current node in the tree of candidate action/request pairs may become one of the test scripts (i.e., there may be a plurality of test scripts that are generated) if it is of sufficient length (e.g., length greater than a threshold, such as 3), and test script generator 612 may repeat process 700 starting from the remaining requests in the user log (step 709).

Otherwise, if there are remaining candidate action/request pairs after the predation step, test script generator 612 may, for each of the remaining candidate request(s), create a leaf node (or more generally, a terminal node) from the current node to store the action/request pair that corresponds to the candidate action/request pair, the steps to reach the candidate action/request pair (i.e., from the node in the blueprint corresponding to the current node of the tree) and the computed adjusted similarity score (step 710). In the current description, the data structure may be conceptually described as a tree, with a root node that branches into (at least initially) leaf nodes, one leaf node corresponding to each of the remaining candidate requests. However, in practice, the data structure may be instantiated as a list, in which each element of the list is a path from the root node to a terminal node.

At step 712, test script generator 612 may determine whether there are any remaining requests in the parsed user log. If so, test script generator 612 may retrieve the next request from the parsed user log (step 714). At step 716, test script generator 612 may compute a similarity score between the retrieved request and each candidate action/request pair in the blueprint. Then, at step 718, for each of the leaf nodes in the tree of candidate requests, the process repeats from step 706, in which the leaf node becomes the current node.

Conceptually, each of the requests stored in the leaf nodes represents a hypothetical match to the request that was first recorded in the user log. If there were only one leaf node, the process repeats from step 706. However, if there are two leaf nodes, two processes will be started from step 706 (one for each of the leaf nodes). If test script generator 612 has sufficient processing resources, these two processes may be executed in parallel. Otherwise, they may be executed in series, one after the other. In step 706, during the adjustment of the similarity score, the current leaf node takes the place of the root node from the first iteration through process 700, and the number of steps is computed from the current leaf node rather than the root node. Such details will discussed in more detail below in association with the specific example of process 700.

Otherwise, if there are no requests remaining in the parsed user log and all iterations through the "main loop" of process 700 have concluded ("main loop" referring to the loop from 706→707→708→710→712→714→716→718→706 . . . ), test script generator 612 may determine a traversal through the data structure of candidate action/request pairs with the highest aggregate similarity score (step 720). The aggregate similarity score may be calculated by computing the sum of the similarity scores stored at each of the nodes along a traversal (or path) through the data structure from the root node to one of the leaf nodes.

At step 722, test script generator 612 may construct a test script based on the determined traversal. In one embodiment, based on the determined traversal through the data structure of candidate requests, a corresponding traversal (or path) through the blueprint may be determined. Actions specified by edges encountered by the traversal through the blueprint may be recorded in the test script. If the actions are user experience (UX) level actions (e.g., click actions, etc. corresponding to the action ID's), the generated test script may be a UX-level test script. If the actions are HTTP requests, the generated test script may be an application programming interface (API)-level test script.

Figure 19:
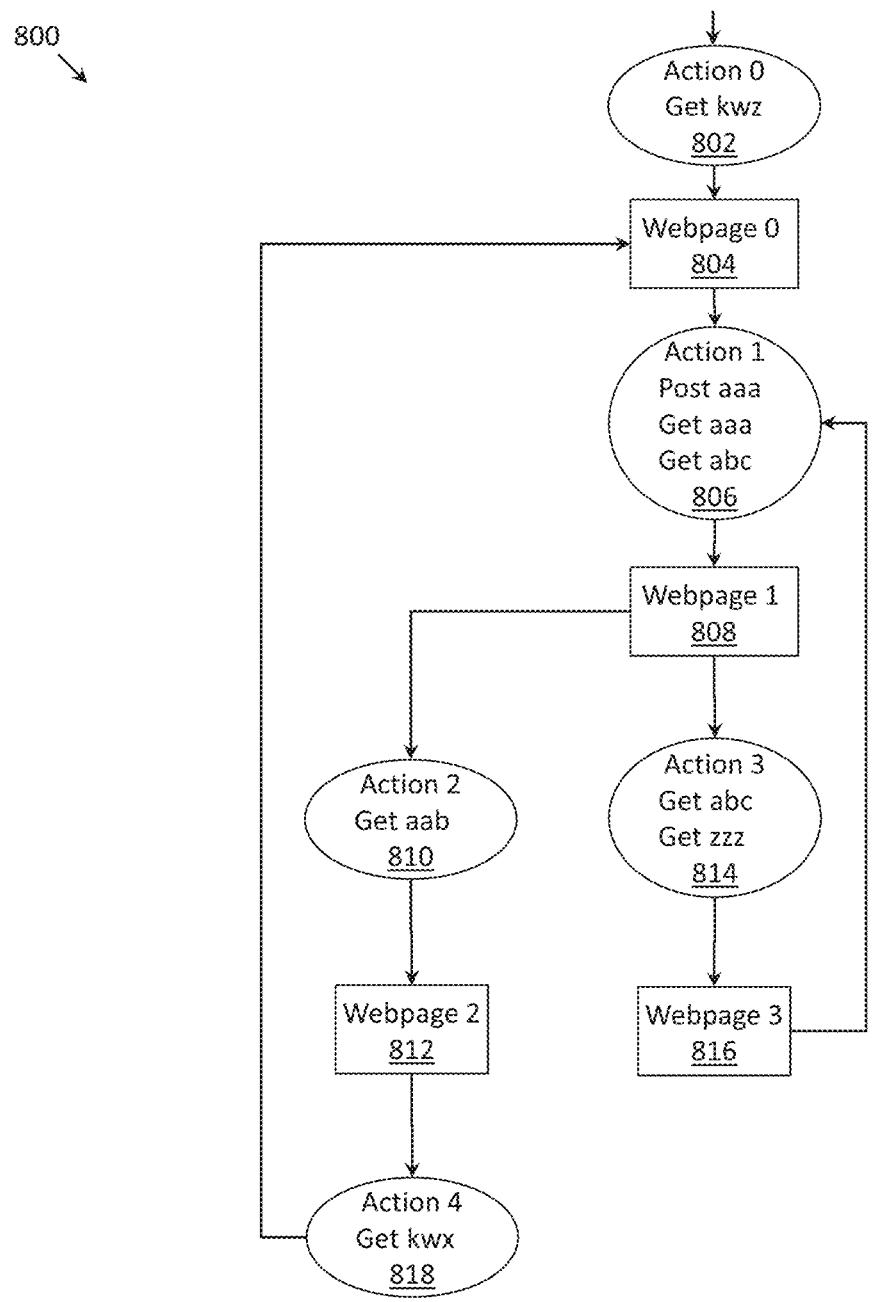
FIG. 19 depicts an example blueprint in order to facilitate a discussion of one simplified example of generating a test script from a blueprint and a user log, in accordance with one embodiment of the invention.

FIG. 19 depicts blueprint 800 in order to facilitate a discussion of a simplified example of generating a test script from a blueprint and a user log. Blueprint 800 may be an abstracted version of an actual blueprint, and certain information may be omitted for conciseness of presentation. For example, in FIGS. 14G and 15E, each state of the blueprint included identifying characteristics. However, in blueprint 800, identifying characteristics have been omitted, and states of the blueprint are more simply labeled as "Webpage 0", "Webpage 1" and so on. Following the convention from FIG. 15E, states of the blueprint are denoted using rectangles, and actions to transition from one webpage to another are denoted using ovals. Further, while not mentioned above, each of the actions may be associated with one or more HTTP requests that is transmitted from the client to the server as a result of the execution of the action. For the sake of clarity of later discussion, it is noted that the one or more HTTP requests associated with each action are not ordered, so more precisely, a group (rather than a list) of HTTP requests are associated with each action of blueprint 800.

In blueprint 800, action 802 (also called the root of the blueprint) leads to webpage 0 (804) which may be equivalent to a "home page". Action 802 includes the action identifier of "0" (or for clarity, the action identifier of "0" may be referred to as "action 0") and the API-level action of "Get kwz". In this simplified example, it is understood that each action identifier maps to an action, in a similar fashion to the mappings provided in FIGS. 14A-14G, and FIGS. 15A-15E, but the mappings have been omitted from FIG. 19 for simplicity. Also, "Get kwx" is an abbreviation or a placeholder for an actual HTTP request, in which "kwx" is a URL. The actual HTTP request is not germane to the discussion, so it is omitted for the sake of conciseness.

Action 806 leads from webpage 0 (804) to webpage 1 (808), and includes the identifier of "action 1" and the API-level actions of "Post aaa", "Get aaa", "Get abc". Action 810 leads from webpage 1 (808) to webpage 2 (812), and includes identifier of "action 2" and the API-level action of "Get aab". Action 814 leads from webpage 1 (808) to webpage 3 (816), and includes the identifier "action 3" and the API-level actions of "Get abc" and "Get zzz". Lastly, action 818 leads from webpage 2 (812) to webpage 0 (804), and includes the identifier "action 4" and the API-level action "Get kwx". While not depicted in FIG. 19, it is noted that it is possible for an action to have no associated request.

Figure 20:
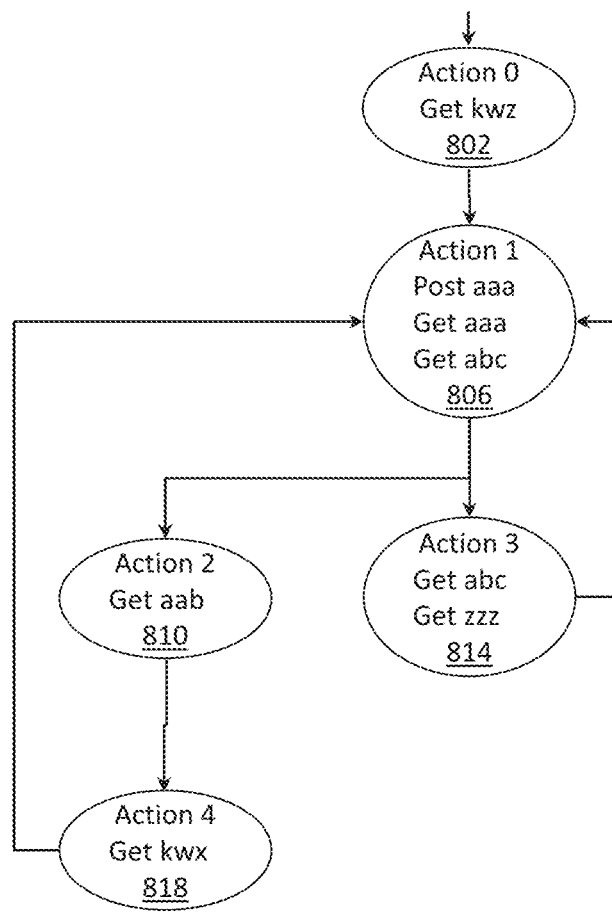
FIG. 20 depicts an abstracted version of the blueprint of FIG. 19, in accordance with one embodiment of the invention.

FIG. 20 depicts an abstracted version of blueprint 800 of FIG. 19 (i.e., abstracted blueprint 850), in which the states of blueprint 800 have been omitted. Such a representation is more convenient when one desires to focus solely on the actions of the blueprint. For example, based on abstracted blueprint 850, one can understand that action 802 is followed by action 806, which is then followed by either action 810 or 814, and so on. Abstracted blueprint 850 will be relied upon when counting the number of "steps" to reach a certain action (or request). For instance, by referring to abstracted blueprint 850, one can easily determine that (at a minimum) 2 steps are needed to reach action 814 from the root (i.e., action 0→action 1→action 3).

Figure 21:
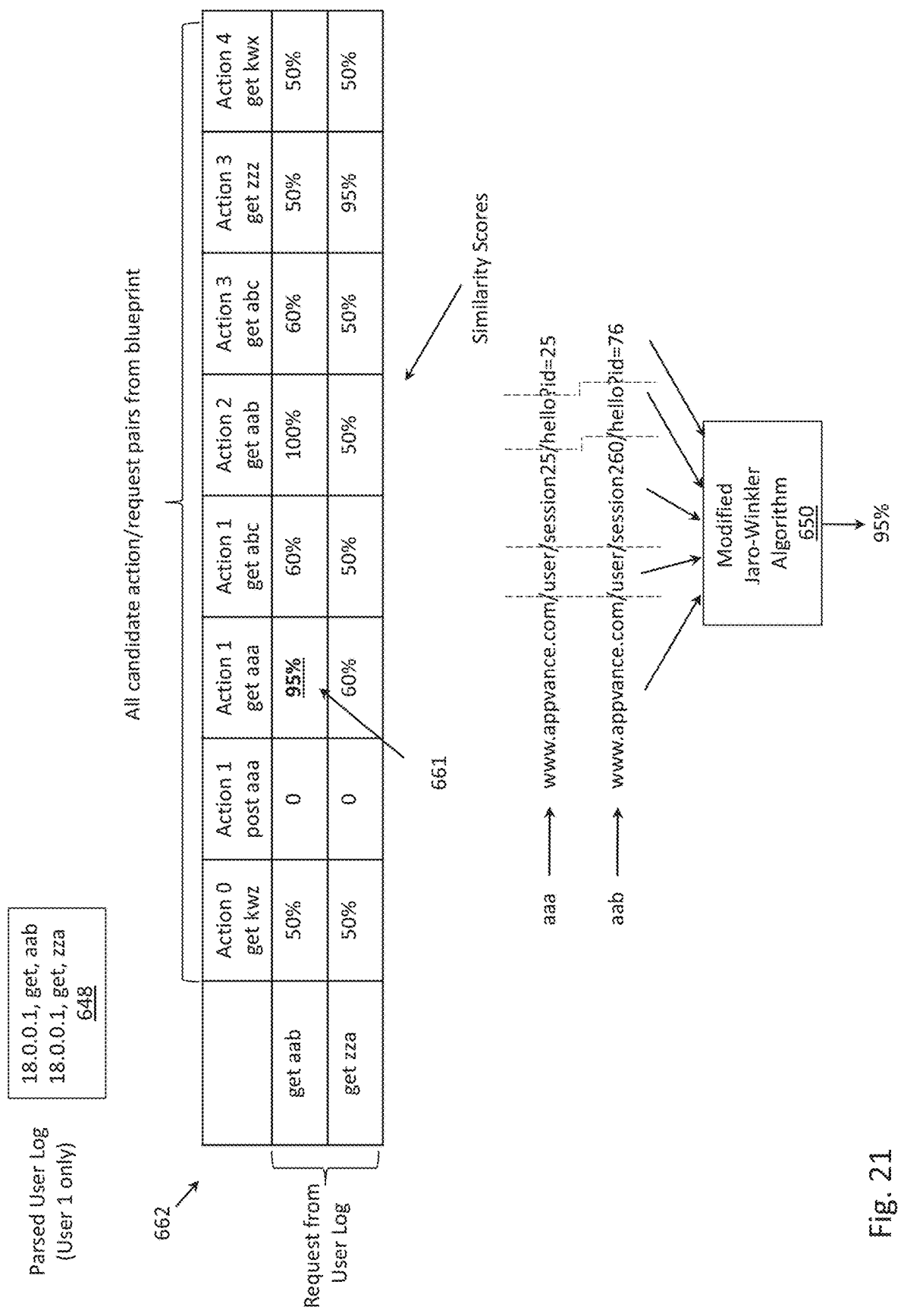
FIG. 21 depicts a table that tabulates similarity scores computed between respective requests from the user log and respective candidate requests from the blueprint, in accordance with one embodiment of the invention.

FIG. 21 starts the description of a process to generate a test script based on abstracted blueprint 850 of FIG. 20 and simplified user log 648 of FIG. 21, and such description will step through process 700 of FIG. 18 using a concrete example. In practice, a user log will include hundreds, if not thousands of HTTP requests, but for the sake of simplicity, the instant user log 648 contains only two requests. The first request is "18.0.0.1, get, aab" and "the second request is "18.0.0.1, get, zza". Before the example is described in detail, it is noted that the primary task of the test script generation process is to infer the most likely traversal that was performed by a user through blueprint 850 based on the logged data captured in user log 648.

In step 702, the first request is retrieved, so in the context of FIG. 21, the request "18.0.0.1, get, aab" is retrieved. Step 704 is described in the first row of similarity scores that are tabulated in table 662 of FIG. 21. The similarity score 661 between "get aab" of the first request and the candidate request "get aaa" may be computed as 95% (or 0.95) using a modified form of the Jaro-Winkler algorithm 650. First, in algorithm 650, the methods of the requests are compared. If the methods are not the same, the similarity score is automatically set to 0 (indicating a very low similarity between the two requests, or equivalently indicating a low chance that the two requests are a match). If the methods are the same (as in the present example in which both methods are "get" requests), "local similarity scores" are then computed based on corresponding portions of the URLs. In the present example, "aaa" abbreviates the URL "www(dot)appvance (dot)com/user/session25/hello?id=25" and "aab" abbreviates the URL "www(dot)appvance(dot)com/user/session260/hello?id=76". The URLs may be divided into portions based on the forward slash symbol "l", the question mark "?" and other symbols. A first local similarity score of "100%" is computed based on the two domain names (i.e., "www.appvance.com"), since the two domain names are identical. A second local similarity score of "100%" may be computed as the "Jaro-Winkler" distance between the strings "user" and "user". A third local similarity score of "90%" may be computed as the "Jaro-Winkler" distance between the path strings "session25" and "session260". A fourth local similarity score of "100%" may be computed as the "Jaro-Winkler" distance between the parameter strings "hello" and "hello". A fifth local similarity score of "85%" may be computed as the "Jaro-Winkler" distance between the parameter strings "id=25" and "id=76". The computation of the "Jaro-Winkler" distance is known in the art, and will not be described herein.

Finally, the (overall) similarity score may calculated as a linear combination (or other function) of the local similarity scores. In the instant example, the linear combination may be computed as an average of the local similarity scores:

$$(\tfrac{1}{5})*100\%+(\tfrac{1}{5})*100\%+(\tfrac{1}{5})*90\%+(\tfrac{1}{5})*100\%+(\tfrac{1}{5})*85\%=95\%.$$

Other similarity scores between the first request from the user log and the remaining candidates are presented in the first row of similarity scores in table 662. It is noted that because the requests "get aab" and "post aaa" have different methods, their similarity score is 0 (no need for computation of any Jaro-Winkler distance for such an example).

FIG. 22 depicts table 664 which illustrates step 706 (adjustment of non-zero similarity scores) and step 707 (elimination of candidate requests) of process 700. The non-zero similarity scores from the first row of table 662 are duplicated in the first row of table 664. In the second row, steps to reach the candidate action/request pair from the root of the blueprint (i.e., corresponding to the current node of the tree of candidate requests) are tabulated.

Candidate action/request pair "Action 0—get kwz" is located at the root of the blueprint, so no steps are listed. For the candidate action/request pairs "Action 1—get aaa" and "Action 1—get abc", the path from the root of blueprint 850 (i.e., Action 0) to Action 1 is recorded in the table. "0→1" is a shorthand notation for "Action 0" to "Action 1". For the candidate action/request pair "Action 2—get aab", the path (i.e., "0→1→2") from the root of blueprint 850 (i.e., Action 0) to Action 2 is tabulated. For the candidate action request pair "Action 3—get abc", the path (i.e., "0→1→3") from the root of blueprint 850 to "Action 3" is tabulated. For the candidate action request pair "Action 4—get kwx", the path (i.e., "0→1→2→4") from the root of blueprint 850 (i.e., Action 0) to Action 4 is tabulated.

The third row of table 662 counts the number of steps from the root of blueprint 850 to the respective action. "0→1" involves 1 step; "0→1→2" involves 2 steps; and so on. Based on the number of steps, the similarity score is adjusted, with a greater deduction in the similarity score for an increasing number of steps. Table 665 provides a certain mapping from the number of steps to the deduction in the similarity score. While not listed in table 665 for conciseness, it is understood that "0" steps results in no adjustment.

It is further understood that the mapping in table 665 is only provided as an example, and that other mappings are possible.

The fourth row of table 662 records the adjusted similarity scores. "Action 0—Get kwz" required "0" steps, so its similarity score of 50% was not adjusted. "Action 1—Get aaa" required "1" step, so its similarity score of 95% was decreased by 5% to 90%. Other adjustments to the similarity scores should be self-explanatory.

The fifth row of table 662 illustrates step 707 and indicates whether or not the candidate action/request pair should be eliminated by comparing the adjusted similarity score to a threshold. In the present example, the threshold is set at 51%. It is understood, however, that such threshold is provided as an example only, and that the threshold may be adjusted based on the computing resources of test script generator 612. A lower threshold may be suitable for a test script generator with more computing resources, while a higher threshold may be suitable for a test script generator with less computing resources. In the present example, the candidate action/request pair "Action 0—get kwz" with an adjusted similarity score of 50% is eliminated; the candidate action/request pair "Action 1—get aaa" with an adjusted similarity score of 90% is not eliminated; and so on. The candidate action/request pairs that remain include "Action 1—get aaa", "Action 1—get abc" and "Action 2—get aab", so the "Yes" branch of decision element 708 is taken. It is noted that in a more efficient approach, candidate action/request pairs with a similarity score below the threshold can be eliminated at the outset (no need for adjustment in similarity score), since a similarity score that is less than the threshold will most certainly still be below the threshold after the adjustment step.

Figure 23:
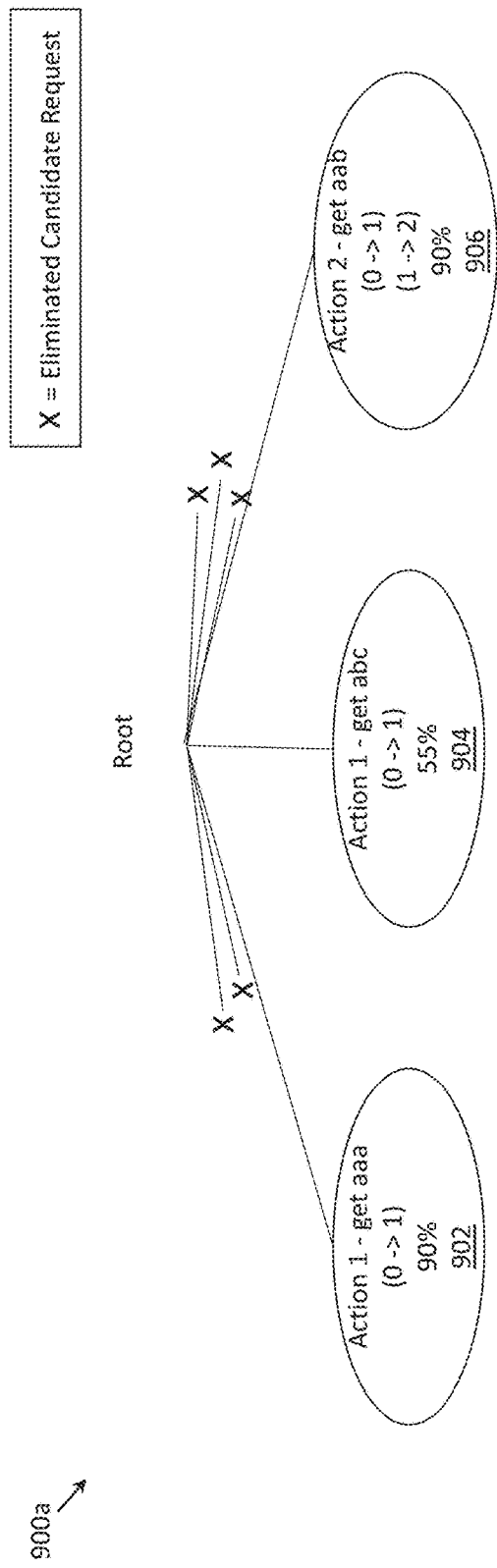
FIG. 23 depicts a data structure with candidate requests that remain after an elimination process, in accordance with one embodiment of the invention.

FIG. 23 depicts data structure 900a with candidate action/request pairs that remain after the elimination process described in FIG. 22. Data structure 900a may be a tree structure with a root (called the current node in the first iteration of process 700) that branches out into leaf nodes. Each of the leaf nodes may store information associated with one of the remaining candidate action/request pairs, the information including the candidate action/request pair, the steps to reach the candidate action/request pair from the root of the blueprint (or in subsequent iterations through process 700, the steps to reach the candidate action/request pair from the node of the blueprint corresponding to the current node of the tree of candidate action/request pairs) and the adjusted similarity score. Leaf node 902 stores the candidate action/request pair "Action 1—get aaa", step "0→1" and adjusted similarity score "90%". Leaf node 904 stores the candidate action/request pair "Action 1—get abc", step "0→1" and adjusted similarity score "55%". Leaf node 906 stores the candidate action/request pair "Action 2—get aab", steps "0→1→2" and adjusted similarity score "90%". The eliminated candidate action/request pairs are denoted as "X" to visually show, for the sake of clarity, that certain candidate action/request pairs have been eliminated (or "consumed by a predator"), but it is understood that there is no need to account for the eliminated candidate action/request pairs in data structure 900a. FIG. 23 is an example of step 710 of process 700.

Process 700 then proceeds to decision element 712 in which it is determined whether there are any requests that remain in the parsed user log. In the instant example, returning to FIG. 21, the request "get zza" still remains in user log 648. Accordingly, process 700 proceeds to step 714 in which the next request from the parsed user log is retrieved. In the instant example, "get zza" is retrieved. At step 716, a similarity score between the retrieved request (i.e., "get zza") and each candidate action/request pair in the blueprint is computed. The computed similarity scores are recorded in the second row of similarity scores in table 662 of FIG. 21.

At step 718, for each of the leaf nodes (which becomes the current node) in the tree of candidate action/request pairs, the process is repeated from step 706. Since there are three leaf nodes 902, 904, and 906 in the tree of candidate requests (see FIG. 23), process 700 now repeats for each of the leaf nodes 902, 904, and 906, starting at step 706. Steps 706, 707 and 710 for leaf node 902 are explained in FIGS. 24 and 25; steps 706, 707 and 710 for leaf node 904 are explained in FIGS. 26 and 27; and steps 706, 707 and 710 for leaf node 906 are explained in FIGS. 28 and 29. In the particular discussion herein, it is assumed that the processing of leaf nodes 902, 904 and 906 occurs in a serial manner, but it is also possible that such processing occurs in parallel.

FIG. 24 depicts table 666 in which the non-zero similarity scores between the retrieved request (i.e., "get zza") and each candidate action/request pair in the blueprint are adjusted based on the number of steps to reach the candidate action/request pair from the current node. The steps to reach each of the candidate action/request pairs are now determined from "Action 1" (i.e., node 806) in the blueprint, corresponding to the current node (i.e., node 902) from data structure 900a. Conceptually, it is assumed that "Action 1" from blueprint 850 is a match to the previous request "get aab", and the steps to reach each candidate action/request pair in blueprint 850 are now determined from "Action 1".

The steps to reach the candidate action/request pair "Action 0—get kwz" from "Action 1" is listed as "not reachable", since it is not possible to reach "Action 0" from "Action 1". The steps to reach candidate action/request pair "Action 1—get aaa" from "Action 1" is listed as "1→3→1". At this point, the concept of depletion is introduced in order to resolve an apparent inconsistency. At this point, one may wonder why the steps to reach "Action 1—get aaa" from "Action 1" is not "—" (or no steps). The reason is that "Action 1—get aaa" was already used in (or depleted by) the current node. Therefore, in order to reach "Action 1—get aaa" from "Action 1", the steps of "1→3→1" would be needed. In other words, in order for "get aaa" to occur twice in a row, "Action 1" must be executed twice, and in order for "Action 1" to be executed twice, the steps of "1→3→1" would be needed. It is noted that a longer loop back to "Action 1" is possible (i.e., "1→2→4→1"), but the shorter loop (i.e., "1→3→1") is chosen to favor the creation of shorter test scripts.

The steps of reach candidate action/request pair "Action 1—get abc" from "Action 1" is listed as "—" (or no steps), since it is possible for get aaa (from the current node) and get abc (from the current candidate) to both occur with one execution Action 1. The steps to reach candidate action/request pair "Action 2—get aab" from "Action 1" is listed as "1→2". The steps to reach "Action 3—get abc" from "Action 1" is listed as "1→3". The steps to reach "Action 3—get zzz" from "Action 1" is listed as "1→3". Finally, the steps to reach "Action 4—get kwx" from "Action 1" is listed as "1→2→4". The third row counts the number of steps. The counting of steps should be self-explanatory. The fourth row eliminates the candidate requests with a similarity score below 51%. In the instant example, the candidate action/request pair "Action 3-get zzz" is not eliminated.

Figure 25:
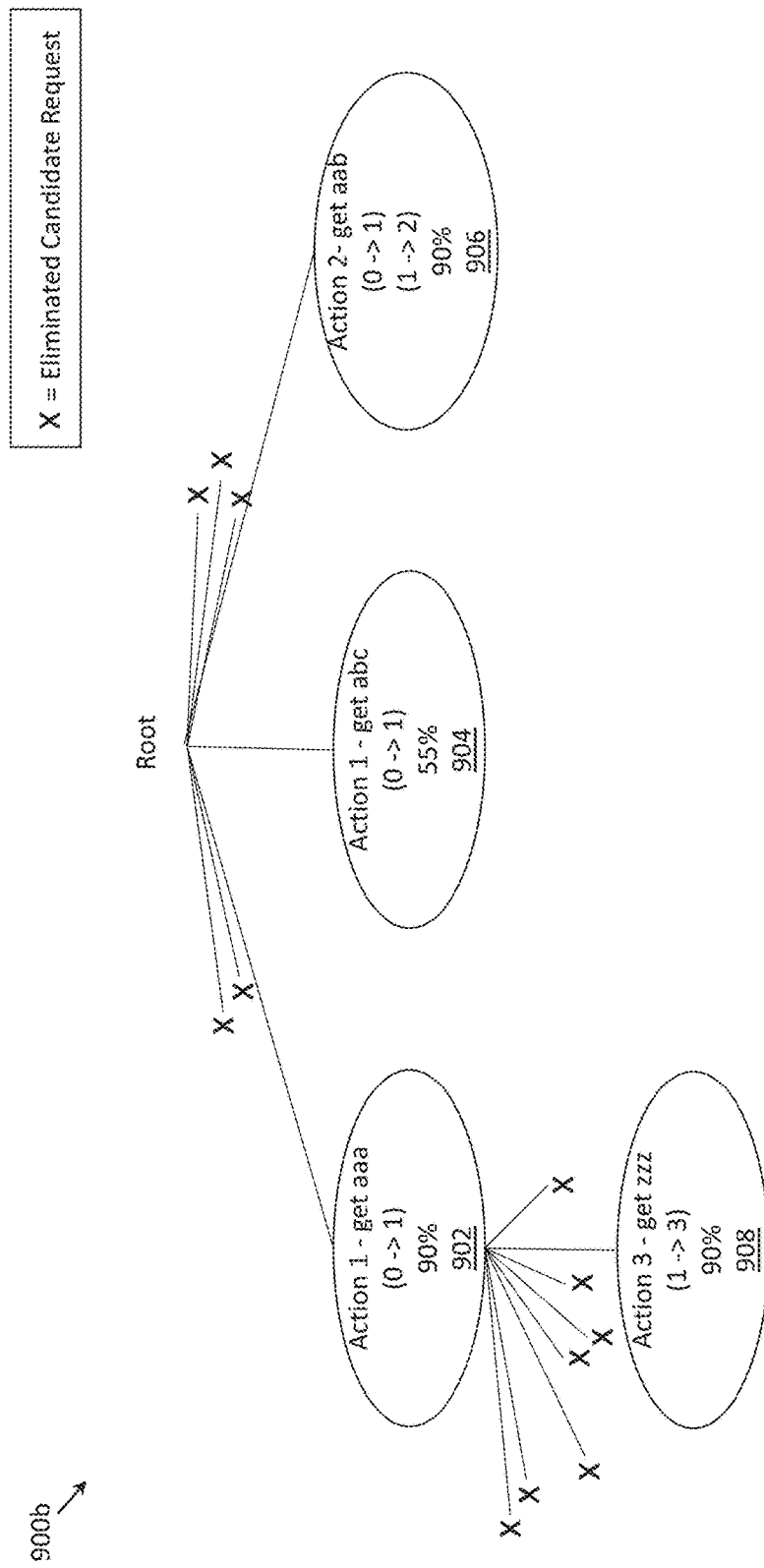
FIG. 25 depicts the data structure of FIG. 23 at a subsequent point in time, in accordance with one embodiment of the invention.

FIG. 25 depicts data structure 900b in which leaf node 908 has been added to node 902 (now an internal node) to represent the non-eliminated candidate action/request pairs. Leaf node 908 stores the candidate request "Action 3—get zzz", steps "1→3" and the adjusted similarity score "90%". If not already apparent, the path from root to node 902 to node 908 in data structure 900b represents the possible traversal of the user in blueprint 850 from "Action 0" to "Action 1" to "Action 3".

FIG. 26 depicts table 668 in which the non-zero similarity scores between the retrieved request (i.e., "get zza") and each candidate action/request pair in the blueprint are adjusted based on the number of steps to reach the candidate action/request pair from the current node. The steps to reach each of the candidate action/request pairs are now determined from "Action 1" (i.e., node 806) in the blueprint, corresponding to the current node (i.e., node 904) from data structure 900a. Conceptually, it is assumed that "Action 1" from blueprint 850 is a match to the previous request "get abc", and the steps to reach each candidate action/request pair in blueprint 850 are determined from "Action 1".

The steps to reach the candidate action/request pair "Action 0—get kwz" from "Action 1" is listed as "not reachable", since it is not possible to reach "Action 0" from "Action 1". The steps to reach candidate action/request pair "Action 1—get aaa" from "Action 1" is listed as "—". The steps to reach candidate action/request pair "Action 1—get abc" from "Action 1" is listed as "1→3→1" due to the above-described issue of depletion. The remainder of table 668 should be self-explanatory based on the previous explanation of table 666. In the case of node 904 as the current node, the non-eliminated candidate requests are "Action 1—get aaa" and "Action 3—get zzz".

Figure 27:
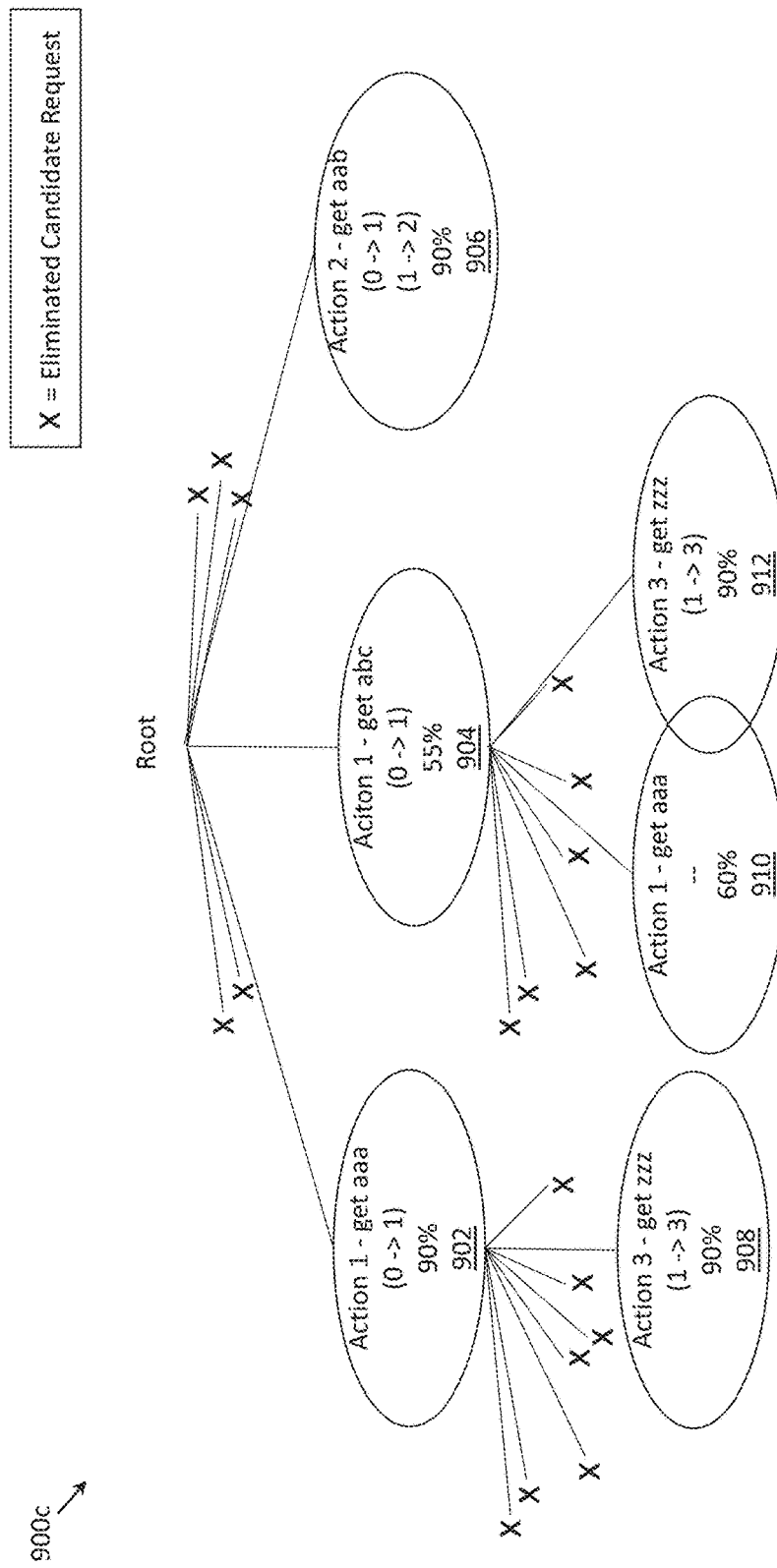
FIG. 27 depicts the data structure of FIG. 25 at a subsequent point in time, in accordance with one embodiment of the invention.

FIG. 27 depicts data structure 900c in which leaf nodes 910 and 912 have been added to node 904 (now an internal node) to represent the non-eliminated candidate requests "Action 1—get aaa" and "Action 3—get zzz". If not already apparent, the path from root to node 904 to node 910 in data structure 900c represents the possible traversal of the user in blueprint 850 from "Action 0" to "Action 1" (in which the requests of get abc and get aaa are both transmitted from one instance of Action 1). If not already apparent, the path from root to node 904 to node 912 in data structure 900c represents the possible traversal of the user in blueprint 850 from "Action 0" to "Action 1" to "Action 3".

FIG. 28 depicts table 670 in which the non-zero similarity scores between the retrieved request (i.e., "get zza") and each candidate action/request pair in the blueprint are adjusted based on the number of steps to reach the candidate action/request pair from the current node. The steps to reach each of the candidate action/request pairs are now determined from "Action 2" (i.e., node 810) in the blueprint, corresponding to the current node (i.e., node 906) from data structure 900a. Conceptually, it is assumed that "Action 2" from blueprint 850 is a match to the previous request "get aab", and the steps to reach each candidate action/request pair in blueprint 850 are now determined from "Action 2".

In light of the previous discussion, the tabulation of steps in the second row of table 670 should be self-explanatory. In light of the previous discussion, the tabulation of the count of steps in the third row of table 670 should be self-explanatory. The fourth row eliminates the candidate requests with a similarity score below 51%. In the instant example, only the candidate action/request pair "Action 3—get zzz" is not eliminated.

Figure 29:
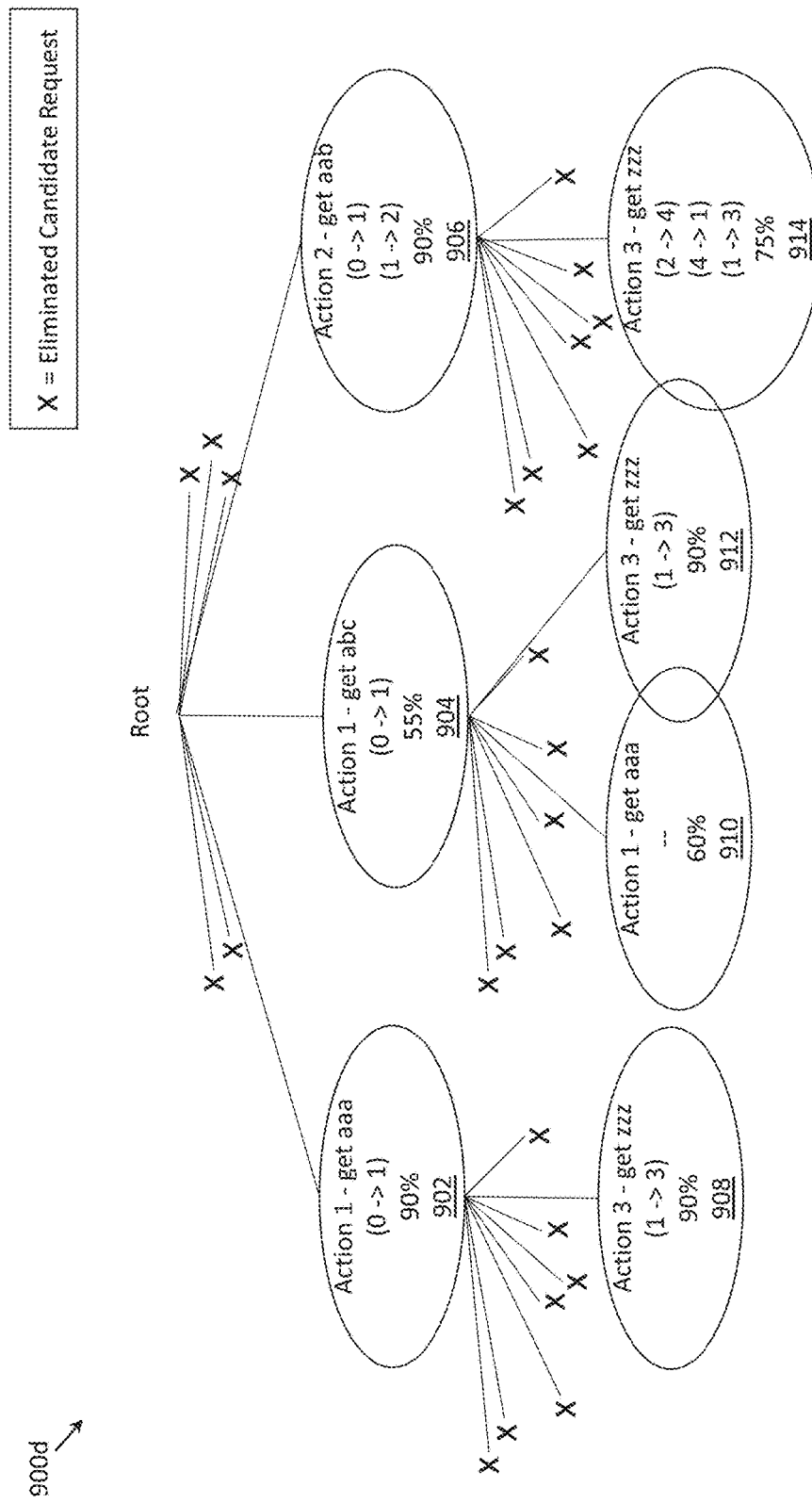
FIG. 29 depicts the data structure of FIG. 27 at a subsequent point in time, in accordance with one embodiment of the invention.
Figure 30:
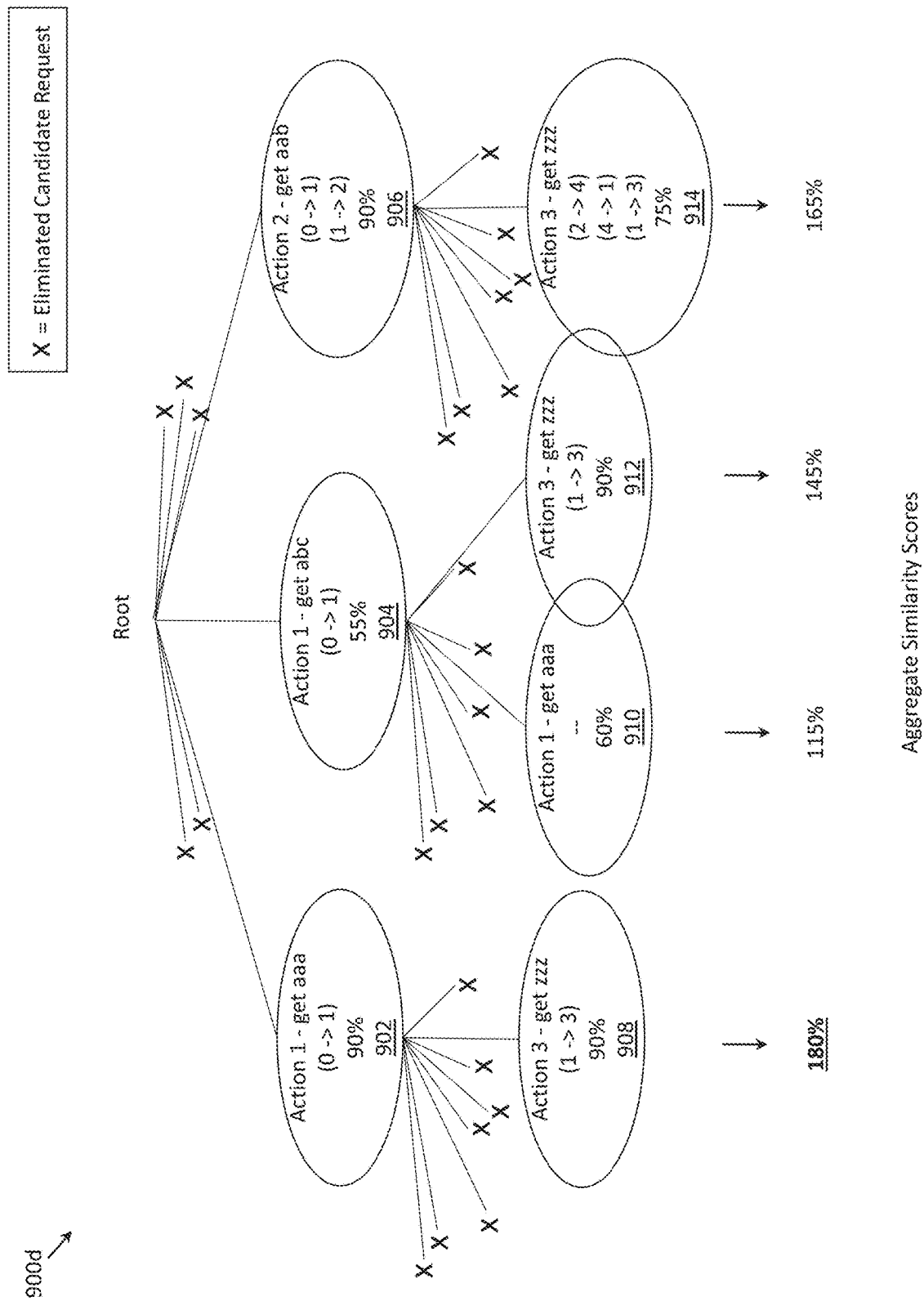
FIG. 30 depicts aggregated similarity scores for a plurality of traversals through the data structure of FIG. 29, in accordance with one embodiment of the invention.

FIG. 29 depicts data structure 900d in which leaf node 914 has been added to node 906 (now an internal node) to represent the non-eliminated candidate action/request pair "Action 3—get zzz". Leaf node 914 stores the candidate action/request pair "Action 3—get zzz", steps "2→4→1→3" and adjusted similarity score "75%". If not already apparent, the path from root to node 906 to node 914 in data structure 900d represents the possible traversal of the user in blueprint 850 from "Action 0" to "Action 1" to "Action 2" to "Action 4" to "Action 1" to "Action 3".

At this point, there are no remaining request in user log 648 and all the iterations through the main loop of process 700 have concluded. Therefore, the process transitions to step 716 in which test script generator 612 determines the traversal through the data structure 900d with the highest aggregate similarity score. Aggregate similarity scores are computed for each of the traversals from root to leaf in FIG. 30. The traversal with the highest aggregate similarity score, in the present example, is root to node 902 to node 908. Therefore, test script generator 612 infers that the requests logged in user log 648 most likely resulted from the user traversing blueprint 850 from "Action 0" to "Action 1" to "Action 3".

While not included in process 700 of FIG. 7, there is an additional pruning step that can be performed to increase the efficiency of the algorithm. As a trigger for this additional pruning step, the number of leaves of the tree or the data structure may be monitored. If the number of leaves of the tree exceeds a certain threshold (e.g., 500), aggregated similarity scores may be calculated from the root to each of the leaves, and leaves associated with the lower aggregate similarity scores may be eliminated until the number of leaves no longer exceeds the threshold. Such pruning step controls the potentially exponential growth in the number of leaves as each new level of leaves is added to the tree.

Figure 31:
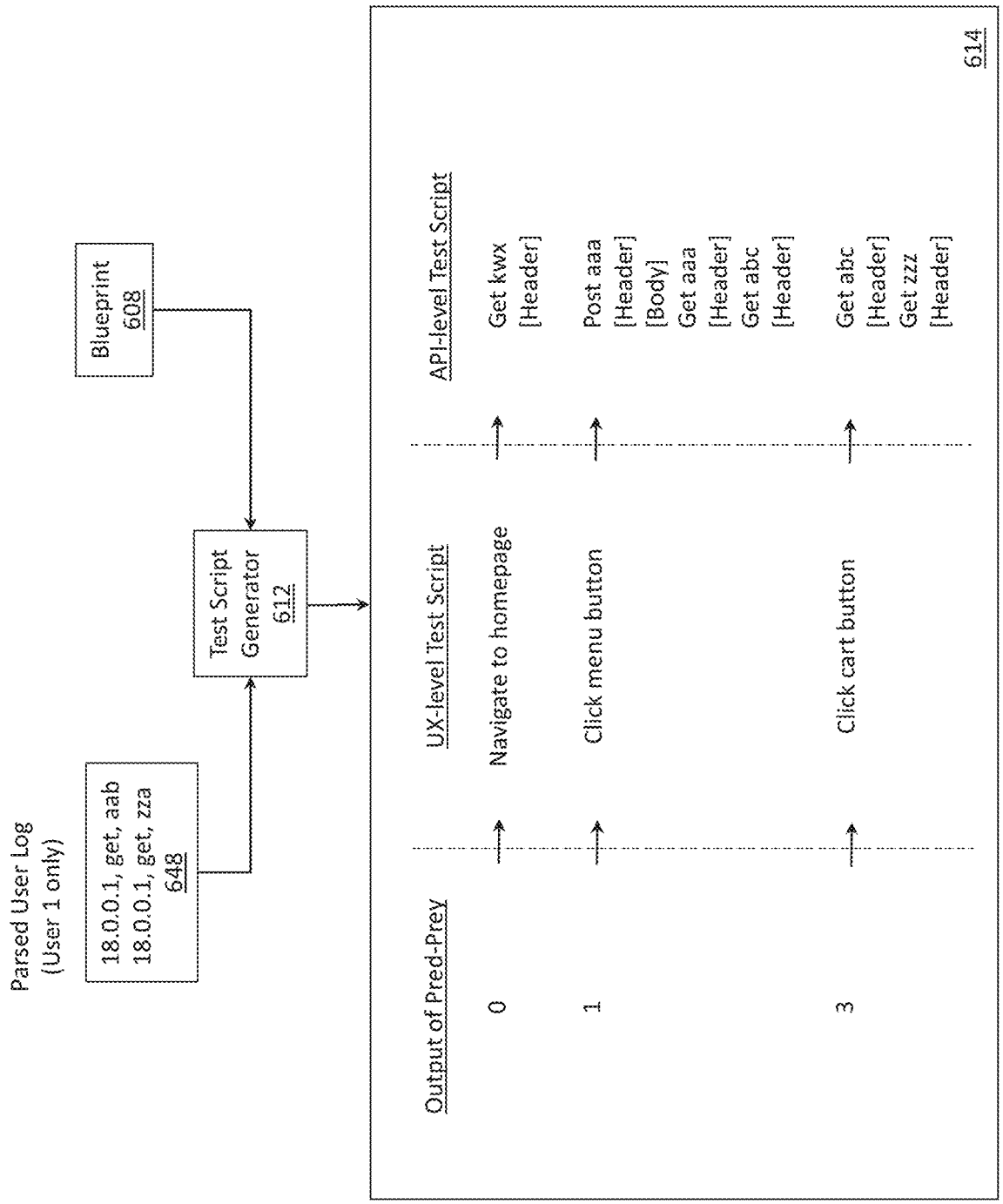
FIG. 31 depicts a conceptual test script that is generated from a parsed user log and a blueprint, in accordance with one embodiment of the invention.

The construction of the test script based on the determined traversal through data structure 900d is now shown in FIG. 31. A UX-level test script may be constructed by translating the sequence of action identifiers (e.g., 0, 1, 3) from the most likely traversal into a sequence of actions. Such translation may rely upon a mapping from action identifiers to actions (such as the tables provided in FIGS. 11A-11G and 15A-15G). In the instant example, "action 0" is translated into the action "navigate to homepage"; "action 1" is translated into the action "click menu button"; and "action 3" is translated into the action "click cart button" (hypothetical translation). An API-level test script may be constructed by recording, in a sequential manner, the HTTP requests that are present from the most likely traversal through blueprint 850, which would be Get kwx→{Post aaa, Get aaa, Get abc}→{Get abc, Get zzz}. Recall, each HTTP request may include the head, body, etc. (which have been stated in FIG. 31 for completeness). To clarify, the HTTP requests that are recorded in the test script correspond to those HTTP requests from blueprint 850, and not the (parsed) user log 648.

Figure 32:
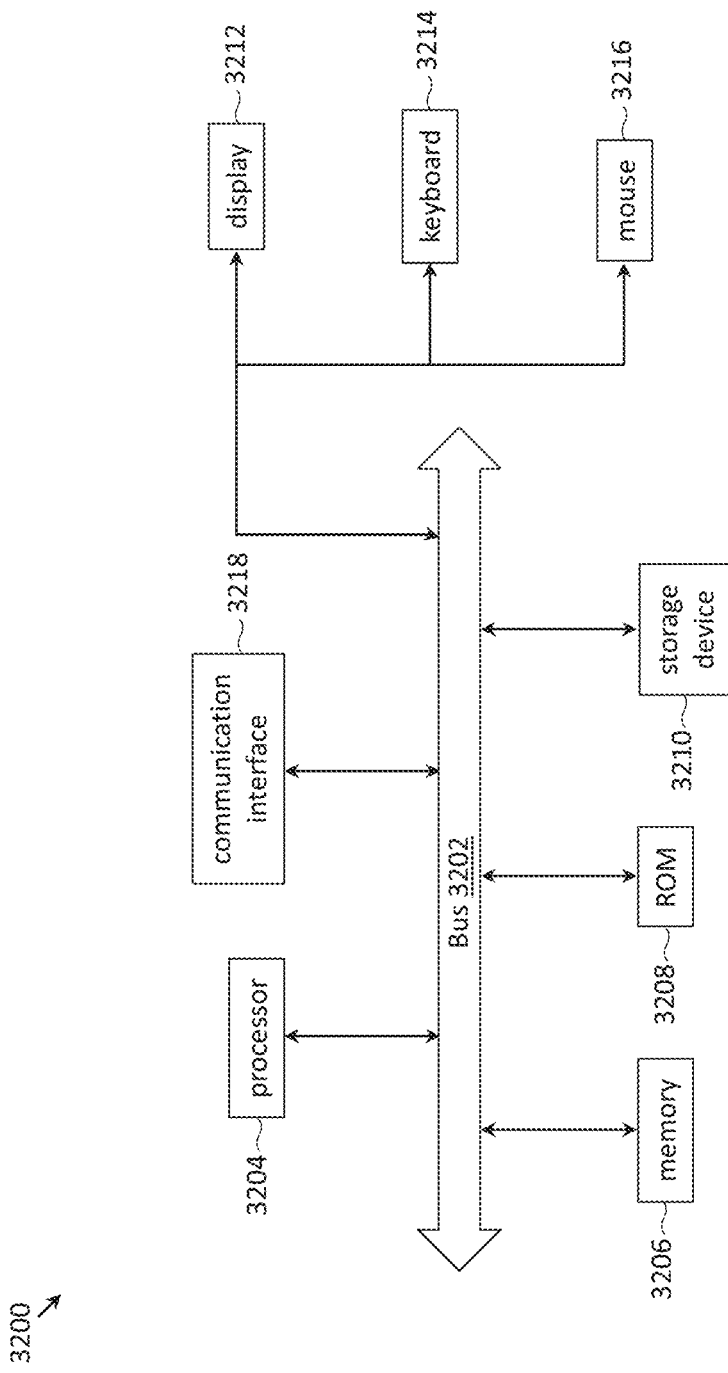
FIG. 32 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 32 provides an example of a system 3200 that may be representative of any of the computing systems (e.g., element classifiers 112/118, test script generator 612, testing tool 624, etc.) discussed herein. Examples of system 3200 may include a smartphone, a desktop, a laptop, a mainframe computer, an embedded system, etc. Note, not all of the various computer systems have all of the features of system 3200. For example, certain ones of the computer systems discussed above may not include a display inasmuch as the display function may be provided by a client computer communicatively coupled to the computer system or a display function may be unnecessary. Such details are not critical to the present invention.

System 3200 includes a bus 3202 or other communication mechanism for communicating information, and a processor 3204 coupled with the bus 3202 for processing information. Computer system 3200 also includes a main memory 3206, such as a random access memory (RAM) or other dynamic storage device, coupled to the bus 3202 for storing information and instructions to be executed by processor 3204. Main memory 3206 also may be used for storing temporary variables or other intermediate information during execution of instructions to be executed by processor 3204. Computer system 3200 further includes a read only memory (ROM) 3208 or other static storage device coupled to the bus 3202 for storing static information and instructions for the processor 3204. A storage device 3210, for example a hard disk, flash memory-based storage medium, or other storage medium from which processor 3204 can read, is provided and coupled to the bus 3202 for storing information and instructions (e.g., operating systems, applications programs and the like).

Computer system 3200 may be coupled via the bus 3202 to a display 3212, such as a flat panel display, for displaying information to a computer user. An input device 3214, such as a keyboard including alphanumeric and other keys, may be coupled to the bus 3202 for communicating information and command selections to the processor 3204. Another type of user input device is cursor control device 3216, such as a mouse, a trackpad, or similar input device for communicating direction information and command selections to processor 3204 and for controlling cursor movement on the display 3212. Other user interface devices, such as microphones, speakers, etc. are not shown in detail but may be involved with the receipt of user input and/or presentation of output.

The processes referred to herein may be implemented by processor 3204 executing appropriate sequences of computer-readable instructions contained in main memory 3206. Such instructions may be read into main memory 3206 from another computer-readable medium, such as storage device 3210, and execution of the sequences of instructions contained in the main memory 3206 causes the processor 3204 to perform the associated actions. In alternative embodiments, hard-wired circuitry or firmware-controlled processing units may be used in place of or in combination with processor 3204 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 3200 or similar electronic computing device, that manipulates and transforms data represented as physical (electronic) quantities within its registers and memories into other data similarly represented as physical quantities within its memories or registers or other such information storage, transmission or display devices.

Computer system 3200 also includes a communication interface 3218 coupled to the bus 3202. Communication interface 3218 may provide a two-way data communication channel with a computer network, which provides connectivity to and among the various computer systems discussed above. For example, communication interface 3218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 3200 can send and receive messages and data through the communication interface 3218 and in that way communicate with hosts accessible via the Internet. It is noted that the components of system 3200 may be located in a single device or located in a plurality of physically and/or geographically distributed devices.

Thus, an AI-driven automated test script generation process has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for generating a test script to test a web application based on a user log of past user interactions with the web application and a blueprint that models the web application, wherein the blueprint includes a state machine, in which states of the state machine correspond to at least one of (i) application pages of the web application or (ii) actions that are performed to transition from one of the application pages to another one of the application pages, and edges of the state machine correspond to transitions between the states of the state machine, the method comprising:

creating, by a processor, a data structure with a root node corresponding to a root node of the blueprint, and setting a current node equal to the root node of the data structure;

receiving, by the processor, a first request from the user log;

computing, by the processor, a similarity score between the first request and each candidate action/request pair in the blueprint, wherein each candidate action/request pair includes an action from the state machine that is paired with a corresponding request from the state machine;

for non-zero ones of the similarity scores, adjusting, by the processor, the similarity score based on a number of steps to reach the candidate action/request pair associated with the similarity score from a node of the blueprint corresponding to the current node of the data structure, wherein a determination of the steps to reach the candidate action/request pair takes into account candidate action/request pairs that have been depleted from the node of the blueprint corresponding to the current node of the data structure;

eliminating, by the processor, candidate action/request pairs in the blueprint by comparing the adjusted similarity score to a threshold;

for each of the remaining candidate action/request pairs, storing, by the processor, the remaining candidate action/request pairs as terminal nodes from the current node in the data structure;

determining, by the processor, whether there are remaining requests in the user log;

if there are remaining requests in the user log, (i) receiving a next request from the user log, (ii) computing a similarity score between the next request and each candidate action/request pair in the blueprint, and (iii) for each of the terminal nodes in the data structure, setting the current node equal to the terminal node and repeating the method starting with the adjusting step; and otherwise, if there are no remaining requests in the user log, determining, by the processor, a traversal through the data structure with a highest aggregate similarity score, and constructing, by the processor, the test script based on the determined traversal through the data structure and the blueprint.

2. The method of claim 1, wherein the first request includes one or more of an Internet protocol (IP) address, a method, a URL and a hint.

3. The method of claim 1, wherein the user log comprises sequentially recorded requests that are transmitted from a common Internet protocol (IP) address.

4. The method of claim 1, wherein the similarity score between the first request and each candidate action/request pair in the blueprint is computed as a linear combination of local similarity scores, wherein each of the local similarity scores measures a similarity between a portion of a URL of the first request and a portion of a URL of a respective candidate action/request pair that corresponds to the portion of the URL of the first request.

5. The method of claim 4, wherein each of the local similarity scores is computed as a Jaro-Winkler distance between the portion of the URL of the first request and the portion of the URL of the respective candidate action/request pair that corresponds to the portion of the URL of the first request.

6. The method of claim 1, further comprising storing the remaining candidate action/request pairs in the data structure.

7. The method of claim 1, further comprising, for each of the remaining candidate action/request pairs, storing, in the data structure, the adjusted similarity score associated with the remaining candidate action/request pair.

8. The method of claim 1, further comprising, for each of the remaining candidate action/request pairs, storing, in the data structure, a sequence of steps from the node of the blueprint corresponding to the current node of the data structure to reach the remaining candidate action/request pair.

9. The method of claim 1, wherein constructing the test script based on the determined traversal through the data structure and the blueprint comprises determining a traversal through the blueprint based on the traversal through the data structure, and recording actions in the test script specified by edges or states traversed by the traversal through the blueprint.

10. The method of claim 9, wherein the actions recorded in the test script include one or more of user experience (UX) level actions and application programming interface (API) level actions.

11. The method of claim 1, wherein the test script includes one or more of a user experience (UX) level test script or an application programming interface (API) level test script, wherein the UX level test script includes a sequence of user actions to be performed on the web application, and wherein the API level test script includes a sequence of hypertext transfer protocol (HTTP) requests to be transmitted to a server hosting the web application.

12. A non-transitory machine-readable storage medium for generating a test script to test a web application based on a user log of past user interactions with the web application and a blueprint that models the web application, wherein the blueprint includes a state machine, in which states of the state machine correspond to at least one of (i) application pages of the web application or (ii) actions that are performed to transition from one of the application pages to another one of the application pages, and edges of the state machine correspond to transitions between the states of the state machine, the non-transitory machine-readable storage medium comprising instructions that, when executed by a processor of the computing system, cause the processor to:
  create a data structure with a root node corresponding to a root node of the blueprint, and setting a current node equal to the root node of the data structure;
  receive a first request from the user log;
  compute a similarity score between the first request and each candidate action/request pair in the blueprint, wherein each candidate action/request pair includes an action from the state machine that is paired with a corresponding request from the state machine;
  for non-zero ones of the similarity scores, adjust the similarity score based on a number of steps to reach the candidate action/request pair associated with the similarity score from a node of the blueprint corresponding to the current node of the data structure, wherein a determination of the steps to reach the candidate action/request pair takes into account candidate action/request pairs that have been depleted from the node of the blueprint corresponding to the current node of the data structure;
  eliminate candidate action/request pairs in the blueprint by comparing the adjusted similarity score to a threshold;
  for each of the remaining candidate action/request pairs, store the remaining candidate action/request pairs as terminal nodes from the current node in the data structure;
  determine whether there are remaining requests in the user log;
  if there are remaining requests in the user log, (i) receive a next request from the user log, (ii) compute a similarity score between the next request and each candidate action/request pair in the blueprint, and (iii) for each of the terminal nodes in the data structure, set the current node equal to the terminal node and repeat the method starting with the adjusting step; and
  otherwise, if there are no remaining requests in the user log, determine a traversal through the data structure with a highest aggregate similarity score, and construct the test script based on the determined traversal through the data structure and the blueprint.

13. The non-transitory machine-readable storage medium of claim 12, further comprising instructions that cause the processor to store the remaining candidate action/request pairs in the data structure.

14. The non-transitory machine-readable storage medium of claim 12, further comprising instructions that cause the processor to, for each of the remaining candidate action/request pairs, store, in the data structure, a sequence of steps from the node of the blueprint corresponding to the current node of the data structure to reach the remaining candidate action/request pair.

15. The non-transitory machine-readable storage medium of claim 12, wherein constructing the test script based on the determined traversal through the data structure and the blueprint comprises determining a traversal through the blueprint based on the traversal through the data structure, and recording actions in the test script specified by edges or states traversed by the traversal through the blueprint.

16. The non-transitory machine-readable storage medium of claim 15, wherein the actions recorded in the test script include one or more of user experience (UX) level actions and application programming interface (API) level actions.

17. A computing device for generating a test script to test a web application based on a user log of past user interactions with the application and a blueprint that models the application, wherein the blueprint includes a state machine, in which states of the state machine correspond to at least one of (i) application pages of the web application or (ii) actions that are performed to transition from one of the application pages to another one of the application pages, and edges of the state machine correspond to transitions between the states of the state machine, the computing device comprising:
  a processor; and
    a memory storing instructions that, when executed by a processor of the computing system, cause the processor to:
    create a data structure with a root node corresponding to a root node of the blueprint, and setting a current node equal to the root node of the data structure;
    receive a first request from the user log;
    compute a similarity score between the first request and each candidate action/request pair in the blueprint, wherein each candidate action/request pair includes an action from the state machine that is paired with a corresponding request from the state machine;
    for non-zero ones of the similarity scores, adjust the similarity score based on a number of steps to reach the candidate action/request pair associated with the similarity score from a node of the blueprint corresponding to the current node of the data structure, wherein a determination of the steps to reach the candidate action/request pair takes into account candidate action/request pairs that have been depleted from the node of the blueprint corresponding to the current node of the data structure;
    eliminate candidate action/request pairs in the blueprint by comparing the adjusted similarity score to a threshold;
    for each of the remaining candidate action/request pairs, store the remaining candidate action/request pairs as terminal nodes from the current node in the data structure;
    determine whether there are remaining requests in the user log;
    if there are remaining requests in the user log, (i) receive a next request from the user log, (ii) compute a similarity score between the next request and each candidate action/request pair in the blueprint, and (iii) for each of the terminal nodes in the data structure, set the current node equal to the terminal node and repeat the method starting with the adjusting step; and
    otherwise, if there are no remaining requests in the user log, determine a traversal through the data structure with a highest aggregate similarity score, and construct the test script based on the determined traversal through the data structure and the blueprint.

18. The computing device of claim 17, further comprising instructions that cause the processor to store the remaining candidate action/request pairs in the data structure.

19. The computing device of claim 18, further comprising instructions that cause the processor to, for each of the remaining candidate action/request pairs, store, in the data structure, a sequence of steps from the node of the blueprint corresponding to the current node of the data structure to reach the remaining candidate action/request pair.

20. The computing device of claim 18, wherein constructing the test script based on the determined traversal through the data structure and the blueprint comprises determining a traversal through the blueprint based on the traversal through the data structure, and recording actions in the test script specified by edges or states traversed by the traversal through the blueprint.

\* \* \* \* \*